(12) United States Patent
Mieda et al.

(10) Patent No.: US 11,179,999 B2
(45) Date of Patent: Nov. 23, 2021

(54) HEAT PUMP SYSTEM

(71) Applicant: DENSO CORPORATION, Kariya (JP)

(72) Inventors: Hiroshi Mieda, Kariya (JP); Ryohei Sugimura, Kariya (JP); Masaaki Kawakubo, Kariya (JP); Yuichi Kami, Kariya (JP)

(73) Assignee: DENSO CORPORATION, Kariya (JP)

( * ) Notice: Subject to any disclaimer, the term of this patent is extended or adjusted under 35 U.S.C. 154(b) by 908 days.

(21) Appl. No.: 15/749,514

(22) PCT Filed: Jul. 12, 2016

(86) PCT No.: PCT/JP2016/070486
§ 371 (c)(1),
(2) Date: Feb. 1, 2018

(87) PCT Pub. No.: WO2017/022421
PCT Pub. Date: Feb. 9, 2017

(65) Prior Publication Data
US 2018/0222287 A1    Aug. 9, 2018

(30) Foreign Application Priority Data

Aug. 4, 2015  (JP) .............................. JP2015-154332
Apr. 4, 2016  (JP) ................................. 2016-075387

(51) Int. Cl.
*B60H 1/00* (2006.01)
*F25B 43/00* (2006.01)
(Continued)

(52) U.S. Cl.
CPC ............ *B60H 1/22* (2013.01); *B60H 1/00914* (2013.01); *B60H 1/00921* (2013.01); *F25B 1/10* (2013.01);
(Continued)

(58) Field of Classification Search
CPC ............ B60H 1/00899; B60H 1/00907; B60H 1/00914; B60H 1/00921; B60H 1/22;
(Continued)

(56) References Cited

U.S. PATENT DOCUMENTS 5,598,887 A   2/1997  Ikeda et al.
5,704,219 A   1/1998  Suzuki et al.
(Continued)

FOREIGN PATENT DOCUMENTS

JP    H04132369 U   12/1992
JP    H07232547 A    9/1995
(Continued)

OTHER PUBLICATIONS

Kuroda Translation (Year: 2001).*
Michihiko Translation (Year: 2014).*

*Primary Examiner* — Cassey D Bauer
*Assistant Examiner* — Rodrigo Royo
(74) *Attorney, Agent, or Firm* — Harness, Dickey & Pierce, P.L.C.

(57) ABSTRACT

A heat pump system includes a compressor that compresses and discharges a refrigerant, a decompressor that decompresses the refrigerant, an outdoor unit that exchanges heat between the refrigerant and an outside air, an evaporator that evaporates the refrigerant, a condenser that condenses the refrigerant, an internal heat exchanger, an accumulator that separates the refrigerant into a gas refrigerant and a liquid refrigerant, and a flow pathway changing portion. The internal heat exchanger includes a high-pressure passage through which a high-pressure refrigerant flows, and a low-pressure passage through which a low-pressure refrigerant flows, the internal heat exchanger exchanging heat between the refrigerant flowing through the high-pressure passage and the refrigerant flowing through the low-pressure passage. The flow pathway changing portion that switches (Continued)

between a cooling pathway and a heating pathway. According to this heat pump system, a cooling capacity and a heating capacity can be improved.

9 Claims, 28 Drawing Sheets

(51) Int. Cl.
<table>
<tr><td>F25B 25/00</td><td>(2006.01)</td></tr>
<tr><td>F25B 6/02</td><td>(2006.01)</td></tr>
<tr><td>F25B 41/20</td><td>(2021.01)</td></tr>
<tr><td>F25B 1/10</td><td>(2006.01)</td></tr>
<tr><td>F25B 39/04</td><td>(2006.01)</td></tr>
<tr><td>B60H 1/22</td><td>(2006.01)</td></tr>
<tr><td>F25B 13/00</td><td>(2006.01)</td></tr>
<tr><td>F25B 40/00</td><td>(2006.01)</td></tr>
</table>

(52) U.S. Cl.
CPC ............... *F25B 6/02* (2013.01); *F25B 13/00* (2013.01); *F25B 25/005* (2013.01); *F25B 39/04* (2013.01); *F25B 40/00* (2013.01); *F25B 41/20* (2021.01); *F25B 43/006* (2013.01); *B60H 2001/00928* (2013.01); *B60H 2001/00957* (2013.01); *F25B 2313/0233* (2013.01); *F25B 2313/02741* (2013.01); *F25B 2600/21* (2013.01); *F25B 2600/2507* (2013.01)

(58) Field of Classification Search
CPC .... B60H 2001/00942; B60H 2001/961; F25B 700/2113; F25B 43/006; F25B 2347/02; F25B 41/20
See application file for complete search history.

(56) References Cited

U.S. PATENT DOCUMENTS

<table>
<tr><td>6,505,476 B1</td><td></td><td>1/2003</td><td>Nishida et al.</td><td></td></tr>
<tr><td>6,857,280 B1</td><td>*</td><td>2/2005</td><td>Yamanaka</td><td>......... B60H 1/00978<br>62/205</td></tr>
<tr><td>2005/0262873 A1</td><td>*</td><td>12/2005</td><td>Hirota</td><td>..................... F25B 41/20<br>62/503</td></tr>
<tr><td>2006/0191280 A1</td><td></td><td>8/2006</td><td>Kurosawa</td><td></td></tr>
<tr><td>2006/0266072 A1</td><td></td><td>11/2006</td><td>Takeuchi et al.</td><td></td></tr>
<tr><td>2008/0229768 A1</td><td>*</td><td>9/2008</td><td>Nakamura</td><td>......... B60H 1/00828<br>62/148</td></tr>
<tr><td>2009/0095005 A1</td><td>*</td><td>4/2009</td><td>Dietrich</td><td>.................. F25B 41/04<br>62/244</td></tr>
<tr><td>2012/0255319 A1</td><td></td><td>10/2012</td><td>Itoh et al.</td><td></td></tr>
<tr><td>2013/0111934 A1</td><td>*</td><td>5/2013</td><td>Wang</td><td>..................... F25B 41/00<br>62/115</td></tr>
<tr><td>2014/0331699 A1</td><td></td><td>11/2014</td><td>Higashiiue</td><td></td></tr>
<tr><td>2014/0373562 A1</td><td>*</td><td>12/2014</td><td>Suzuki</td><td>..................... F25B 41/20<br>62/159</td></tr>
<tr><td>2015/0040594 A1</td><td>*</td><td>2/2015</td><td>Suzuki</td><td>............... B60H 1/00335<br>62/159</td></tr>
<tr><td>2015/0143835 A1</td><td>*</td><td>5/2015</td><td>Matsumoto</td><td>............. F25B 30/02<br>62/324.1</td></tr>
<tr><td>2015/0159933 A1</td><td></td><td>6/2015</td><td>Itoh et al.</td><td></td></tr>
<tr><td>2016/0075212 A1</td><td>*</td><td>3/2016</td><td>Morishita</td><td>.......... B60H 1/00778<br>165/202</td></tr>
<tr><td>2016/0370045 A1</td><td>*</td><td>12/2016</td><td>Takenaka</td><td>.............. F28D 1/0443</td></tr>
<tr><td>2017/0336116 A1</td><td>*</td><td>11/2017</td><td>Fukui</td><td>..................... F25B 43/00</td></tr>
</table>

FOREIGN PATENT DOCUMENTS

<table>
<tr><td>JP</td><td>H08166172 A</td><td></td><td>6/1996</td></tr>
<tr><td>JP</td><td>2001201213 A</td><td>*</td><td>7/2001</td></tr>
<tr><td>JP</td><td>2004-98974 A</td><td></td><td>4/2004</td></tr>
<tr><td>JP</td><td>2006242402 A</td><td></td><td>9/2006</td></tr>
<tr><td>JP</td><td>2007003166 A</td><td></td><td>1/2007</td></tr>
<tr><td>JP</td><td>2008190763 A</td><td></td><td>8/2008</td></tr>
<tr><td>JP</td><td>2012132578 A</td><td></td><td>7/2012</td></tr>
<tr><td>JP</td><td>2012225637 A</td><td></td><td>11/2012</td></tr>
<tr><td>JP</td><td>2014009868 A</td><td></td><td>1/2014</td></tr>
<tr><td>JP</td><td>2014092325 A</td><td></td><td>5/2014</td></tr>
<tr><td>JP</td><td>2014214913 A</td><td>*</td><td>11/2014</td></tr>
<tr><td>JP</td><td>2014231948 A</td><td></td><td>12/2014</td></tr>
<tr><td>WO</td><td>WO-2013080350 A1</td><td></td><td>6/2013</td></tr>
</table>

\* cited by examiner

HEAT PUMP SYSTEM

CROSS REFERENCE TO RELATED APPLICATIONS

This application is a U.S. National Phase Application under 35 U.S.C. 371 of International Application No. PCT/JP2016/070486 filed on Jul. 12, 2016 and published in Japanese as WO 2017/022421 A1 on Feb. 9, 2017. This application is based on and reference the benefit of priority from Japanese Patent Applications No. 2015-154332 filed on Aug. 4, 2015, and No. 2016-075387 filed on Apr. 4, 2016. The entire disclosures of all of the above applications are incorporated herein by reference.

TECHNICAL FIELD

The present disclosure relates to a heat pump system which circulates a refrigerant to heat and cool an air.

BACKGROUND ART

A common heat pump system is used in an air conditioner of a vehicle and includes a refrigeration cycle. A heat exchanger used in the refrigeration cycle functions as a condenser and an evaporator, for example, and exchanges heat between a refrigerant flowing in the heat exchanger and an air flowing outside the heat exchanger.

The heat pump system includes an outdoor heat exchanger provided outside the vehicle compartment. The outdoor heat exchanger is referred to as an outdoor unit, and the outdoor unit functions as an evaporator in a heating operation, and the outdoor unit functions as a condenser in a cooling operation. When the outdoor unit functions as an evaporator, a refrigerant, whose vapour quality is low, flows into the outdoor unit. The refrigerant flowing through the outdoor unit absorbs heat from the air and is evaporated, and a ratio of a gas refrigerant increases, and accordingly the refrigerant having a high vapour quality flows out of the outdoor unit (refer to Patent Document 1, for example).

PRIOR ART DOCUMENT

Patent Document

Patent Document 1: JP 2014-9868 A

SUMMARY OF THE INVENTION

In the refrigeration cycle of the above-described Patent Document 1, an accumulator is provided upstream of a compressor. In the accumulator, two-phase refrigerant is separated into a gas refrigerant and a liquid refrigerant, and basically only the gas refrigerant flows out of the accumulator. However, it is required to return lubricant of the compressor contained in the liquid refrigerant, and a return hole is provided in an outlet pipe for returning lubricant. Accordingly, superheat of the refrigerant may not decrease before the refrigerant is drawn into the compressor, and a enthalpy difference in the evaporator may be small. Accordingly, efficiency of the cycle may decrease especially in cooling.

In heating operation during winter, the outdoor unit functions as an evaporator. In this case, it is required to distribute the two-phase refrigerant to multiple tubes of the outdoor unit. It may be difficult to uniformly distribute the two-phase refrigerant to multiple tubes, and the liquid refrigerant may concentrate to some tubes, and accordingly an effective part of the outdoor unit may be small. When the outside is humid in the heating operation, frost may be formed on a surface of the outdoor unit, and accordingly heating performance may decrease.

In consideration of the above-described points, it is an objective of the present disclosure to provide a heat pump system capable of improving cooling performance and heating performance.

In order to achieve the above-described objective, the present disclosure adopts the following technical means.

A heat pump system according to a first aspect of the present disclosure includes: a compressor that compresses and discharges a refrigerant; a decompressor that decompresses the refrigerant; an outdoor unit that exchanges heat between the refrigerant and an outside air; an evaporator that evaporates the refrigerant; a condenser that condenses the refrigerant; an internal heat exchanger that includes a high-pressure passage through which a high-pressure refrigerant flows, and a low-pressure passage through which a low-pressure refrigerant flows, the internal heat exchanger exchanging heat between the refrigerant flowing through the high-pressure passage and the refrigerant flowing through the low-pressure passage; an accumulator that separates the refrigerant into a gas refrigerant and a liquid refrigerant; and a flow pathway changing portion that switches a pathway in which the refrigerant flows. The flow pathway changing portion switches between a cooling pathway and a heating pathway. In the cooling pathway, the refrigerant circulates, in order, from the compressor, to the outdoor unit, to the high-pressure passage of the internal heat exchanger, to the decompressor, to the evaporator, to the accumulator, to the low-pressure passage of the internal heat exchanger, then back to the compressor, or from the compressor, to the outdoor unit, to the high-pressure passage of the internal heat exchanger, to the decompressor, to the evaporator, to the low-pressure passage of the internal heat exchanger, to the accumulator, then back to the compressor. In the heating pathway, the refrigerant circulates, in order, from the compressor, to the condenser, to the high-pressure passage of the internal heat exchanger, to the decompressor, to the outdoor unit, to the accumulator, to the low-pressure passage of the internal heat exchanger, then back to the compressor, or from the compressor, to the condenser, to the high-pressure passage of the internal heat exchanger, to the decompressor, to the outdoor unit, to the low-pressure passage of the internal heat exchanger, to the accumulator, then back to the compressor.

According to this aspect, the refrigerant circulates in the cooling pathway in the cooling operation, and the refrigerant circulates in the heating pathway in the heating operation. In the cooling pathway and the heating pathway, the refrigerant flows through the internal heat exchanger. The internal heat exchanger exchanges heat between the high-pressure refrigerant, which flows on a downstream side of the heat exchanger that functions as a condenser, and the low-pressure refrigerant, which flows on an upstream side of the heat exchanger that functions as an evaporator. According to this, a vapour quality of the refrigerant flowing into the heat exchanger that functions as an evaporator can be decreased, and a vapour quality of the refrigerant flowing out of the heat exchanger can be decreased. Therefore, a range of the vapour quality of the refrigerant in the heat exchanger that functions as an evaporator can be low. According to this, a volume fraction of the liquid refrigerant flowing into the heat exchanger increases, and distribution of the liquid refrigerant in the heat exchanger can be improved.

In the present aspect, since the interior heat exchanger is provided downstream of the heat exchanger that functions as an evaporator, the vapour quality of the refrigerant at an outlet of the evaporator can be decreased. According to this, superheat can be largely limited even when the refrigerant vapour quality varies between the outlets of the tubes constituting the heat exchanger.

Moreover, in the present aspect, since the refrigerant vapour quality is decreased by the internal heat exchanger when the outdoor unit functions as an evaporator, both a decrease of a refrigerant pressure loss during evaporation and an effective use of a heat exchanging area, which usually contradict each other, can be achieved. Since average density of the refrigerant flowing through the outdoor unit can be increased due to the low vapour quality range, a speed of the refrigerant can be decreased, and accordingly the refrigerant pressure loss can be decreased. Moreover, since the low vapour quality is lower than usual, the pressure loss of the refrigerant flowing through a pipe between the outdoor unit and the internal heat exchanger can be decreased. Therefore, the refrigerant pressure loss can be decreased although the internal heat exchanger is provided.

The above-described effects can be obtained in the evaporator in the cooling operation in addition to the outdoor unit that functions as an evaporator. When the vapour quality in the evaporator is decreased by the internal heat exchanger, both the low pressure loss and uniform air temperature can be achieved even when a refrigerant pass of the evaporator is a single-pass. Accordingly, a deterioration of the efficiency in the cooling operation due to an accumulator cycle can be limited.

A heat pump system according to a second aspect of the present disclosure includes: a compressor that compresses and discharges a refrigerant; a decompressor that decompresses the refrigerant; an outdoor unit that exchanges heat between the refrigerant and an outside air; an evaporator that evaporates the refrigerant; a condenser that condenses the refrigerant; an internal heat exchanger that includes a high-pressure passage through which a high-pressure refrigerant flows, and a low-pressure passage through which a low-pressure refrigerant flows, the internal heat exchanger exchanging heat between the refrigerant flowing through the high-pressure passage and the refrigerant flowing through the low-pressure passage; an accumulator that separates the refrigerant into a gas refrigerant and a liquid refrigerant; and a flow pathway changing portion that switches a pathway in which the refrigerant flows. The flow pathway changing portion switches between a cooling pathway and a heating pathway. In the cooling pathway, the refrigerant circulates, in order, from the compressor, to the outdoor unit, to the high-pressure passage of the internal heat exchanger, to the decompressor, to the evaporator, to the accumulator, to the low-pressure passage of the internal heat exchanger, then back to the compressor. In the heating pathway, the refrigerant circulates, in order, from the compressor, to the condenser, to the high-pressure passage of the internal heat exchanger, to the decompressor, to the outdoor unit, to the accumulator, to the low-pressure passage of the internal heat exchanger, then back to the compressor. The accumulator includes a gas refrigerant passage through which the separated gas refrigerant flows, and a liquid refrigerant passage through which the separated liquid refrigerant flows. In the gas refrigerant passage and the liquid refrigerant passage, at least the liquid refrigerant passage is connected to the low-pressure passage of the internal heat exchanger.

In the configuration of the present aspect, in which the compressor, the outdoor unit, the high-pressure passage of the internal heat exchanger, the decompressor, the evaporator, the accumulator, the low-pressure passage of the internal heat exchanger, and the compressor are connected in this order, the accumulator includes the gas refrigerant passage, through which the separated gas refrigerant flows out of the accumulator, and the liquid refrigerant passage, through which the separated liquid refrigerant flows out of the accumulator. In the gas refrigerant passage and the liquid refrigerant passage, at least the liquid refrigerant passage is connected to the low-pressure passage of the internal heat exchanger.

According to this aspect, in the heating pathway, the liquid refrigerant flowing out of the condenser exchanges heat with the liquid refrigerant flowing out of the accumulator in the internal heat exchanger, and enthalpy of the refrigerant condensed by the condenser can be decreased. According to this, the refrigerant vapour quality at an inlet of the outdoor unit can be decreased. Since the refrigerant vapour quality at the inlet of the outdoor unit can be decreased, the volume of the liquid refrigerant flowing into the outdoor unit increases, refrigerant distribution in the outdoor unit can be improved. Therefore, a heat exchange performance of the outdoor unit can be improved.

In the cooling pathway, the refrigerant cooled in the outdoor unit can be cooled by the liquid refrigerant flowing from the accumulator in the internal heat exchanger. Subsequently, the refrigerant passing through the high-pressure passage of the internal heat exchanger flows to a decompressor and the evaporator. Since the refrigerant is cooled by the internal heat exchanger, average vapour quality of the refrigerant flowing through the evaporator can be reduced. According to this, the refrigerant pressure loss in the evaporator can be decreased. Moreover, since superheat in the evaporator can be limited, the performance of the evaporator can be improved, and accordingly the efficiency of the system can be improved.

In the configurations of the present aspect, in which the compressor, the outdoor unit, the high-pressure passage of the internal heat exchanger, the decompressor, the evaporator, the low-pressure passage of the internal heat exchanger, the accumulator, the compressor are connected in this order, since the vapour quality at both an outlet and an inlet of the heat exchanger that functions as an evaporator can be low, the same effects as the above-described configurations can be obtained.

A heat pump system according to a third aspect of the present disclosure includes: a compressor that compresses and discharges a refrigerant; a decompressor that decompresses the refrigerant; an outdoor unit that exchanges heat between the refrigerant and an outside air; an evaporator that evaporates the refrigerant; a condenser that condenses the refrigerant an accumulator that separates the refrigerant into a gas refrigerant and a liquid refrigerant; and a flow pathway changing portion that switches a pathway in which the refrigerant flows. The flow pathway changing portion switches between a cooling pathway, a heating pathway, and a defrosting pathway. In the cooling pathway, the refrigerant circulates, in order, from the compressor, to the outdoor unit, to the decompressor, to the evaporator, to the accumulator, then back to the compressor. In the heating pathway, the refrigerant circulates, in order, from the compressor, to the condenser, to the decompressor, to the outdoor unit, to the accumulator, then back to the compressor. In the defrosting pathway, the refrigerant circulates, in order, from the compressor, to the outdoor unit, to the condenser, then back to the compressor.

The heat pump system according to the third aspect, a cooling capacity and a heating capacity can be increased.

BRIEF DESCRIPTION OF THE DRAWINGS

FIG. 2 is a graph showing an average refrigerant density of a refrigerant R134a.

EMBODIMENTS FOR EXPLOITATION OF THE INVENTION

Figure 1:
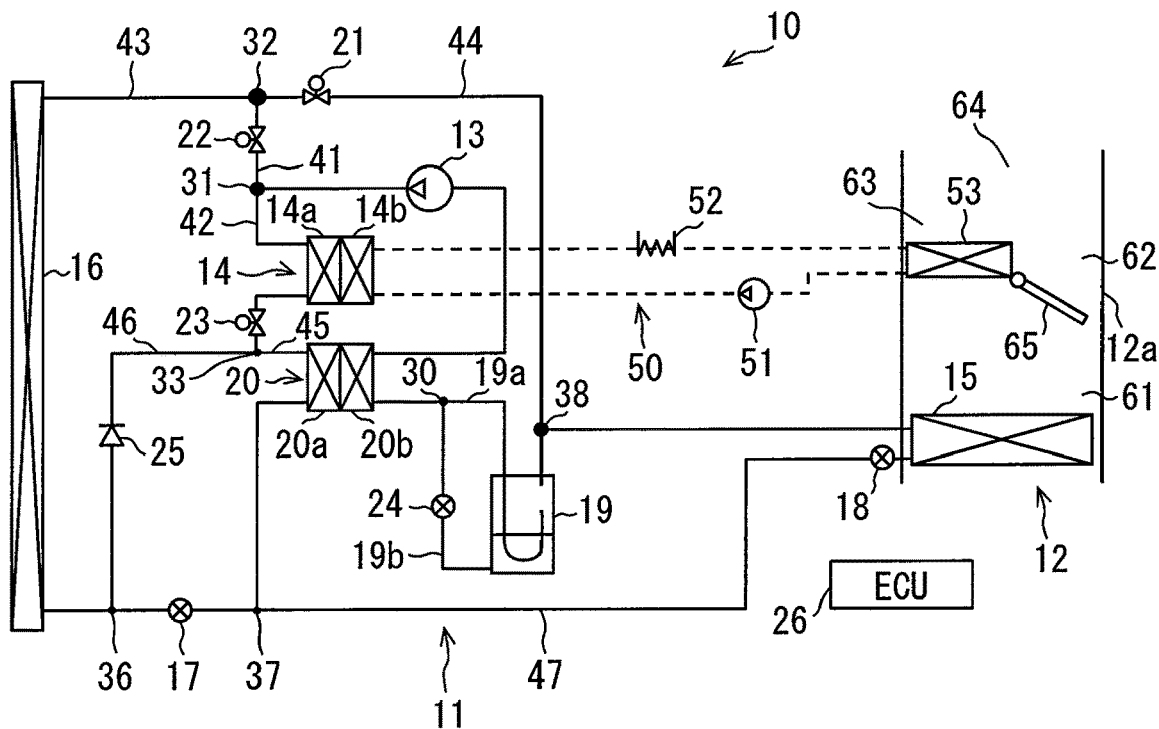
FIG. 1 is a diagram illustrating a heat pump system according to a first embodiment of the present disclosure.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment of the present disclosure will be described with reference to FIGS. 1 to 12. A heat pump system 10 of the present embodiment includes a heat pump cycle 11 and an air conditioning unit 12, and performs an air conditioning by using components illustrated in FIG. 1. The heat pump system 10 can be used in a vehicle such as a hybrid vehicle, an electric vehicle, and a fuel cell vehicle. The heat pump system 10 is configured to perform at least a heating operation and a cooling operation. The heat pump cycle 11 shown in FIG. 1 is an example of the heat pump cycle 11. In the heating operation, the refrigerant flow is a heating operation cycle described below. In the cooling operation, the refrigerant flow is a cooling operation cycle described below. In a dehumidifying operation, the refrigerant flow is a dehumidifying operation cycle described below.

First, the heat pump cycle 11 is described. The heat pump cycle 11 is constituted by refrigerant pipes through which the refrigerant flows. The heat pump cycle 11 is capable of performing cooling and heating a vehicle compartment through an evaporator for cooling and a condenser for heating by using phase transitions of the refrigerant such as R134a and R1234yf.

As shown in FIG. 1, the heat pump cycle 11 includes a compressor 13, a condenser 14, an evaporator 15, an outdoor unit 16, a heating decompressor 17, a cooling decompressor 18, an accumulator 19, an internal heat exchanger 20, a heating high-pressure side opening-closing portion 21, a cooling opening-closing portion 22, a heating low-pressure side opening-closing portion 23, and a flow rate regulator 24. The heat pump cycle 11 is constituted by linking these components with each other by pipes.

First, configurations of pipes are described. A first branch portion 31 is provided on a discharge side of the compressor 13. The flow passage is branched, at the first branch portion 31, into a first flow passage 41 connected to the cooling opening-closing portion 22 and a second flow passage 42 connected to the condenser 14. A second branch portion 32 is located downstream of the cooling opening-closing portion 22. The flow passage is branched, at the second branch portion 32, into a third flow passage 43 connected to the outdoor unit 16 and a fourth flow passage 44 connected to the accumulator 19. The heating high-pressure side opening-closing portion 21 is provided in the fourth flow passage 44. The heating low-pressure side opening-closing portion 23 and a third branch portion 33 are located downstream of the condenser 14 in this order. The flow passage is branched, at third branch portion 33, into a fifth flow passage 45 connected to a high-pressure passage 20a of the internal heat exchanger 20 and a sixth flow passage 46 connected to a sixth branch portion 36.

The outdoor unit 16 is connected to an upstream side of the evaporator 15 through a seventh flow passage 47. The sixth branch portion 36 is located in a part of the seventh flow passage 47 close to the outdoor unit 16. The seventh branch portion 37 is located in a part of the seventh flow passage 47 closer to the evaporator than the sixth branch portion 36. The heating decompressor 17 is located in the seventh flow passage 47 and between the sixth branch portion 36 and the seventh branch portion 37.

The cooling decompressor 18 is located in the seventh flow passage 47 and between the seventh branch portion 37 and the evaporator 15. A check valve 25 is provided in the sixth flow passage 46. The check valve 25 allows the refrigerant to flow from the sixth branch portion 36 toward the third branch portion 33 and stops a flow from the third branch portion 33 toward the sixth branch portion 36. A downstream side of the high-pressure passage 20a of the internal heat exchanger 20 is connected to the seventh branch portion 37.

An eighth branch portion 38 is located downstream of the evaporator 15. The eighth branch portion 38 is located in the fourth flow passage 44 and between the heating high-pressure side opening-closing portion 21 and the accumulator 19. A downstream side of the accumulator 19 is connected to a low-pressure passage 20b of the internal heat exchanger 20. A downstream side of the low-pressure passage 20b of the internal heat exchanger 20 is connected to an intake side of the compressor 13.

Next, actuations of components of the heat pump cycle 11 are described. The compressor 13 is an electric compressor driven by electricity supplied from a vehicle battery (not shown) that is a rechargeable battery, and the compressor 13 discharges the refrigerant after compressing the refrigerant to be high temperature and high pressure. A rotation speed of the compressor 13 can be controlled. The rotation speed of a motor of the compressor is controlled by alternating current whose frequency is adjusted by an inverter, and accordingly a refrigerant discharge amount of the compressor 13 is controlled. A direct current is supplied from the vehicle battery to the inverter, and the inverter is controlled by a control unit 26.

The condenser 14 includes a high-temperature passage 14a through which the refrigerant flows and a water passage 14b through which water or a coolant for a vehicle flows. In the heating operation, the high-temperature and high-pressure refrigerant discharged by the compressor 13 flows into the condenser 14. The condenser 14 allows the high-temperature and high-pressure refrigerant to exchange heat with water to heat water. The water passage 14b constitutes a part of a water cycle 50. A liquid sending portion 51, a heating portion 52, and a radiator 53 are provided in the water cycle 50. Water is circulated in the water cycle 50 by the liquid sending portion 51. The heating portion 52 heats the circulating water. The heating portion 52 is heated by electricity, for example, and the heating portion 52 helps heating of the condenser 14. The radiator 53 is provided in an air passage 61 communicating with the vehicle compartment. The radiator 53 allows the circulating water to exchange heat with the air to heat the air.

The heating decompressor 17 is an expansion valve that decompresses the refrigerant cooled by the condenser 14 in the heating operation. An opening degree of the heating decompressor 17 can be controlled to be closed. Specifically, the heating decompressor 17 is an electric variable throttle and includes a valve body whose opening degree can be changed, and an electric actuator, which is constituted by a stepper motor that changes the opening degree of the valve body.

The cooling decompressor 18 is an expansion valve that decompresses the refrigerant flowing into the evaporator 15 in the cooling operation. An opening degree of the cooling decompressor 18 can be controlled to be closed. The cooling decompressor 18 is an electric variable throttle similar to the heating decompressor 17 described above.

The outdoor unit 16 is located outside the vehicle compartment and is a heat exchanger that exchanges heat between the refrigerant and the outside air that is forcibly blown by an outdoor blower (not shown) or a travelling wind. In the heating operation, the refrigerant decompressed by the heating decompressor 17 flows into the outdoor unit 16 and absorbs heat from the outside air. In the cooling operation, the refrigerant compressed by the compressor 13 flows into the outdoor unit 16 and dissipates heat to the outside air. In the outdoor unit 16, multiple tubes are arranged to be spaced from each other. The refrigerant flowing into the outdoor unit 16 is branched into and flows through the multiple tubes to exchange heat with the outside air flowing outside the tubes.

The evaporator 15 is provided in the air passage 61 communicating with the vehicle compartment. The evaporator 15 is located upstream of the radiator 53. In the cooling operation, the evaporator 15 cools the air passing therethrough by heat absorption effect of the refrigerant flowing in the evaporator 15.

The accumulator 19 separates the refrigerant into a gas refrigerant and a liquid refrigerant. The accumulator 19 includes a gas refrigerant passage 19a, through which the gas refrigerant is discharged, and a liquid refrigerant passage 19b, through which the liquid refrigerant is discharged. The gas refrigerant passage 19a and the liquid refrigerant passage 19b are connected to the low-pressure passage 20b of the internal heat exchanger 20. Specifically, the gas refrigerant passage 19a and the liquid refrigerant passage 19b join together at a junction portion 30 located upstream of the internal heat exchanger 20, and the junction portion 30 communicates with an inflow side of the low-pressure passage 20b of the internal heat exchanger 20. The flow rate regulator 24, which adjusts a flow rate of the liquid refrigerant flowing from the accumulator 19 to the internal heat exchanger 20, is provided in the liquid refrigerant passage 19b. The flow rate regulator 24 is controlled by the control unit 26 to adjust the flow rate of the liquid refrigerant.

The internal heat exchanger 20 includes the high-pressure passage 20a, through which the high-pressure refrigerant flows, and the low-pressure passage 20b, through which the low-pressure refrigerant flows. In the internal heat exchanger 20, the refrigerant flowing through the high-pressure passage 20a exchanges heat with the refrigerant flowing through the low-pressure passage 20b. An upstream side of the low-pressure passage 20b is connected to a downstream side of the accumulator 19. A downstream side of the low-pressure passage 20b is connected to the intake side of the compressor 13. An upstream side of the high-pressure passage 20a is connected to the fifth flow passage 45. A downstream side of the high-pressure passage 20a is connected to the seventh branch portion 37.

The cooling opening-closing portion 22, the heating high-pressure side opening-closing portion 21, and the heating low-pressure side opening-closing portion 23 open and close pipes. The control unit 26 controls opening-closing conditions of the opening-closing portions 21, 22, 23. The control unit 26 controls the opening-closing conditions of the opening-closing portions 21, 22, 23 and the decompressors 17, 18 to change flow pathways of the refrigerant. Accordingly, the opening-closing portions 21, 22, 23 and the decompressors 17, 18 function as flow pathway changing portions which change flow pathways of the refrigerant.

Next, the air conditioning unit 12 is described below. The air conditioning unit 12 is a unit for supplying a conditioned air to the vehicle compartment. The air conditioning unit 12 includes an air conditioning case 12a as a casing, and the air conditioning unit 12 is located in an instrument panel provided in a front side of the vehicle compartment, for example. The air conditioning case 12a includes therein the air passage 61 through which the air flows, and the air conditioning case 12a has, on one side, an outside air inlet and an inside air inlet which are air intake ports. A face air outlet, a foot air outlet, and a defogger air outlet, through which the conditioned air blown to the vehicle compartment flows, are provided on another side of the air passage 61. The air conditioning case 12a is constituted by multiple casing members, and the air conditioning case 12a is a resin mold product whose material is polypropylene, for example.

The face air outlet is an opening through which the conditioned air is blown toward upper bodies of occupants in the vehicle compartment. The foot air outlet is an opening through which the conditioned air is blown toward feet of the occupants in the vehicle compartment. The defogger air outlet is an opening through which the conditioned air is blown toward an inner surface of a windshield. The air outlets communicate with the vehicle compartment through blowing ducts and are opened or closed by switching doors depending on a blowing mode.

The air conditioning case 12a includes, on the one side, an inside-outside air switching casing and an air conditioning blower. The inside-outside air switching casing includes an inside-outside air switching door. An air intake portion of the air conditioning blower is connected to the outside air inlet and the inside air inlet. The inside air inlet and the outside air inlet are opened or closed by the inside-outside air switching door depending on an air inlet mode, and opening degrees of the inside air inlet and the outside air inlet can be flexibly changed by the inside-outside air switching door. An angle of the inside-outside air switching door is controlled by an actuator such as a servo motor, and at least one of the outside air and the inside air is drawn into the air conditioning case 12a through the air intake portion. The air inlet mode can be switched between an inside air circulation mode, an outside air introduction mode, and a middle mode doing both of the inside air circulation and the outside air introduction.

An air outlet of the air conditioning blower is connected to the air passage 61. The air passage 61 includes a passage across which the evaporator 15 extends, a cool air passage 62 and a warm air passage 63 which are located downstream of the evaporator 15 with regard to the blown air, and an air mix space 64 in which the air flowing through the cool air passage 62 and the warm air passage 63 are mixed. These components are arranged in this order with regard to the airflow. The evaporator 15 is located downstream of the air conditioning blower, and the radiator 53 and an air mix door 65 are located downstream of the evaporator 15.

The evaporator 15 is arranged to cross the entire part of the air passage 61 located immediately downstream of the air conditioning blower, and all the air blown from the air conditioning blower pass through the evaporator 15. The radiator 53 is provided in the warm air passage 63, and the warm air passage 63 is opened or closed by the air mix door 65. The air mix door 65 is a flow-rate adjusting device that adjusts a flow rate of the air passing through the radiator 53 relative to the air passing through the evaporator 15. The air passing through the evaporator 15 is divided, by the air mix door 65, into the air passing through the radiator 53 and the air bypassing the radiator 53, and the flow rate of the air passing through or bypassing the radiator 53 can be flexibly changed by the air mix door 65.

The control unit 26 is a control portion and is indicated as ECU (Electronic Control Unit) in FIG. 1. The control unit 26 controls actuations of components of the heat pump cycle 11, the outdoor blower, the inside-outside air switching door and the air mix door 65, for example. In FIG. 1, connection lines for the controls are omitted.

Figure 2:
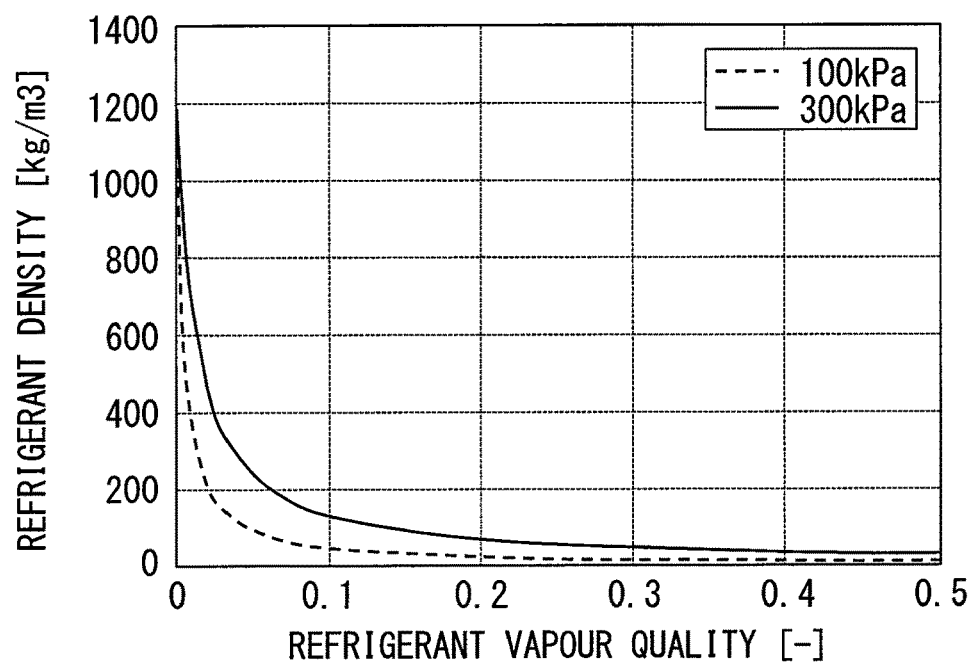
Figure 3:
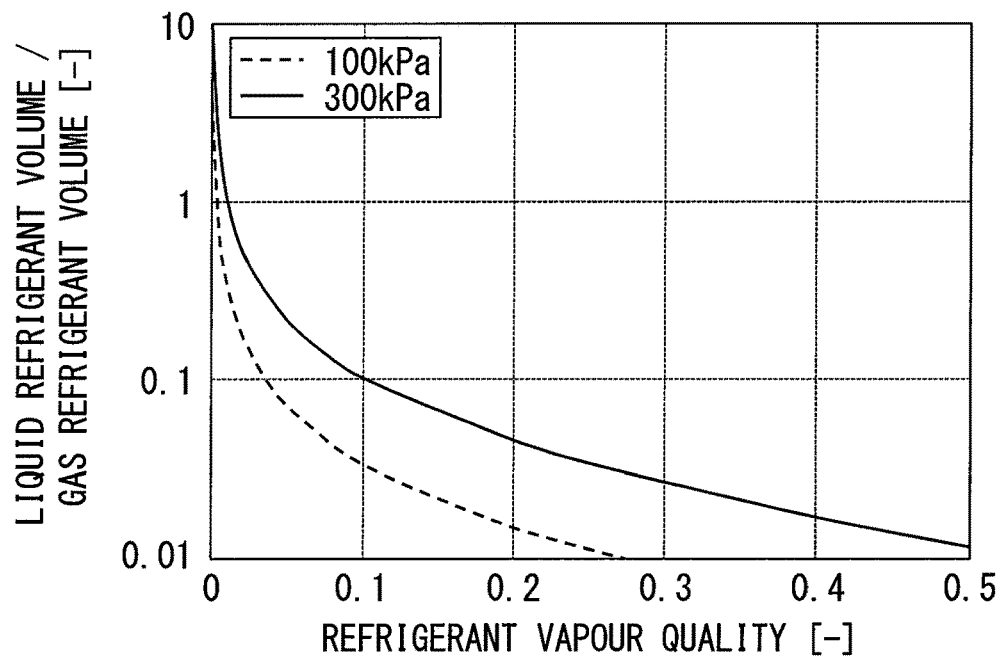
FIG. 3 is a graph showing a volume fraction of the refrigerant R134a in liquid phase.

Next, the refrigerant used in the heat pump cycle 11 is described with reference to FIGS. 2, 3. In the present embodiment, a refrigerant vapour quality is decreased when the outdoor unit 16 is used as an evaporator, and the refrigerant in approximately single liquid phase flows into the outdoor unit 16, and accordingly the refrigerant is uniformly distributed in the outdoor unit 16. For this reason, it is necessary to decrease volume of the gas refrigerant and increase volume of the liquid refrigerant. The vapour quality of the refrigerant flowing into the outdoor unit 16 is required to be, empirically, equal to or smaller than 0.15, preferably smaller than 0.1.

When the outdoor unit 16 is used as an evaporator in the heating operation, a heat absorption from the low-temperature outside air is needed, and accordingly it is required that the refrigerant temperature is lower than that in usual cooling operation. For example, when the temperature of the outside air is −20 degrees Celsius, the temperature of the refrigerant flowing through the outdoor unit 16 is necessarily required to be lower than the temperature of the outside air. When R134a is used as the refrigerant, for example, and when the refrigerant temperature is approximately −26.4 degrees Celsius, the refrigerant pressure is approximately 100 kPa. In contrast, in cooling operation in summer, the temperature of the outside air is high. When the temperature of the refrigerant in the evaporator 15 is 0.7 degrees Celsius, the refrigerant pressure is approximately 300 kPa. The lower the refrigerant pressure is, the larger the ratio of the density of the liquid refrigerant to the density of the gas refrigerant is, as shown in FIG. 3.

In order to uniformly distribute the refrigerant in the outdoor unit 16 while the heat pump is actuated, the refrigerant vapour quality is required to be approximately 0. As shown in FIGS. 2 and 3, the lower the refrigerant pressure is, the lower the refrigerant density is. When the mass flow rate is constant, the volume flow rate increases, and accordingly the refrigerant pressure loss increases.

When the outdoor unit 16 functions as an evaporator in the heating operation, the refrigerant pressure loss largely affects the performance, and accordingly it is necessary to decrease the pressure loss. When the vapour quality of the refrigerant is decreased before flowing into the outdoor unit 16, the refrigerant distribution is improved, and the performance of the outdoor unit 16 is improved due to the decrease of the pressure loss. For example, when the pressure is 100 kPa and the refrigerant vapour quality is between 0 and 0.5, the average density of the refrigerant R134a is approximately 52.3 kg/m3. When the vapour quality is between 0.5 and 1 in the same situation, the average density is approximately 7.3 kg/m3. The ratio of the density is approximately 7.3. Accordingly, when the liquid refrigerant increases, the pressure loss can be decreased due to the increase of the average density.

Next, actuations of the heat pump system 10 are described below. When the operation mode is in the cooling operation, the control unit 26 controls the air mix door 65 to close the warm air passage 63. The control unit 26 controls the cooling opening-closing portion 22 to be opened, and the control unit 26 controls the heating high-pressure side opening-closing portion 21, the heating low-pressure side opening-closing portion 23 and the heating decompressor 17 to be closed.

Figure 4:
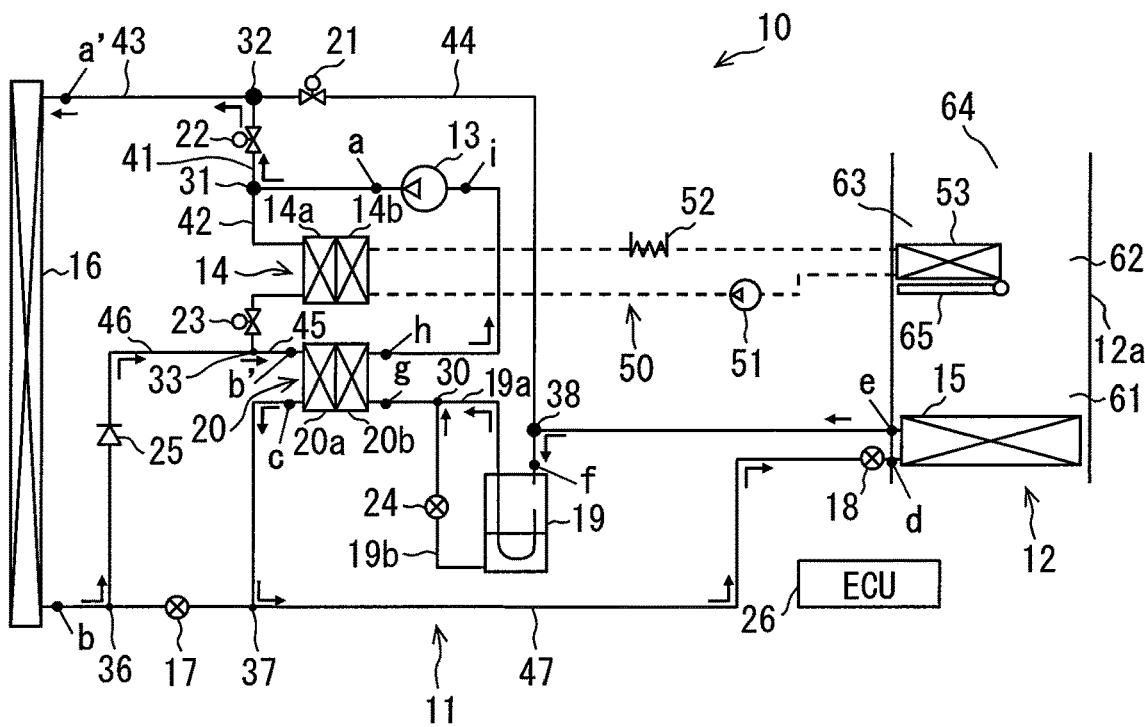
FIG. 4 is a diagram showing a flow of the refrigerant in a cooling operation according to the first embodiment.

According to this, in the cooling operation, the refrigerant flows as indicated by arrows shown in FIG. 4. That is, in the cooling pathway that is the refrigerant pathway in the cooling operation, the refrigerant flows through the compressor 13, the outdoor unit 16, the high-pressure passage 20a of the internal heat exchanger 20, the cooling decompressor 18, the evaporator 15, the accumulator 19, the low-pressure passage 20b of the internal heat exchanger 20, and the compressor 13, in this order.

Figure 5:
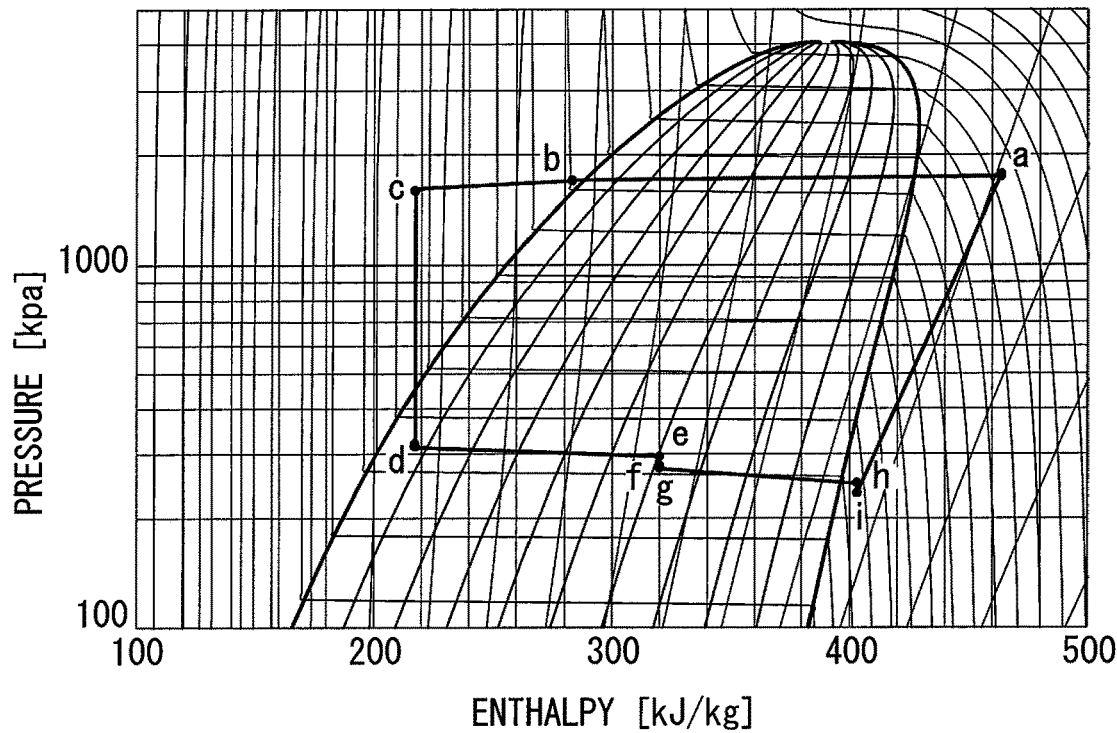
FIG. 5 is a graph showing an example of cycle actuation points in the cooling operation on a Mollier diagram, according to the first embodiment.

Next, actuations of the components and the flow of the refrigerant are described with reference to the Mollier diagram shown in FIG. 5. The high-pressure gas refrigerant (point a) discharged by the compressor 13 flows through the first flow passage 41 and the third flow passage 43, and the refrigerant flows into the outdoor unit 16. The high-pressure gas refrigerant flowing into the outdoor unit 16 dissipates heat to the outside air and is condensed (point b). The liquid refrigerant flowing out of the outdoor unit 16 flows into the high-pressure passage 20a of the internal heat exchanger 20 through the check valve 25.

The liquid refrigerant flowing into the high-pressure passage 20a of the internal heat exchanger 20 exchanges heat with the low-temperature refrigerant flowing through the low-pressure passage 20b of the internal heat exchanger 20, and is subcooled (point c). The refrigerant flowing out of the internal heat exchanger 20 is expanded in the cooling decompressor 18 to become a low-temperature and low-pressure two phase refrigerant, and flows into the evaporator 15 (point d). The air passing through the evaporator 15 is cooled due to evaporation of the liquid refrigerant, and the cooled air cools the vehicle compartment.

The two-phase refrigerant (point e) flowing out of the evaporator 15 passes through the eighth branch portion 38, and flows into the accumulator 19 (point f). The gas refrigerant of the refrigerant divided by the accumulator 19 passes through the gas refrigerant passage 19a and joins together, at the junction portion 30, with the liquid refrigerant passing through the liquid refrigerant passage 19b (point g). The refrigerant flows into the low-pressure passage 20b of the internal heat exchanger 20, and exchanges heat with the refrigerant flowing out of the outdoor unit 16, as described above, to be heated (point h). The gas refrigerant flowing out of the internal heat exchanger 20 flows into the compressor 13 (point i).

In the present embodiment, the average vapour quality of the refrigerant flowing through the evaporator 15 can be decreased by using the internal heat exchanger 20 in the cooling operation. According to this, the refrigerant pressure loss in the evaporator 15 can be decreased, and superheat is not generated in the evaporator 15. Accordingly, the performance of the evaporator 15 is improved, and the efficiency of the system can be improved.

Next, actuations in the heating operation are described below. In the heating operation, the control unit 26 controls the opening degree of the air mix door 65 such that the air flows into the warm air passage 63. The control unit 26 controls the cooling opening-closing portion 22 and the cooling decompressor 18 to be closed, and the control unit 26 controls the heating high-pressure side opening-closing portion 21 and the heating low-pressure side opening-closing portion 23 to be opened.

Figure 6:
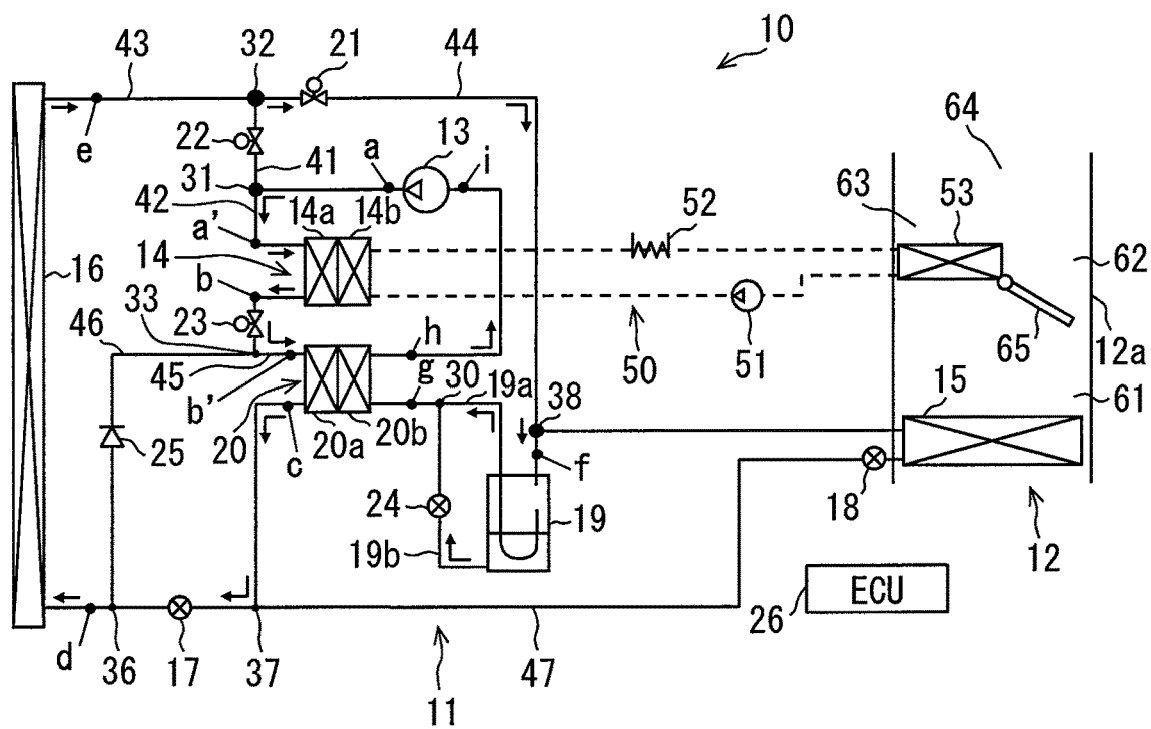
FIG. 6 is a diagram showing a flow of the refrigerant in a heating operation according to the first embodiment.

According to this, in the heating operation, the refrigerant flows as indicated by arrows shown in FIG. 6. That is, in the cooling pathway that is the refrigerant pathway in the heating operation, the refrigerant flows through the compressor 13, the condenser 14, the high-pressure passage 20a of the internal heat exchanger 20, the heating decompressor 17, the outdoor unit 16, the accumulator 19, the low-pressure passage 20b of the internal heat exchanger 20, and the compressor 13, in this order.

Figure 7:
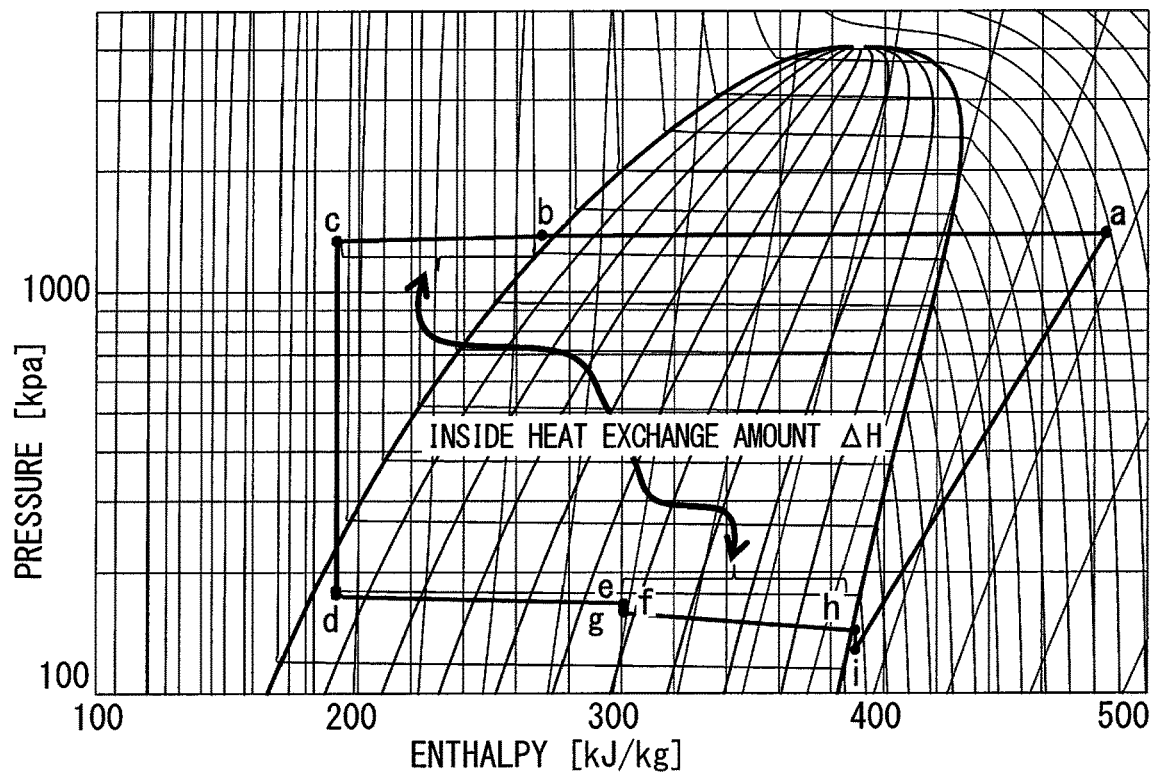
FIG. 7 is a graph showing an example of cycle actuation points in the heating operation on a Mollier diagram, according to the first embodiment.
Figure 8:
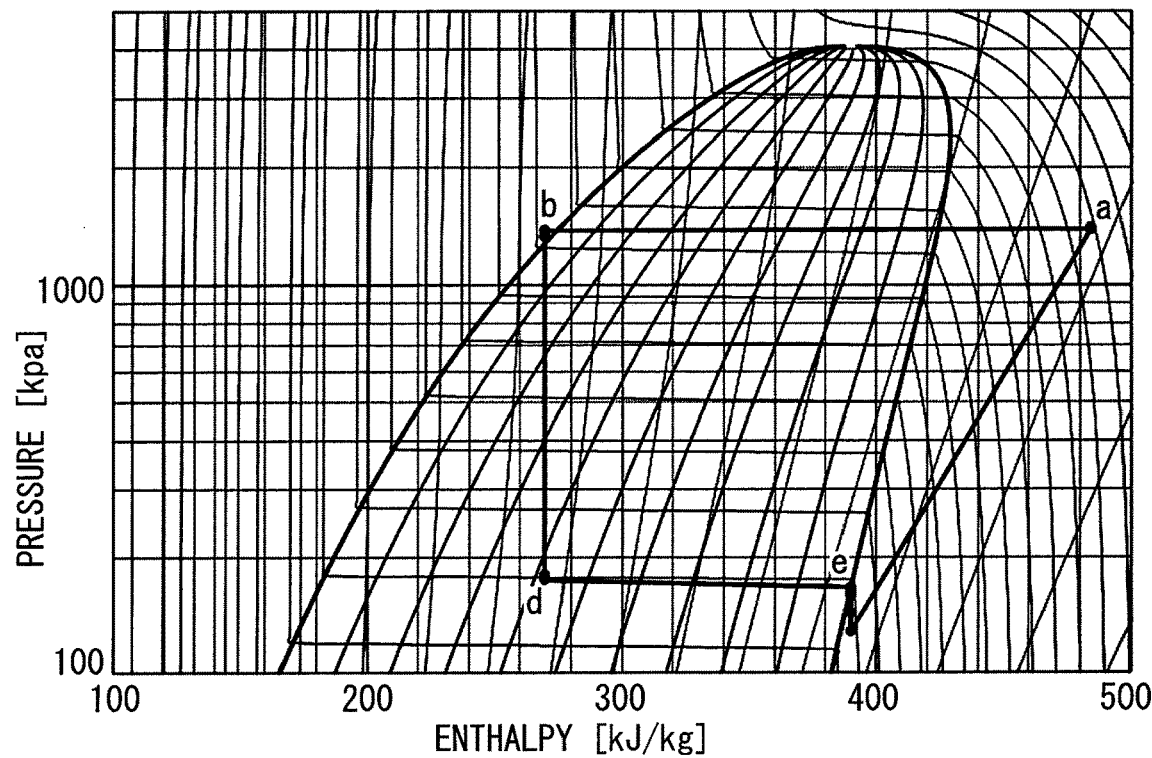
FIG. 8 is a graph showing an example of cycle actuation points without the inside heat exchange on a Mollier diagram, according to a comparative example of the present disclosure.

Next, actuations of the components and the flow of the refrigerant are described with reference to the Mollier diagram shown in FIG. 7. The high-pressure gas refrigerant (point a) discharged by the compressor 13 flows through the second flow passage 42, and the refrigerant flows into the condenser 14. The high-pressure gas refrigerant flowing into the condenser 14 dissipates heat to the cooling water and is condensed (point b). The liquid refrigerant flowing out of the condenser 14 flows into the high-pressure passage 20a of the internal heat exchanger 20 through the heating low-pressure side opening-closing portion 23.

The liquid refrigerant flowing into the high-pressure passage 20a of the internal heat exchanger 20 exchanges heat with the low-temperature refrigerant flowing through the low-pressure passage 20b of the internal heat exchanger 20, and is subcooled (point c). The refrigerant flowing out of the internal heat exchanger 20 is expanded in the heating decompressor 17 to become a low-temperature and low-pressure two phase refrigerant, and flows into the outdoor unit 16 (point d). The liquid refrigerant flowing in the outdoor unit 16 is evaporated by the outside air passing through the outdoor unit 16 and absorbs heat from the outside air (point e).

The two-phase refrigerant flowing out of the outdoor unit 16 passes through the heating high-pressure side opening-closing portion 21 and the eighth branch portion 38, and flows into the accumulator 19 (point f). The gas refrigerant of the refrigerant divided by the accumulator 19 passes through the gas refrigerant passage 19a and joins together, at the junction portion 30, with the liquid refrigerant passing through the liquid refrigerant passage 19b (point g). The refrigerant flows into the low-pressure passage 20b of the internal heat exchanger 20, and exchanges heat with the refrigerant flowing out of the condenser 14, as described above, to be heated (point h). The gas refrigerant flowing out of the internal heat exchanger 20 flows into the compressor 13 (point i).

In the present embodiment, the liquid refrigerant flowing out of the condenser 14 is subcooled by the internal heat exchanger 20, and the enthalpy is decreased due to the inside heat exchange such that the vapour quality of the refrigerant at the inlet of the outdoor unit 16 is around 0 (point c). According to this, since the volume fraction of the liquid refrigerant at the inlet of the outdoor unit 16 is large, the refrigerant distribution to multiple tubes constituting the outdoor unit 16 can be improved. Accordingly, even when the refrigerant pathway is provided as a single pathway and multiple tubes are provided in the outdoor unit 16, the refrigerant can be uniformly distributed, and accordingly the entire part of the outdoor unit 16 can be utilized effectively. Moreover, since the vapour quality of the refrigerant at the outlet of the outdoor unit 16 is about 0.6, superheat of the liquid refrigerant is unlikely to occur around the outlet of the outdoor unit 16. Since the refrigerant vapour quality in the outdoor unit 16 is decreased by the internal heat exchanger 20, the refrigerant can be uniformly distributed while the refrigerant pressure loss is decreased, and accordingly the evaporation performance can be improved.

Actuation points shown in the Mollier diagram (FIG. 7) according to the present embodiment and actuation points shown in the Mollier diagram (FIG. 8) of a heat pump according to a comparative example that does not include the internal heat exchanger 20 are compared below. Since the enthalpy difference between the inlet of the outdoor unit 16 and the outlet of the outdoor unit 16 is almost the same in both systems, the amount of the heat absorption of the outdoor unit 16 is the same in both systems when the refrigerant flow rate is the same. If the same outdoor unit 16 is used in both systems, in the system of the comparative example, the vapour quality of the refrigerant flowing into the outdoor unit 16 is about 0.4 (point d), and the vapour quality of the refrigerant flowing out of the outdoor unit 16 is about 1 (point e). In contrast, in the present embodiment, the vapour quality of the refrigerant flowing into the outdoor unit 16 is about 0 (point d), and the vapour quality of the refrigerant flowing out of the outdoor unit 16 is about 0.6 (point e).

This difference in the actuation range largely affects the average density of the refrigerant. Specifically, in the actuation range of the present embodiment, the average refrigerant density is 2.7 times as large as that in the actuation range of the system of the comparative example. That is, even when the outdoor unit 16, the enthalpy difference, the refrigerant mass flow rate, and the actuation range are the same as the present embodiment, the pressure loss generated in the outdoor unit 16 of the comparative example is different from the present embodiment. The present embodiment can largely reduce the refrigerant pressure loss in the outdoor unit 16.

In the system of the comparative example, large pressure loss occurs in a pipe portion extending from the outdoor unit 16 to the accumulator. In contrast, in the present embodiment, since the vapour quality is about 0.6, the refrigerant density is about 1.7 times as large as the comparative example, and accordingly the speed of the refrigerant is reduced and the pressure loss in the pipes can be reduced.

When the internal heat exchanger 20 in which the pressure loss is within the above-described range is used, and when a connection pipe between the outlet of the internal heat exchanger 20 and the compressor 13 is short, the refrigerant pressure loss in the present embodiment including the internal heat exchanger 20 can be reduced compared to the system of the comparative example. Accordingly, the evaporation performance in low temperature can be improved. It is preferable that the pipe length between the internal heat exchanger 20 and the compressor 13 is shorter than the pipe length between the internal heat exchanger 20 and the accumulator 19. Since the refrigerant vapour quality in the outdoor unit 16 is low, the refrigerant pressure loss in the outdoor unit 16 can be reduced, and accordingly the evaporation performance can be improved.

Next, actuations in a dehumidification-heating operation are described below. In the dehumidification-heating operation, the control unit 26 controls the opening degree of the air mix door 65 such that the air flows into the warm air passage 63. The control unit 26 controls the cooling opening-closing portion 22 to be closed, and the control unit 26 controls the heating high-pressure side opening-closing portion 21 and the heating low-pressure side opening-closing portion 23 to be opened.

Figure 9:
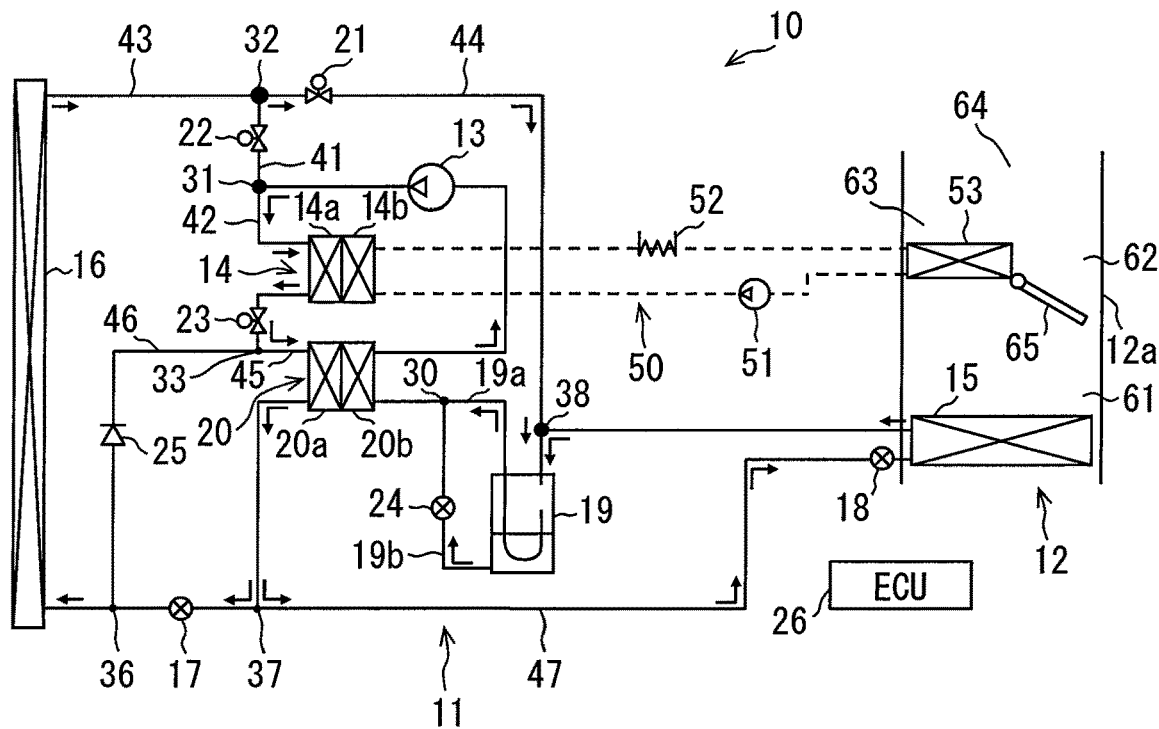
FIG. 9 is a diagram showing a flow of the refrigerant in a dehumidification-heating operation according to the first embodiment.

According to this, the refrigerant in the dehumidification-heating operation flows as indicated by arrows in FIG. 9. Basically, the flow is the same as the above-described heating operation, but the cooling decompressor 18 is opened, and the refrigerant is evaporated in the evaporator 15, too. According to this, the air is dehumidified by the evaporator 15, and the cooled air is heated by the radiator 53 to heat the vehicle compartment.

In the dehumidification-heating operation shown in FIG. 9, an evaporator pressure regulator (abbrev. EPR) is required as a pressure regulation portion between the accumulator 19 and the evaporator 15. The EPR differentiates the evaporation temperatures between the outdoor unit 16 and the evaporator 15. Since the evaporator 15 dehumidifies, the refrigerant temperature is about 0 degrees Celsius, and the pressure is about 300 kPa. The refrigerant temperature in the outdoor unit 16 depends on the temperature of the outside air. For example, when the temperature of the outside air in −10 degrees Celsius, the refrigerant temperature is about −15 degrees Celsius and the refrigerant pressure is about 150 kPa. That is, the EPR is used for adjusting the refrigerant pressure on the upstream side of the eighth branch portion 38 located upstream of the accumulator 19, i.e. for controlling the refrigerant flow rate flowing into the evaporator 15.

Figure 10:
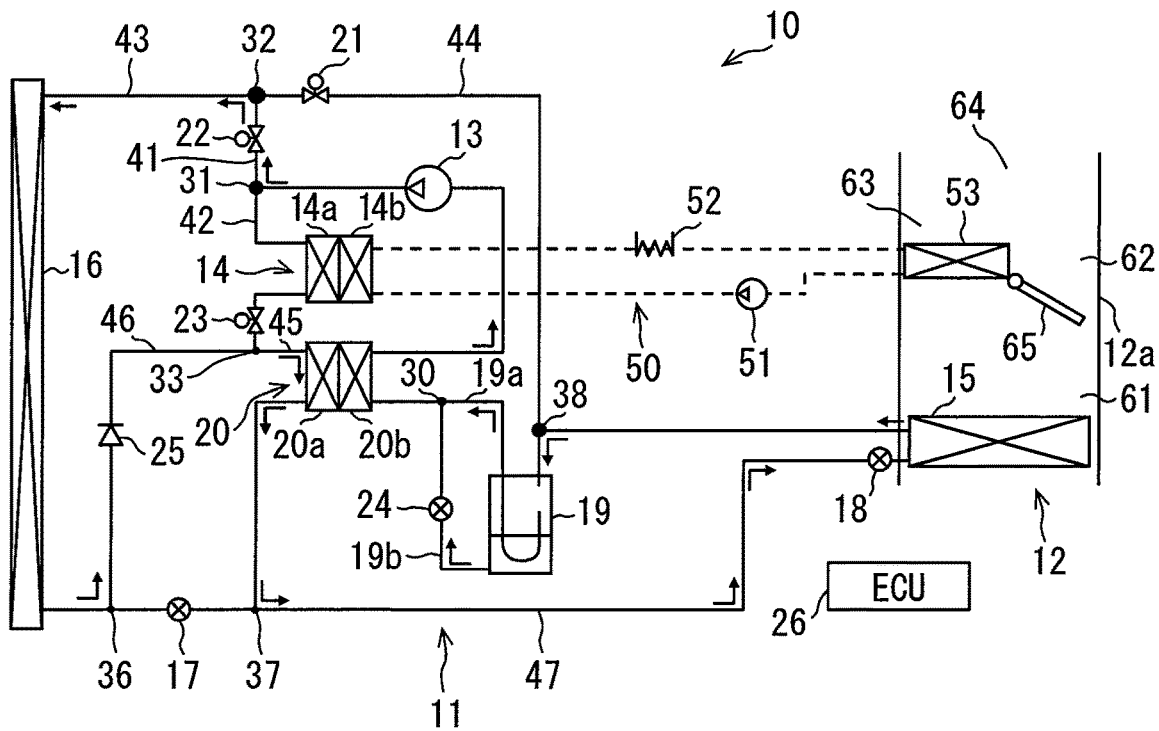
FIG. 10 is a diagram showing another flow of the refrigerant in a dehumidification-heating operation according to the first embodiment.
Figure 11:
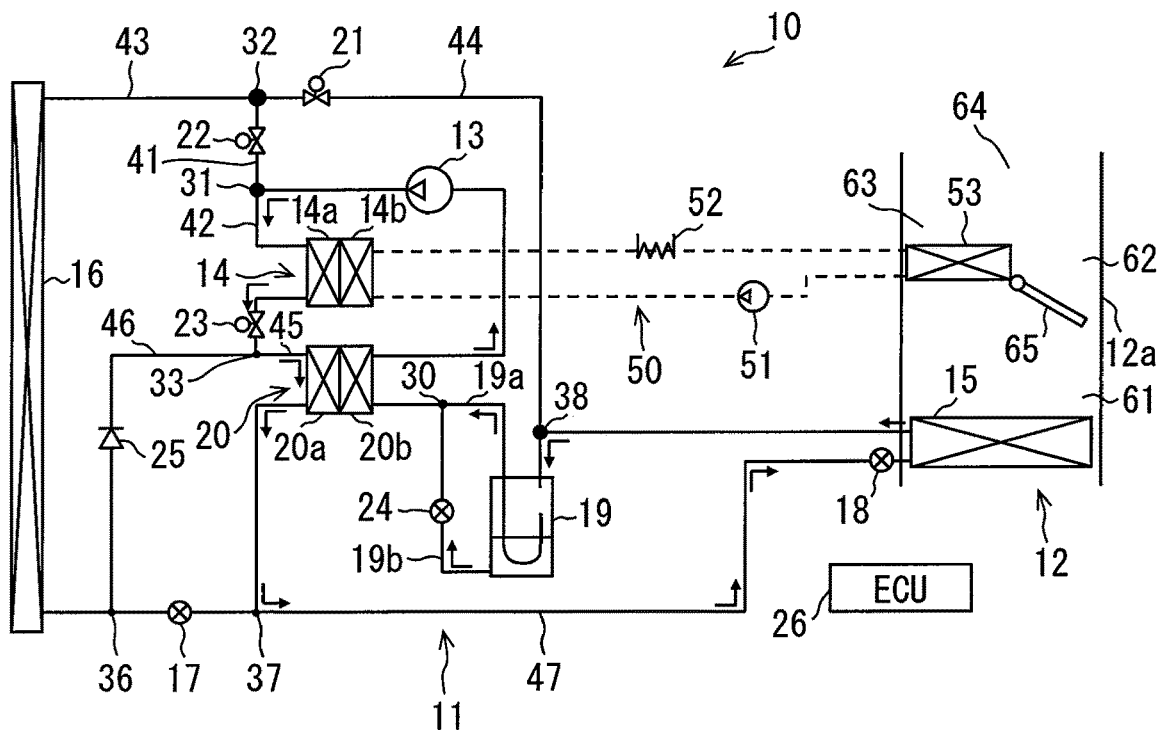
FIG. 11 is a diagram showing another flow in the dehumidification-heating operation according to the first embodiment.

In the dehumidification-heating operation, the refrigerant may flow in different pathways as shown in FIGS. 10 and 11. In the refrigerant flow shown in FIG. 10, the control unit 26 controls the cooling opening-closing portion 22 to be opened, and the control unit 26 controls the heating high-pressure side opening-closing portion 21, the heating low-pressure side opening-closing portion 23, and the heating decompressor 17 to be closed. Moreover, the control unit 26 controls the heating portion 52 to heat the circulating water.

According to this, the refrigerant in the dehumidification-heating operation flows as indicated by arrows shown n FIG. 10. Basically, the flow is the same as the above-described cooling operation, but the opening degree of the air mix door 65 is controlled such that the air passes through the radiator 53. According to this, the air is dehumidified by the evaporator 15, and the temperature of the air decreases. After that, the air passes through the radiator 53 to be heated, and the air is sent to the vehicle compartment. In this case, the above-described EPR is not necessary.

Next, in the refrigerant flow shown in FIG. 11, the control unit 26 controls the heating low-pressure side opening-closing portion 23 to be opened, and the control unit 26 controls the heating high-pressure side opening-closing portion 21, the cooling opening-closing portion 22, and the heating decompressor 17 to be closed.

According to this, the refrigerant in the dehumidification-heating operation flows as indicated by arrows shown in FIG. 11. Basically, the flow is similar to the above-described heating operation, but the refrigerant flows through the evaporator 15 instead of the outdoor unit 16 to dehumidify the air. According to this, the air is dehumidified by the evaporator 15. In this case, the above-described EPR is not necessary. In the dehumidification-heating operation, the refrigerant flow may be switched, based on time, between the flow of FIG. 10 and the flow of FIG. 11.

Next, controls of the flow rate regulator 24 located between the accumulator 19 and the internal heat exchanger 20 are described with reference to FIG. 7. In the heating operation, the control unit 26 estimates the vapour quality by measuring the refrigerant pressure and one of the refrigerant temperature and the pipe temperature, and the control unit 26 controls the flow rate regulator 24 such that the vapour quality becomes closer to a predetermined target value.

Specifically, the vapour quality of the refrigerant drawn into the compressor 13 is preferably about 1, i.e. gas refrigerant (point i). The rotation speed of the compressor 13 is determined based on the point i and the target air temperature. The condition of the refrigerant at the outlet of the condenser 14 is determined based on the thermal load (point b).

Next, maximum inside heat exchange amount ΔH is determined based on the enthalpy at the outlet of the condenser 14, the condition of the outside air, the refrigerant flow rate, and the capacity of the internal heat exchanger 20. The opening degree of the flow rate regulator 24 is controlled such that the superheat of the refrigerant drawn into the compressor 13 is just secured, i.e. the vapour quality is about 1, and the refrigerant vapour quality at the inlet of the outdoor unit 16 is decreased as far as possible.

As described above, in the heating pathway, the heat pump system 10 of the present embodiment is capable of decreasing the enthalpy of the refrigerant condensed in the condenser 14 by the heat exchange in the internal heat exchanger 20. According to this, the vapour quality of the refrigerant at the inlet of the outdoor unit 16 can be decreased. Since the vapour quality of the refrigerant at the inlet of the outdoor unit 16 can be decreased, the volume fraction of the liquid refrigerant flowing into the outdoor unit 16 increases, and accordingly the refrigerant distribution in the outdoor unit 16 can be improved. Accordingly, the performance of the outdoor unit 16 in the heat exchange can be improved.

In the cooling pathway, the refrigerant cooled by the outdoor unit 16 can be further cooled by exchanging heat, in the internal heat exchanger 20, with the liquid refrigerant flowing from the accumulator 19. Subsequently, the refrigerant passing through the high-pressure passage 20a of the internal heat exchanger 20 flows through the cooling decompressor 18 and the evaporator 15. Since the refrigerant is cooled in the internal heat exchanger 20, the average vapour quality of the refrigerant flowing through the evaporator 15 can be decreased. According to this, the refrigerant pressure loss in the evaporator 15 can be decreased, and the superheat is limited in the evaporator 15, and accordingly the performance of the evaporator 15 is improved and the efficiency of the system can be improved.

In the present embodiment, the flow rate regulator 24 that adjusts the flow rate of the liquid refrigerant flowing from the accumulator 19 to the internal heat exchanger 20 is provided. Since the flow rate regulator 24 is provided, the inside heat exchange amount in the internal heat exchanger 20 can be controlled. According to this, the vapour quality at the inlet of the outdoor unit 16 can be controlled to be small.

In the present embodiment, the control unit 26 controls the flow rate regulator 24 such that the vapour quality of the refrigerant at the inlet of the outdoor unit 16 is small, e.g. smaller than 0.1. When the vapour quality is smaller than 0.1, the refrigerant density increases drastically, and the liquid refrigerant increases, as shown in FIG. 2. When the vapour quality is smaller than 0.1, the refrigerant is mostly the liquid refrigerant, and accordingly the refrigerant can be distributed broadly in the outdoor unit 16 as described above.

Figure 12:
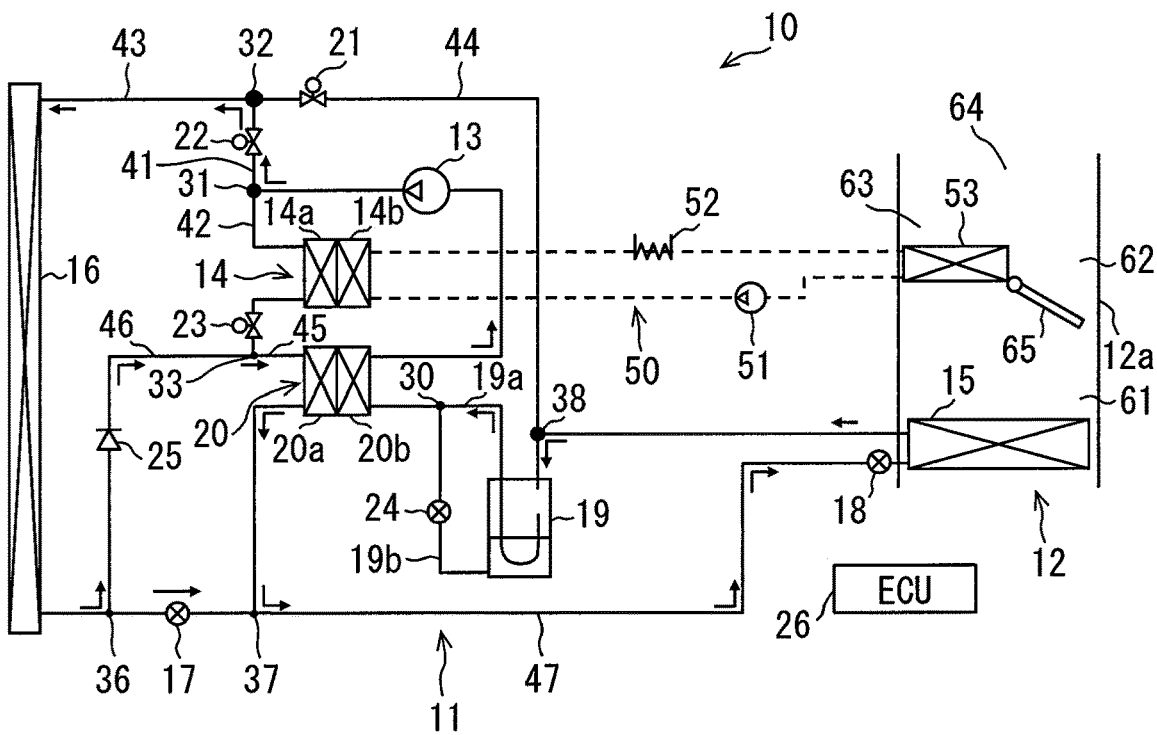
FIG. 12 is a diagram showing another flow of the refrigerant in the cooling mode according to the first embodiment.

In the present embodiment, all the refrigerant flowing out of the outdoor unit 16 passes through the high-pressure passage 20a of the internal heat exchanger 20, but the configuration is not limited to this. For example, as shown in FIG. 12, the opening degree of the heating decompressor 17 may be controlled such that a part of the refrigerant flows into the evaporator 15 without passing through the internal heat exchanger 20. Since the flow rate of the refrigerant flowing into the internal heat exchanger 20 can be controlled by adjusting the valve opening degree of the heating decompressor 17, the inside heat exchange amount can be controlled, and accordingly the controllability of the system can be improved.

Second Embodiment

Figure 13:
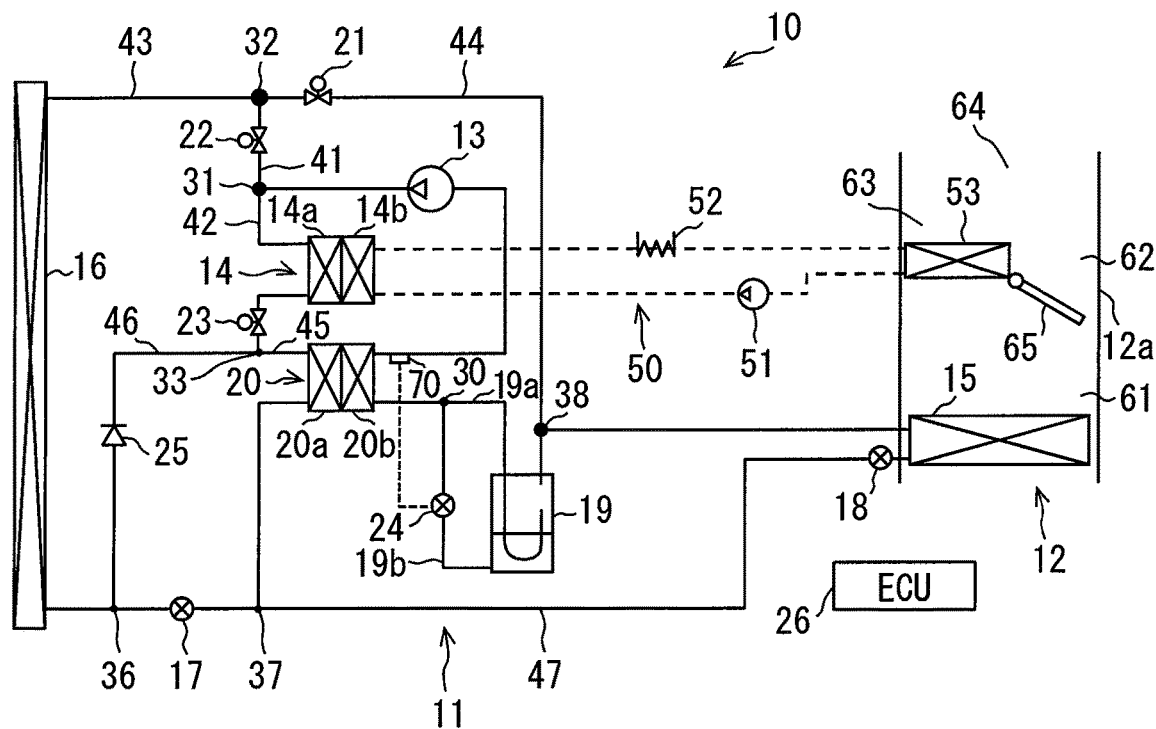
FIG. 13 is a diagram illustrating a heat pump system according to a second embodiment of the present disclosure.

Next, a second embodiment will be described with reference to FIG. 13. In the present embodiment, it is characteristic that the amount of the liquid refrigerant flowing from the accumulator 19 to the internal heat exchanger 20 is controlled. In the heating pathway, the control unit 26 detects physical properties of the refrigerant drawn into the compressor 13 to estimate the vapour quality of the refrigerant, and the control unit 26 controls the flow rate regulator 24 such that the vapour quality becomes closer to a predetermined target value.

In order to maximize the efficiencies in both the cooling operation and the heating operation, it is required to control the superheat of the refrigerant drawn into the compressor 13. In the present embodiment, a thermosensitive portion 70 is provided between the low-pressure passage 20b of the internal heat exchanger 20 and the compressor 13.

The thermosensitive portion 70 detects the superheat based on the temperature and the pressure of the refrigerant. The flow rate regulator 24 mechanically adjusts its valve opening degree such that the superheat is a predetermined value, and the flow rate regulator 24 adjusts the refrigerant flow rate in the liquid refrigerant passage 19b. Accordingly, the flow rate regulator 24 is temperature responsive.

That is, the temperature and the pressure of the refrigerant that is to be drawn into the compressor 13 is detected, and the amount of the liquid refrigerant flowing from the accumulator 19 is adjusted based on the detected value by the flow rate regulator 24.

According to this, conditions of the refrigerant can be optimized in both the cooling operation and the heating operation, and the efficiency of the heat pump system 10 can be improved. In the heating operation, the amount of the liquid refrigerant flowing from the accumulator 19 into the internal heat exchanger 20 is controlled to increase to maximize the inside heat exchange amount, such that the refrigerant vapour quality at the inlet of the outdoor unit 16 becomes closer to 0. In contrast, in the cooling operation, the amount of the liquid refrigerant flowing from the accumulator 19 is controlled such that the refrigerant drawn into the compressor 13 has appropriate superheat, and accordingly COP of the cycle is improved.

The amount of the liquid refrigerant flowing from the accumulator 19 may be controlled by automatic control of an expansion valve, for example. The opening degree of the flow rate regulator 24 may be electrically controlled based on detected values or predicted values of the temperature and the pressure.

Third Embodiment

Figure 14:
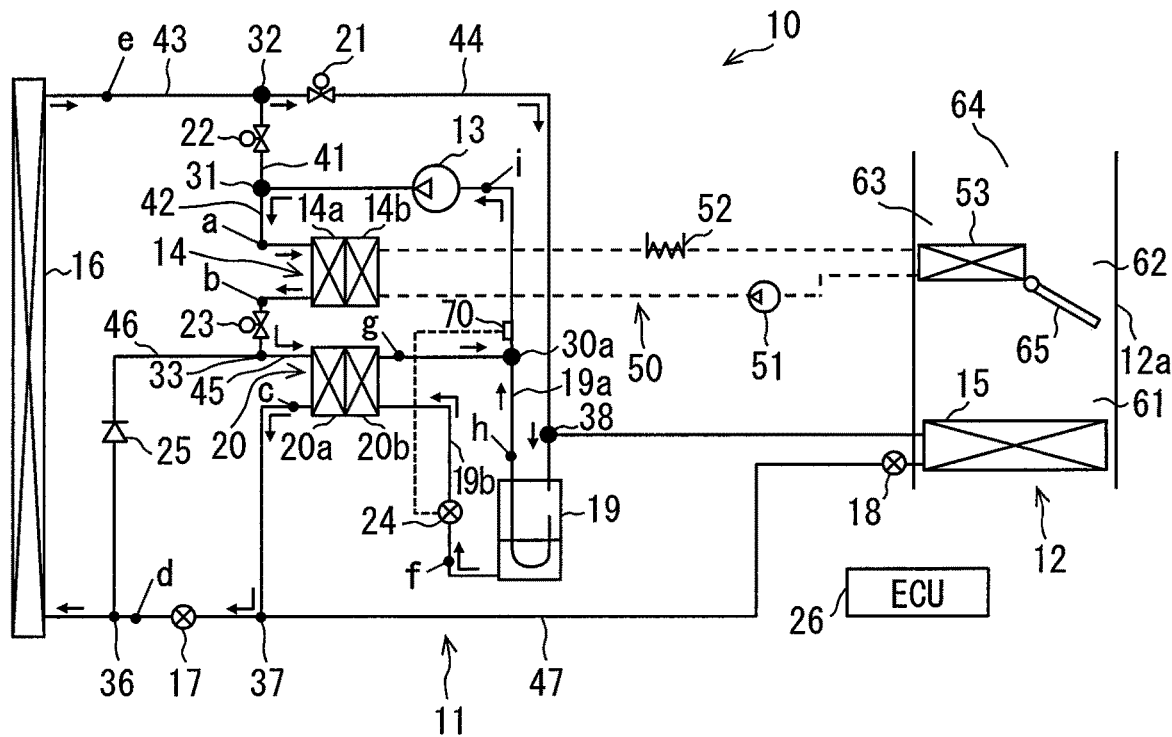
FIG. 14 is a diagram illustrating a heat pump system according to a third embodiment of the present disclosure.
Figure 15:
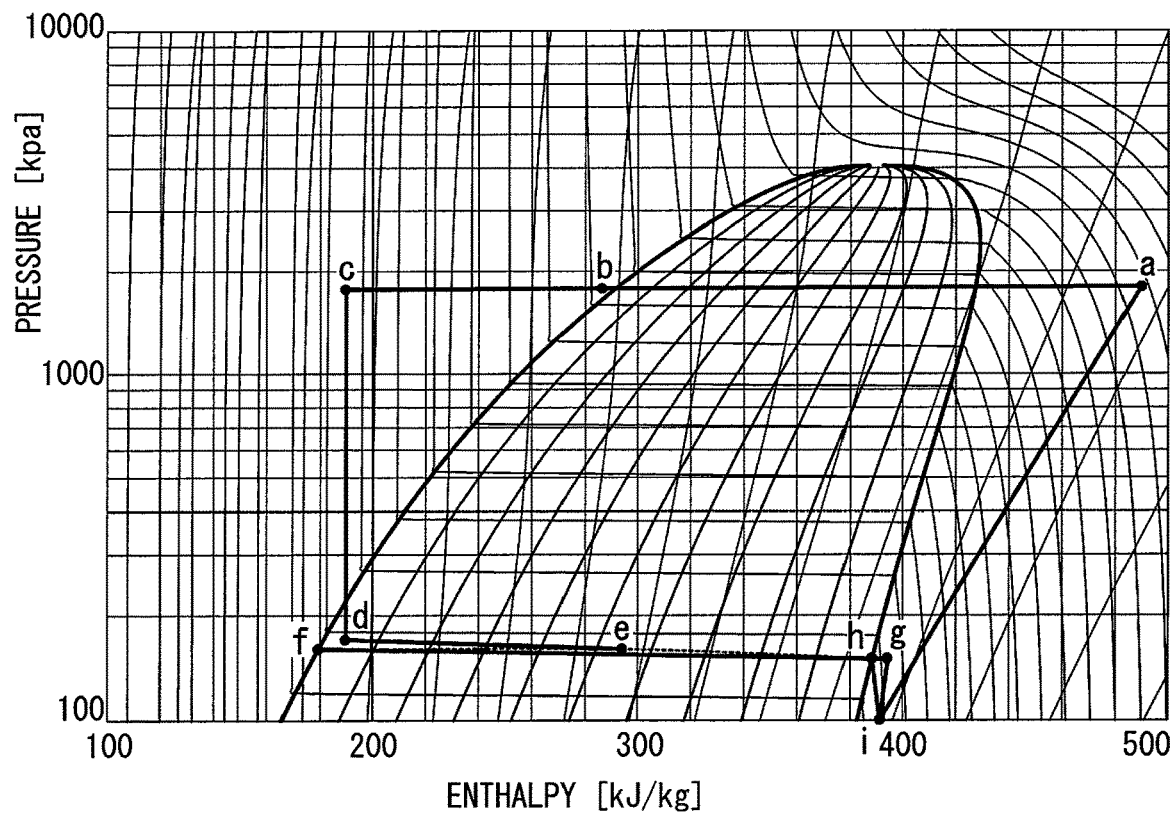
FIG. 15 is a graph showing an example of cycle actuation points in a heating operation on a Mollier diagram, according to the third embodiment.
Figure 16:
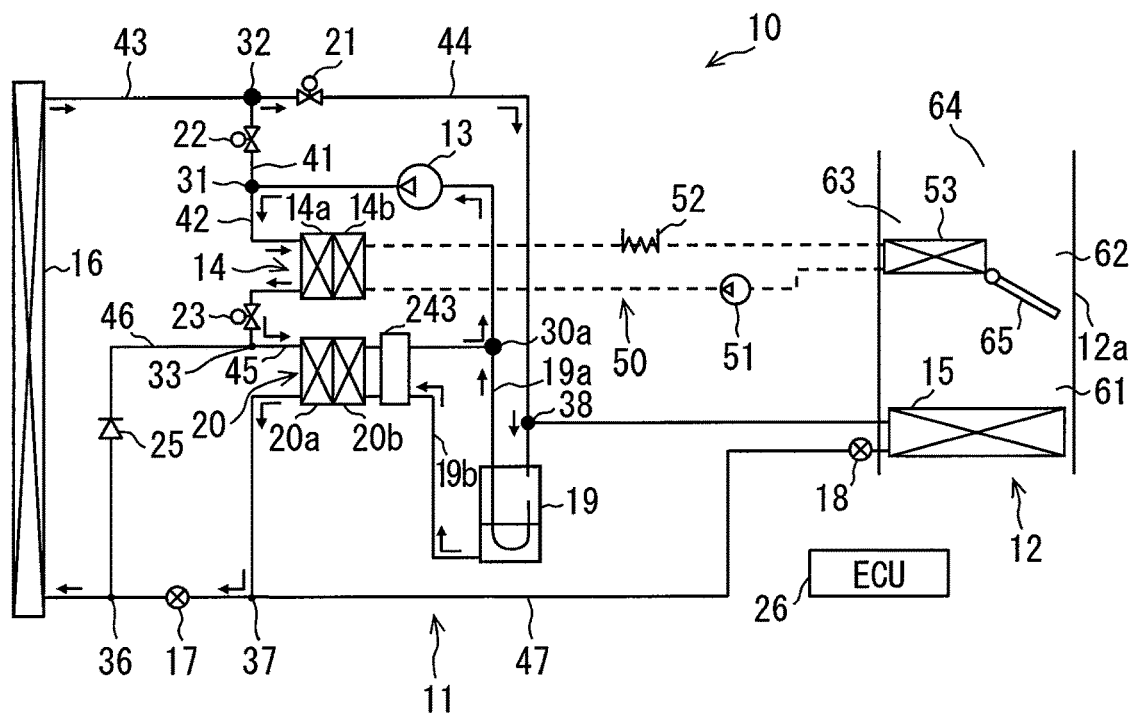
FIG. 16 is a diagram illustrating a heat pump system according to another example of the third embodiment.

Next, a third embodiment of the present disclosure is described below with reference to FIGS. 14 to 16. In the present embodiment, a connection position of the pipe located downstream of the accumulator 19 is different from the first embodiment, and the position of the thermosensitive portion 70 is different from the second embodiment.

The gas refrigerant passage 19a of the accumulator 19 is not connected to the upstream side of the low-pressure passage 20b of the internal heat exchanger 20, and the gas refrigerant passage 19a is connected to a second junction portion 30a that is located between the internal heat exchanger 20 and the compressor 13. Accordingly, the gas refrigerant flowing out of the accumulator 19 is directly drawn into the compressor 13. The liquid refrigerant passage 19b is connected to the low-pressure passage 20b of the internal heat exchanger 20. Accordingly, the liquid refrigerant flowing out of the accumulator 19 is drawn into the compressor 13 through the internal heat exchanger 20. The thermosensitive portion 70 is provided downstream of the second junction portion 30a.

Next, actuations in the heating operation are described below. In the heating operation, the flow of the refrigerant is similar to the above-described first embodiment as shown by arrows of FIG. 14. Next, actuations of the components and the flow of the refrigerant are described with reference to the Mollier diagram shown in FIG. 15. The high-pressure gas refrigerant (point a) discharged by the compressor 13 is condensed in the condenser 14 (point b). The liquid refrigerant flowing out of the condenser 14 flows into the high-pressure passage 20a of the internal heat exchanger 20 through the heating low-pressure side opening-closing portion 23, and the liquid refrigerant exchanges heat with the low-temperature liquid refrigerant flowing through the low-pressure passage 20b of the internal heat exchanger 20 to be subcooled (point c). Since only the liquid refrigerant divided by the accumulator 19 flows into the low-pressure passage 20b, the heat exchange amount is smaller than the first embodiment, and the temperature decrease of the refrigerant in the high-pressure passage 20a is small.

The refrigerant flowing out of the internal heat exchanger 20 is expanded in the heating decompressor 17 to become a low-temperature and low-pressure two phase refrigerant, and flows into the outdoor unit 16 (point d) to be evaporated in the outdoor unit 16 to absorb heat from the outside air (point e). The two-phase refrigerant flowing out of the outdoor unit 16 flows into the accumulator 19. The liquid refrigerant flowing out of the accumulator 19 flows into the low-pressure passage 20b of the internal heat exchanger 20 (point f) and exchanges heat with the refrigerant flowing out of the condenser 14 to be heated (point g). The gas refrigerant flowing out of the accumulator 19 (point h) joins together with the liquid refrigerant flowing through the low-pressure passage 20b of the internal heat exchanger 20 at the second junction portion 30a and is drawn into the compressor (point i).

When the liquid refrigerant passage 19b and the gas refrigerant passage 19a extending from the accumulator 19 are separated from each other, the refrigerant pressure loss between the accumulator 19 and the compressor 13 can be decreased, and accordingly the heating performance can be improved.

In the present embodiment, the flow rate regulator 24 is provided in the liquid refrigerant passage 19b, but the flow rate regulator 24 may be provided between the low-pressure passage 20b of the internal heat exchanger 20 and the second junction portion 30a. In this case also, the flow rate of the liquid refrigerant flowing in the low-pressure passage 20b of the internal heat exchanger 20 can be adjusted.

In the present embodiment, the thermosensitive portion 70 and the flow rate regulator 24 are provided separately, but the thermosensitive portion 70 and the flow rate regulator 24 may be provided as a flow rate regulator 243 which is an inlet-outlet integrated type. As shown in FIG. 16, the flow rate regulator 243 extends from the inflow side to the outflow side of the low-pressure passage 20b of the internal heat exchanger 20. The flow rate regulator 243 is a box-type flow rate regulation valve and detects therein the pressure and the temperature of the refrigerant on the downstream side of the low-pressure passage 20b. The flow rate regulator 243 mechanically adjusts its opening degree such that the superheat is a predetermined value. In this case, the same effects as the case where the thermosensitive portion 70 and the flow rate regulator 24 are separately provided can be obtained.

Fourth Embodiment

Next, a fourth embodiment of the present disclosure is described below with reference to FIGS. 17 to 21. The present embodiment is similar to the third embodiment, but a part to which the sixth flow passage 46 extending from the sixth branch portion 36 connects is different from the third embodiment. The configurations of the downstream side of the accumulator 19 and the thermosensitive portion 70 are the same as the third embodiment. The sixth branch portion 36 is connected, through the sixth flow passage 46, to a ninth branch portion 39 provided in the second flow passage 42. The heating low-pressure side opening-closing portion 23 is provided between the first branch portion 31 and the ninth branch portion 39.

Figure 17:
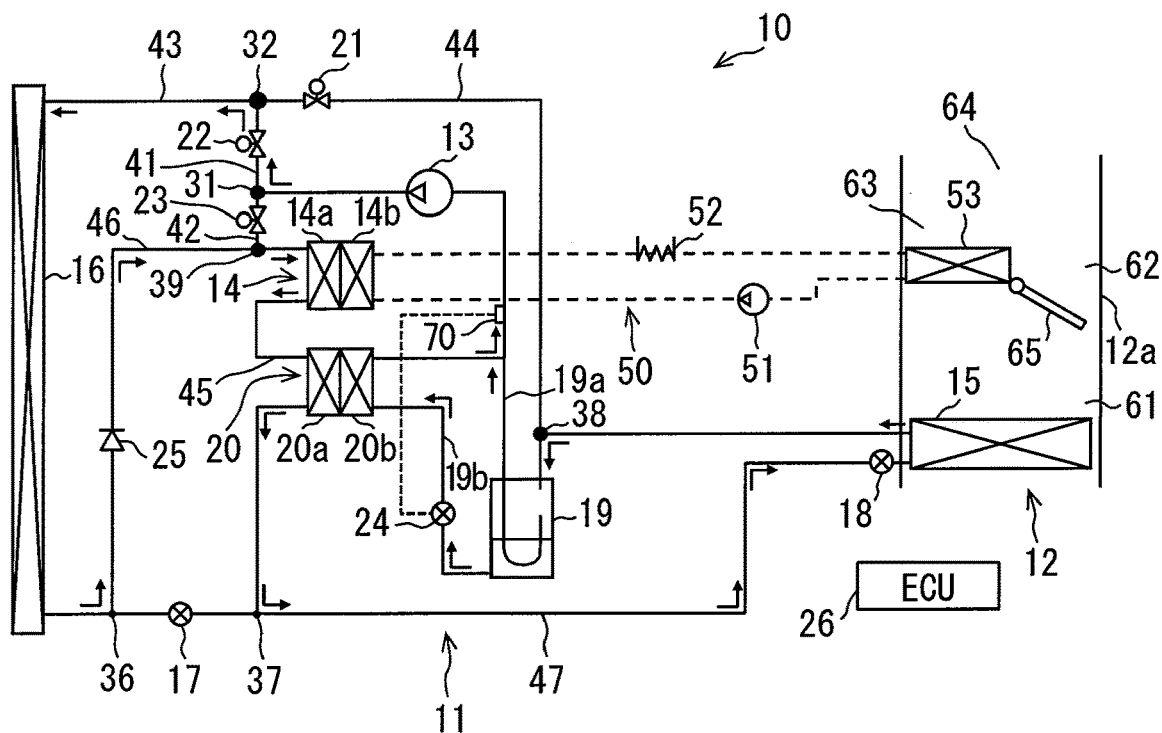
FIG. 17 is a diagram illustrating a heat pump system according to a fourth embodiment of the present disclosure.

In the cooling operation, the refrigerant flows as indicated by arrows shown in FIG. 17. Accordingly, in the cooling operation, the refrigerant flows through the condenser 14 located between the outdoor unit 16 and the internal heat exchanger 20. The liquid refrigerant condensed in and flowing out of the outdoor unit 16 flows into the condenser 14 through the check valve 25. The liquid refrigerant flowing into the condenser 14 dissipates heat to the cooling water flowing through the water passage 14b to be further condensed. Subsequently, the liquid refrigerant flowing into the high-pressure passage 20a of the internal heat exchanger 20 exchanges heat with the low-temperature refrigerant flowing through the low-pressure passage 20b of the internal heat exchanger 20 to be further subcooled.

According to this, in the middle of spring or autumn when the thermal load is low and dehumidification is required, the refrigerant is condensed by the outdoor unit 16 and the condenser 14, and the heat dissipated from the condenser 14 can be used for heating of the vehicle compartment. According to this, outside heat source is not needed to heat the dehumidified air, and the system can be effectively operated.

Figure 18:
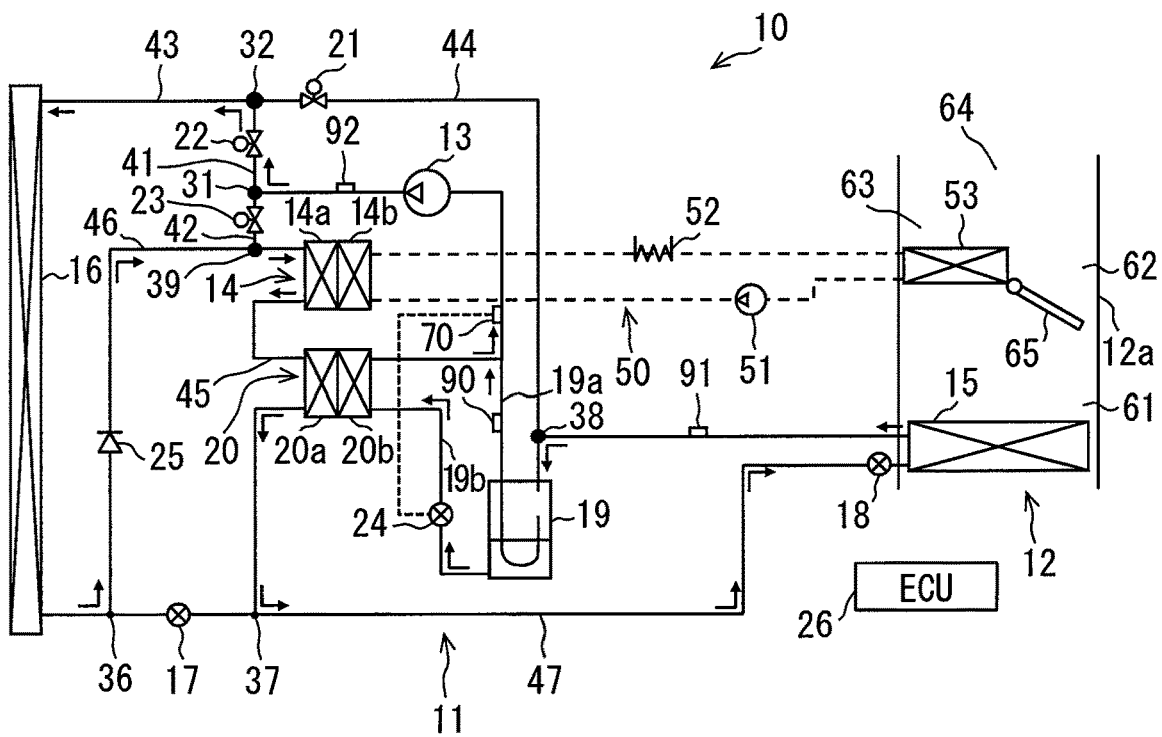
FIG. 18 is a diagram showing a flow of a refrigerant in a defrosting operation according to the fourth embodiment.
Figure 19:
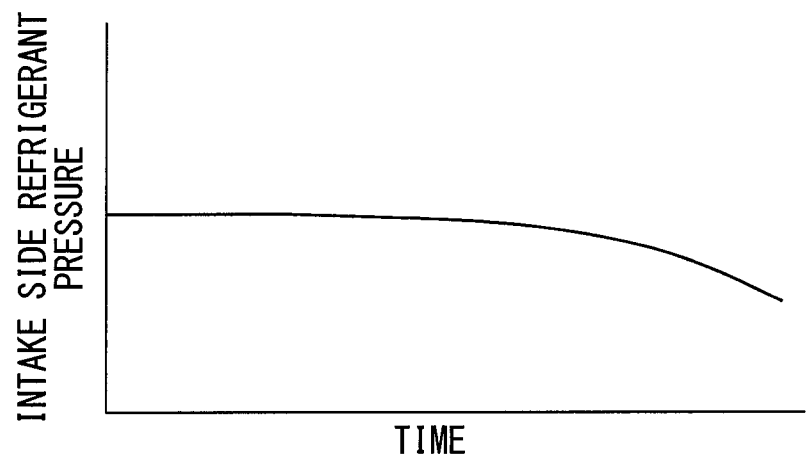
FIG. 19 is a graph showing an example of a temporal change of a refrigerant pressure on an intake side of a compressor, according to the fourth embodiment.

Next, a short-time defrosting will be described with reference to FIGS. 18 to 20. Sensors that detect a condition of the refrigerant for the defrosting control are shown in FIG. 18. The refrigerant pressure of the intake side of the compressor 13 is detected by a pressure sensor 90 located downstream of the accumulator 19. The refrigerant temperature of the intake side is detected by a temperature sensor 91 located downstream of the evaporator 15. The pressure and the temperature of the refrigerant discharged from the compressor 13 are detected by a refrigerant sensor 92 located on a discharge side of the compressor 13.

When frost is formed on a surface of the outdoor unit 16 in the heating operation, the evaporation performance of the outdoor unit 16 gradually decreases. The rotation speed of the compressor 13 is increased for obtaining a required capacity. As the frost is formed, the refrigerant pressure on the intake side decreases as shown in FIG. 19. The frost formation is detected based on the temperature of the outside air and the refrigerant pressure on the intake side. When the pressure is equal to or lower than a predetermined pressure depending on the temperature of the outside air, the defrosting operation is started.

The refrigerant pathway in the defrosting operation is the same as the cooling operation. That is, in the defrosting operation, the refrigerant flows in the following order: the compressor 13, the outdoor unit 16, the condenser 14, the high-pressure passage 20a of the internal heat exchanger 20, the cooling decompressor 18, the evaporator 15, the accumulator 19, the low-pressure passage 20b of the internal heat exchanger 20, and the compressor 13. When the heating performance decreases in the heating operation due to the frost formation on the outdoor unit 16, the refrigerant pathway is switched to the defrosting pathway shown in FIG. 18. According to this, the heat of the high-pressure refrigerant flowing out of the compressor 13 is supplied to the outdoor unit 16 for defrosting. The refrigerant flowing out of the outdoor unit 16 flows into the condenser 14 as described above. The refrigerant receives heat from the condenser 14 to evaporate in the condenser 14. The refrigerant flowing out of the condenser 14 circulates in the following order as described above: the high-pressure passage 20a of the internal heat exchanger 20, the cooling decompressor 18, the evaporator 15, the accumulator 19, the low-pressure passage 20b of the internal heat exchanger 20, and the compressor 13.

According to this, since the frost can be removed from the outdoor unit 16 by using the heat of the condenser 14 in addition to the heat of the compressor 13, large heat for defrosting can be obtained in short time, and accordingly the defrosting can be performed in short time. In the short-time defrosting, the heat consumed in the defrosting can be compensated by the heating portion 52, and accordingly a decrease of a water temperature can be limited. Accordingly, the heating operation can be started immediately after the defrosting, or the heating operation can be maintained during the defrosting.

Figure 20:
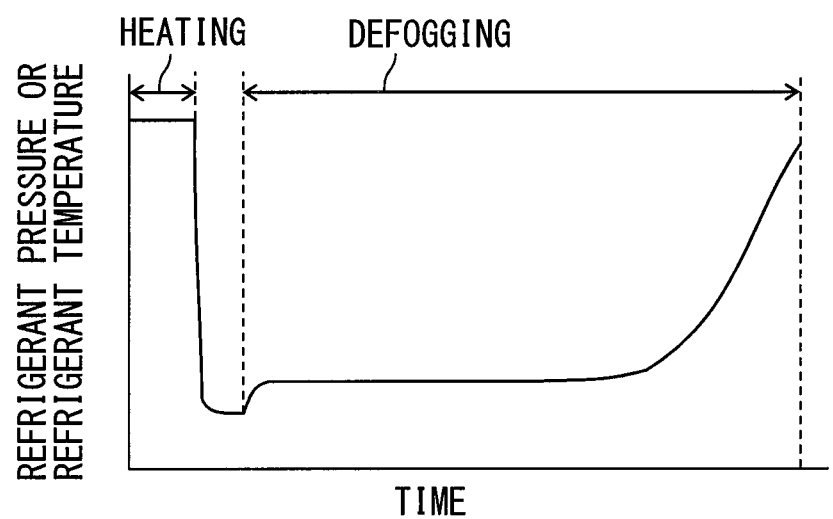
FIG. 20 is a graph showing an example of a temporal change of a refrigerant pressure according to the fourth embodiment.

As shown in FIG. 20, since the surface of the outdoor unit 16 is frosted at the beginning of the defrosting operation, both the pressure and the refrigerant detected by the refrigerant sensor 92 located on the discharge side of the compressor 13 change little. The control unit 26 determines whether to circulate the refrigerant in the defrosting pathway or stop the circulation of the refrigerant depending on the refrigerant pressure on the intake side of the compressor 13 and the temperature of the outside air. Specifically, after the defrosting is completed, only sensible heat is exchanged, and accordingly the temperature of the outdoor unit 16 increases as heated. Accordingly, the pressure and the temperature of the refrigerant on the discharge side drastically increase. For estimating whether the defrosting is completed, a timing when the refrigerant pressure or the refrigerant temperature is at its inflection point may be estimated based on a rate of change or predetermined pressure and temperature.

Figure 21:
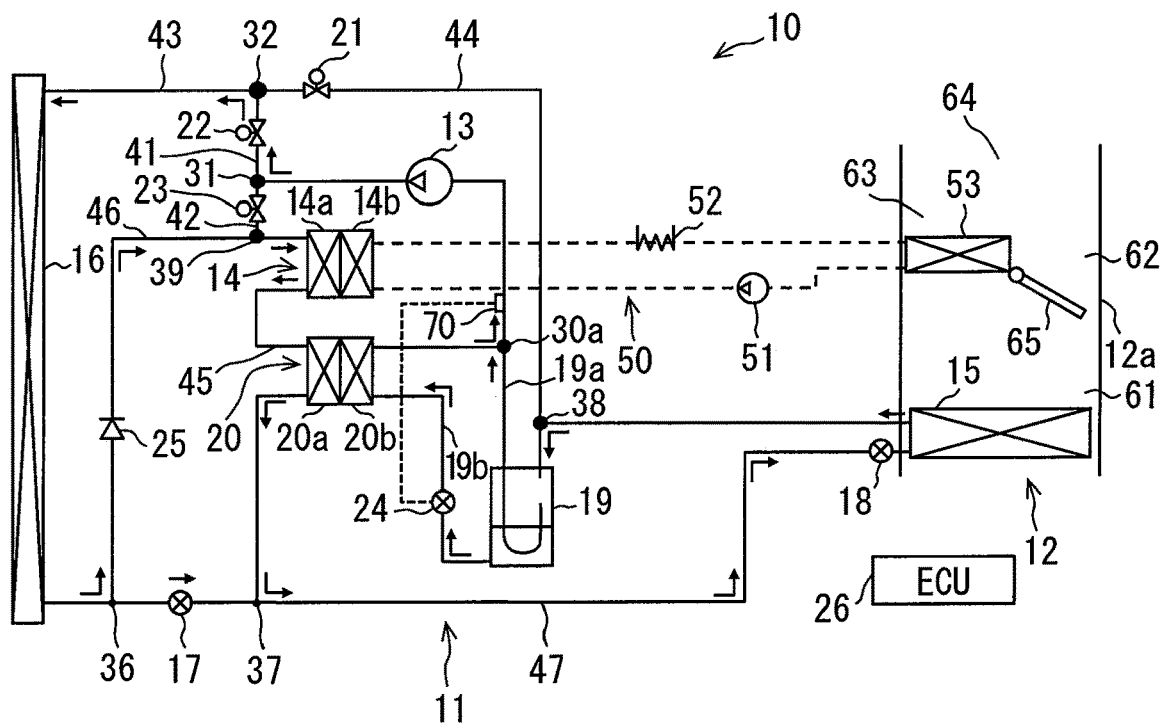
FIG. 21 is a diagram showing another flow of the refrigerant in a cooling operation according to the fourth embodiment.

In the present embodiment, all the refrigerant flowing out of the outdoor unit 16 passes through the high-pressure passage 20a of the internal heat exchanger 20, but the configurations are not limited to this. For example, as shown in FIG. 21, the opening degree of the heating decompressor 17 may be controlled such that a part of the refrigerant flows into the evaporator 15 without passing through the internal heat exchanger 20. In this case, since the flow rate of the refrigerant flowing into the internal heat exchanger 20 can be controlled by adjusting the valve opening degree of the heating decompressor 17, the inside heat exchange amount can be controlled, and accordingly the controllability of the system can be improved.

Fifth Embodiment

Figure 22:
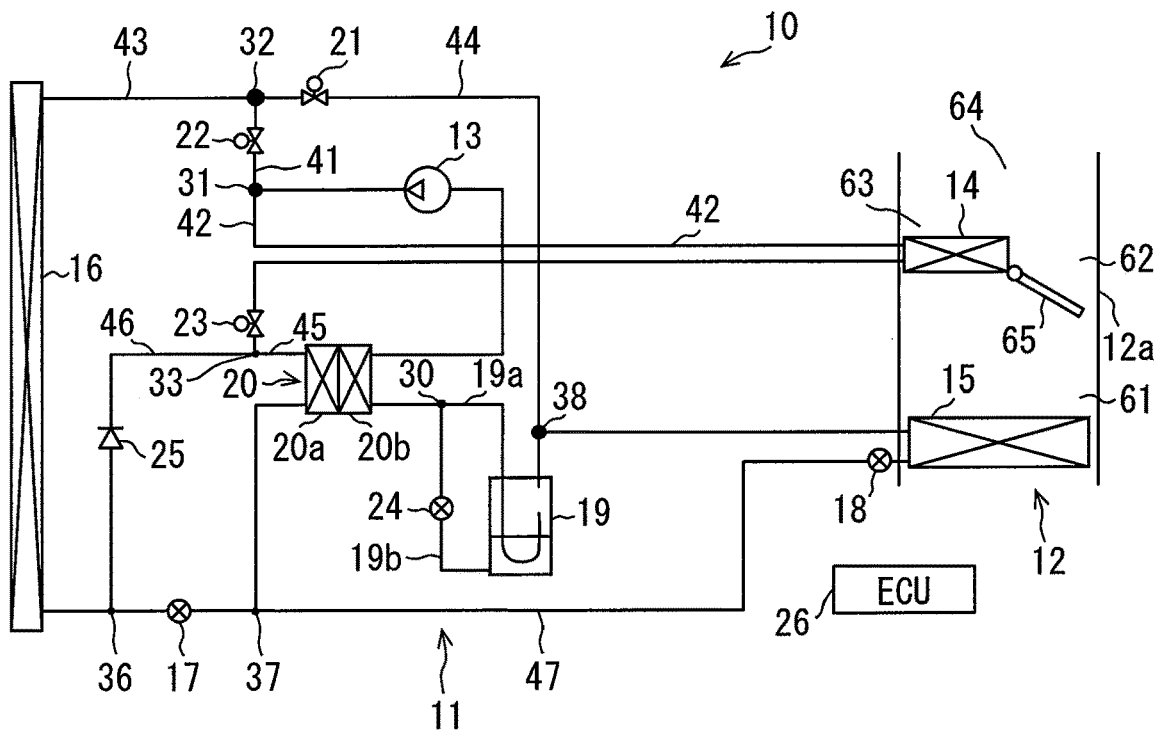
FIG. 22 is a diagram illustrating a heat pump system according to a fifth embodiment of the present disclosure.

Next, a fifth embodiment of the present disclosure is described below with reference to FIG. 22. The present embodiment is similar to the third embodiment, but is different from the third embodiment in that the condenser 14 is located in the air passage 61. The condenser 14 is located in the air passage 61 communicating with the vehicle compartment. The condenser 14 is located downstream of the evaporator 15. In the heating operation, the condenser 14 heats the air passing therethrough by the heat dissipation of the refrigerant flowing inside the condenser 14. The condenser 14 may be located downstream of the evaporator 15 with reference to the air flow.

When the condenser 14 is provided in the air passage 61, the air can be directly heated by the condenser 14 even in such configuration that does not include the water cycle 50. Accordingly, the configurations can be simplified.

Sixth Embodiment

Next, a sixth embodiment of the present disclosure is described with reference to FIGS. 23 to 25. The present embodiment is similar to the first embodiment, but the position of the heating low-pressure side opening-closing portion 23 and the connection between the accumulator 19 and the internal heat exchanger 20 are different from the first embodiment. The heating low-pressure side opening-closing portion 23 is not located downstream of the condenser 14 but is provided in the second flow passage 42 located upstream of the condenser 14. The positions of the accumulator 19 and the internal heat exchanger 20 are swapped compared to the first embodiment.

First, actuations in the heating operation are described below. When the operation mode is the heating operation, the control unit 26 controls the opening degree of the air mix door 65 such that the air flows into the warm air passage 63. The control unit 26 controls the cooling opening-closing portion 22 and the cooling decompressor 18 to be closed, and the control unit 26 controls the heating high-pressure side opening-closing portion 21 and the heating low-pressure side opening-closing portion 23 to be opened.

Figure 23:
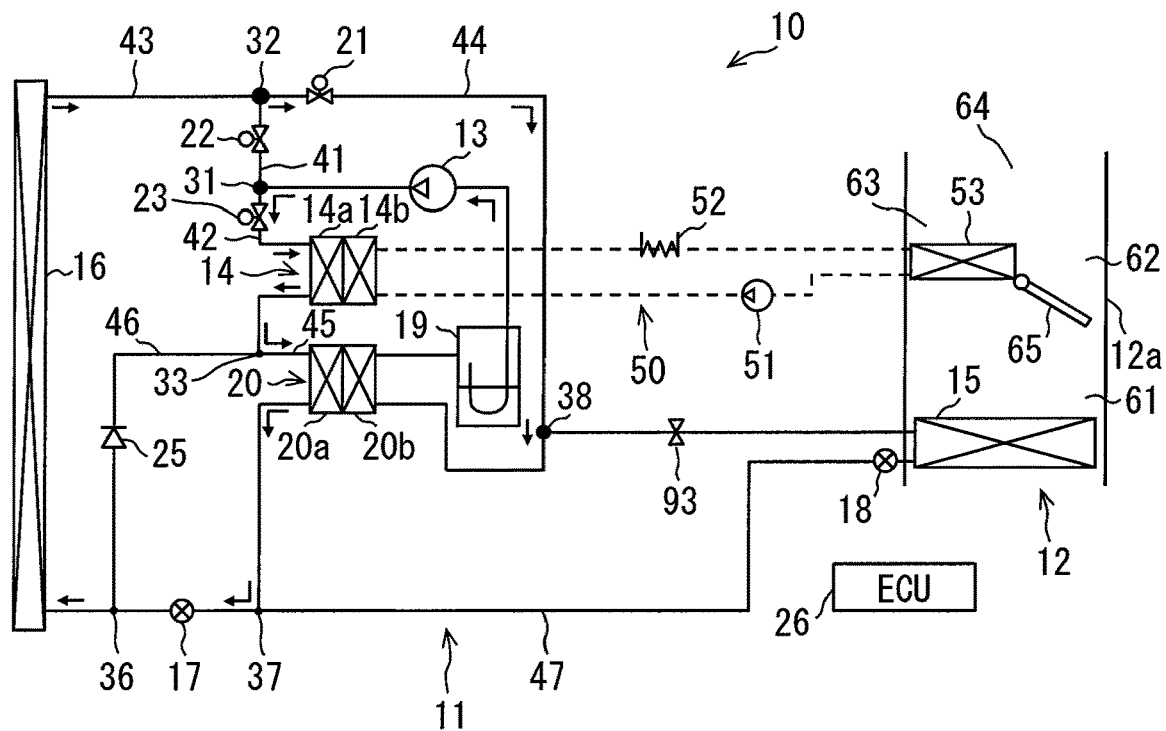
FIG. 23 is a diagram illustrating a heat pump system according to a sixth embodiment of the present disclosure.

According to this, in the heating operation, the refrigerant flows as indicated by arrows shown in FIG. 23. That is, in a heating pathway that is a pathway of the refrigerant during the heating operation, the refrigerant circulates in the following order: the compressor 13, the condenser 14, the high-pressure passage 20a of the internal heat exchanger 20, the heating decompressor 17, the outdoor unit 16, the low-pressure passage 20b of the internal heat exchanger 20, the accumulator 19, the compressor 13.

According to such flow, the heat of the refrigerant flowing from the compressor 13 to the condenser 14 is transferred from the condenser 14 to the radiator 53 through the water cycle 50, and the vehicle compartment is heated by the blown air. The refrigerant flowing out of the condenser 14 flows into the internal heat exchanger 20, and the refrigerant is subcooled in the internal heat exchanger 20. The refrigerant flowing out of the internal heat exchanger 20 flows into the outdoor unit 16 after being decompressed by the heating decompressor 17, and the refrigerant absorbs heat, in the outdoor unit 16 that functions as an evaporator, from the outside air, and the refrigerant flows out of the outdoor unit 16. The refrigerant flowing out of the outdoor unit 16 flows into the low-pressure passage 20b of the internal heat exchanger 20 to absorb heat from the refrigerant at the outlet of the condenser 14, and the refrigerant flows into the accumulator 19. Since only the gas refrigerant flows out of the accumulator 19 basically, an outlet of the accumulator 19 is provided upward of the refrigerant level. An oil return hole is provided in a lower part of the outlet pipe to return the lubricant to the compressor minimally. Since the refrigerant vapour qualities at the inlet and the outlet of the outdoor unit 16 are low due to the function of the internal heat exchanger 20, the refrigerant distribution in the outdoor unit 16 can be improved. Accordingly, since a large amount of heat can be absorbed from the outside air, the cycle performance can be improved. According to this configuration, since the physical properties of the refrigerant at the inlet of the compressor 13 depend on the flow rate of the refrigerant and the diameter of the oil return hole provided in the accumulator 19, the heating capacity can be improved by simple controls.

Next, actuations in the cooling operation are described below. When the operation mode is the cooling operation, the control unit 26 controls the air mix door 65 to close the warm air passage 63. The control unit 26 controls the cooling opening-closing portion 22 to be opened, and the control unit 26 controls the heating high-pressure side opening-closing portion 21, the heating low-pressure side opening-closing portion 23 and the heating decompressor 17 to be closed.

Figure 24:
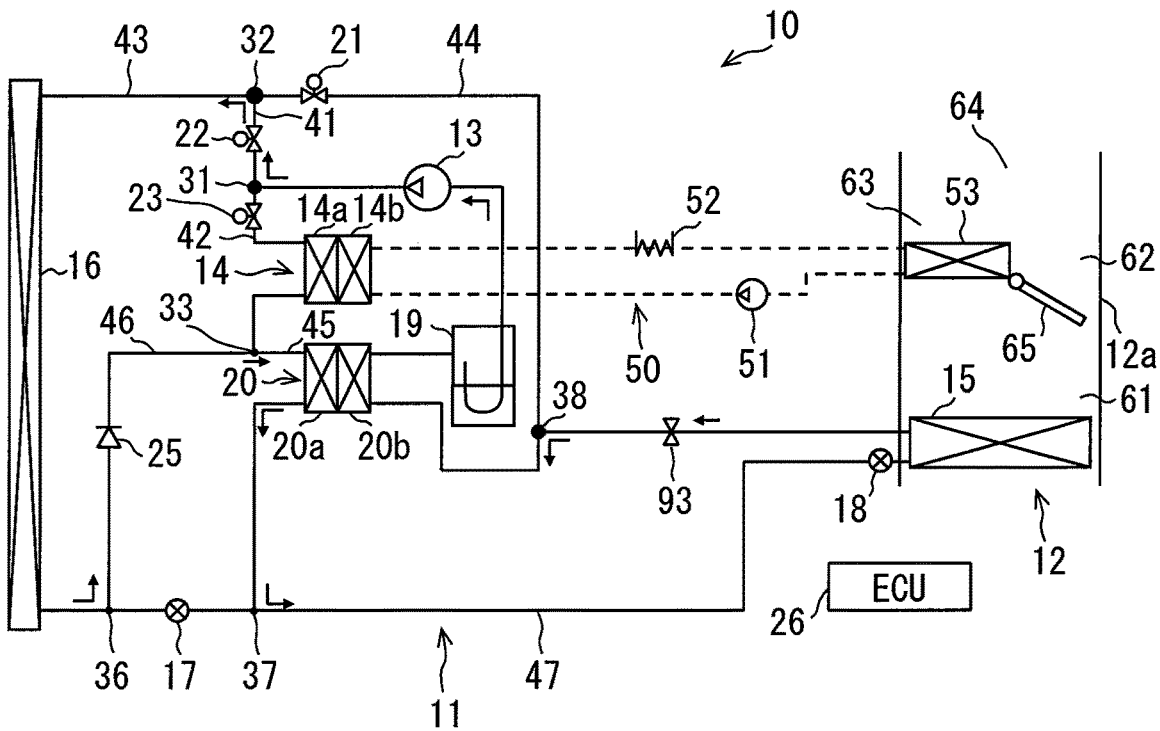
FIG. 24 is a diagram showing a flow of a refrigerant in a cooling operation according to the sixth embodiment.
Figure 25:
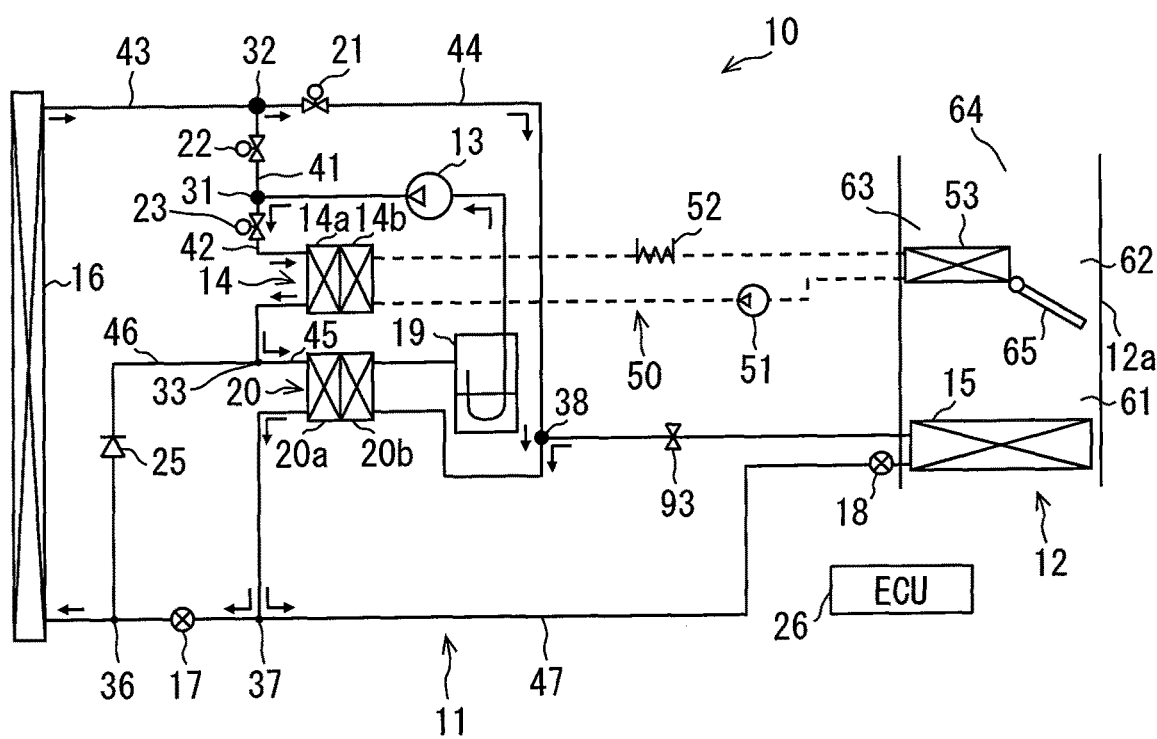
FIG. 25 is a diagram showing a flow of the refrigerant in a dehumidification-heating operation according to the sixth embodiment.

According to this, in the cooling operation, the refrigerant flows as indicated by arrows shown in FIG. 24. That is, in a cooling pathway that is a pathway of the refrigerant during the cooling operation, the refrigerant circulates in the following order: the compressor 13, the outdoor unit 16, the high-pressure passage 20a of the internal heat exchanger 20, the cooling decompressor 18, the evaporator 15, the low-pressure passage 20b of the internal heat exchanger 20, the accumulator 19, the compressor 13.

According to such flow, since the refrigerant vapour quality in the evaporator 15 is low due to the inside heat exchange of the internal heat exchanger 20, the performance of the evaporator 15 can be improved due to the decrease of the pressure loss, and accordingly the cycle efficiency can be improved.

Next, the actuations in the dehumidification-heating operation are described below. When the operation mode is the heating operation, the control unit 26 controls the opening degree of the air mix door 65 such that the air flows into the warm air passage 63. The control unit 26 controls the cooling opening-closing portion 22 to be closed, and the control unit 26 controls the heating high-pressure side opening-closing portion 21 and the heating low-pressure side opening-closing portion 23 to be opened. The control unit 26 controls the opening degree of the cooling decompressor 18 such that the refrigerant flows into the evaporator 15.

According to this, in the dehumidification-heating operation, the refrigerant is branched at the seventh branch portion 37 such that a part of the refrigerant flows to the outdoor unit 16 and the rest part flows to the evaporator 15. In both passages, the decompression portions, i.e. the heating decompressor 17 or the cooling decompressor 18, are provided, and the refrigerant is decompresses in the heating decompressor 17 or the cooling decompressor 18. The refrigerant absorbs heat in the outdoor unit 16, and the refrigerant dehumidifies in the evaporator 15. Since a pressure regulator 93 is provided downstream of the evaporator 15, the refrigerant flow rate and the refrigerant pressure in the evaporator 15 and the outdoor unit 16 can be controlled independently. According to this, when a required heating capacity is larger than a required dehumidifying capacity, the heating capacity can be increased without cooling the evaporator 15 excessively.

Since the refrigerant is branched after flowing out of the internal heat exchanger 20, the refrigerant vapour quality in the evaporator 15 is low. Accordingly, the refrigerant conditions can be improved even when the flow rate is small, and the superheat at the outlet of the evaporator 15 can be limited, and accordingly the frost formation can be limited.

Seventh Embodiment

Figure 26:
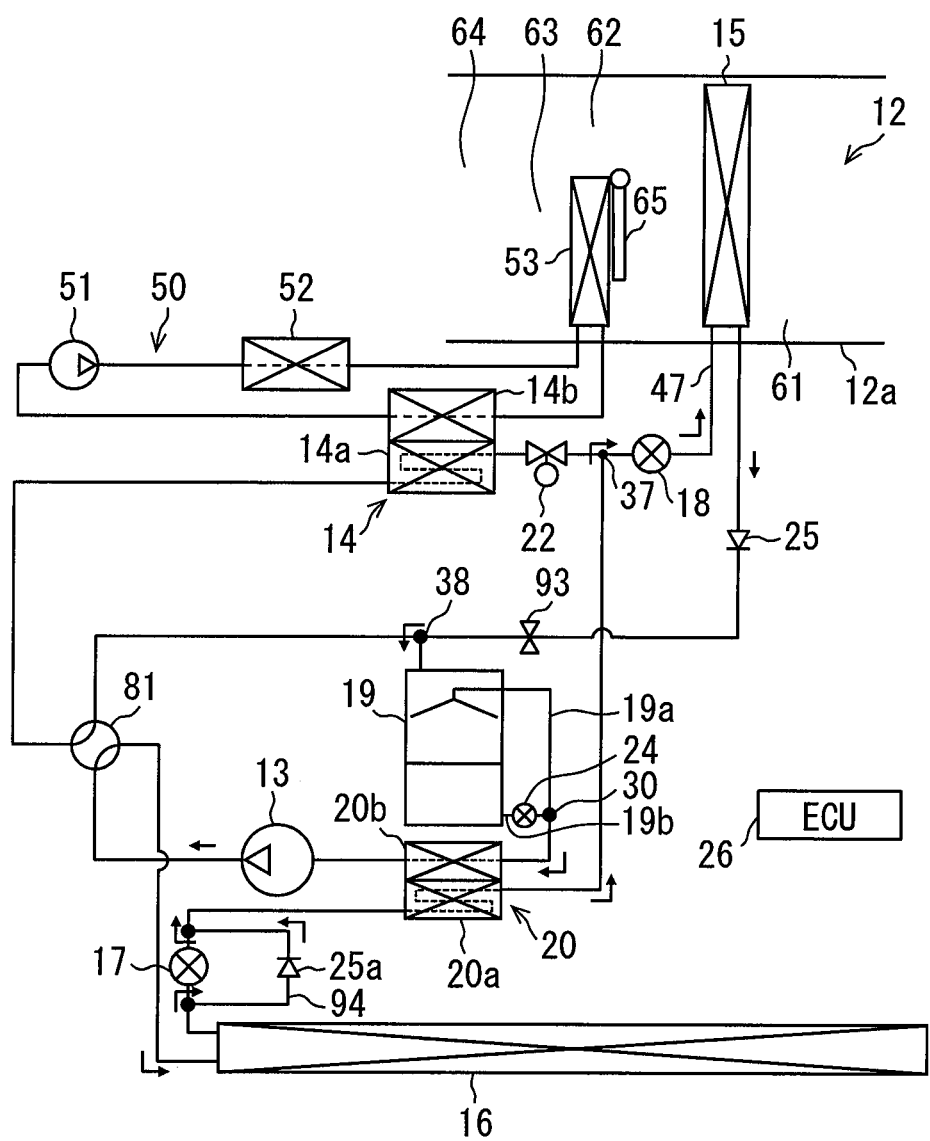
FIG. 26 is a diagram illustrating a heat pump system according to a seventh embodiment of the present disclosure.

Next, a seventh embodiment is described below with reference to FIGS. 26 to 31. The present embodiment is characterized in that a four-way valve 81 is provided in the heat pump cycle 11. As shown in FIG. 26, the heat pump cycle 11 includes the compressor 13, the condenser 14, the evaporator 15, the outdoor unit 16, the heating decompressor 17, the cooling decompressor 18, the accumulator 19, the internal heat exchanger 20, the cooling opening-closing portion 22, the four-way valve 81, and the flow rate regulator 24. The cycle of the heat pump cycle 11 is constituted by linking these together with pipes.

First, configurations of pipes are described. The four-way valve 81 is provided on the discharge side of the compressor 13. The four-way valve 81 is connected to the discharge side of the compressor 13, the condenser 14, the accumulator 19, and the outdoor unit 16. The four-way valve 81 is configured to switch between a first condition and a second condition. In the first condition, through the four-way valve 81, the discharge side of the compressor 13 and the condenser 14 communicates with each other, and the accumulator 19 and the outdoor unit 16 communicates with each other. In the second condition, through the four-way valve 81, the discharge side of the compressor 13 and the outdoor unit 16 communicates each other, and the accumulator 19 and the condenser 14 communicates with each other.

The evaporator 15 is located on an opposite side of the condenser 14 with regard to the four-way valve 81. Between the condenser 14 and the evaporator 15, the cooling opening-closing portion 22, the seventh branch portion 37, and the cooling decompressor 18 are arranged in this order.

The evaporator 15 is connected to the eighth branch portion 38. Between the evaporator 15 and the eighth branch portion 38, the check valve 25 and the pressure regulator 93 are arranged in this order. The check valve 25 allows the refrigerant to flow from the condenser 14 toward the eighth branch portion 38 and stops the refrigerant flow from the eighth branch portion 38 toward the evaporator 15.

The downstream side of the high-pressure passage 20a of the internal heat exchanger 20 is connected to the seventh branch portion 37. The eighth branch portion 38 is located between the four-way valve 81 and the accumulator 19. The downstream side of the accumulator 19 is connected to the low-pressure passage 20b of the internal heat exchanger 20. The downstream side of the low-pressure passage 20b of the internal heat exchanger 20 is connected to the intake side of the compressor 13.

The heating decompressor 17 is located between the outdoor unit 16 and the high-pressure passage 20a of the internal heat exchanger 20. A bypass passage 94 that bypasses the heating decompressor 17 is located between the outdoor unit 16 and the high-pressure passage 20a of the internal heat exchanger 20. A heating check valve 25a is provided in the bypass passage 94. The heating check valve 25a allows the refrigerant to flow from the outdoor unit 16 to the internal heat exchanger 20 through the bypass passage 94, and the heating check valve 25a stops a reverse flow.

Next, actuations of the heat pump system 10 are described below. When the operation mode is the cooling operation, the control unit 26 controls the air mix door 65 to close the warm air passage 63. The control unit 26 controls the cooling opening-closing portion 22 and the heating decompressor 17 to be closed, and the control unit 26 controls the opening degree of the cooling decompressor 18 such that the four-way valve 81 is in the second condition.

According to this, in the cooling operation, the refrigerant flows as indicated by arrows shown in FIG. 26. That is, in a cooling pathway that is a pathway of the refrigerant during the cooling operation, the refrigerant circulates in the following order: the compressor 13, the four-way valve 81, the outdoor unit 16, the heating check valve 25a, the high-pressure passage 20a of the internal heat exchanger 20, the cooling decompressor 18, the evaporator 15, the accumulator 19, the low-pressure passage 20b of the internal heat exchanger 20, the compressor 13. According to this, the same effects as the above-described first embodiment can be obtained.

Next, actuations in the heating operation are described below. When the operation mode is the heating operation, the control unit 26 controls the air mix door 65 to open the warm air passage 63 and drives the liquid sending portion 51 and the heating portion 52. The control unit 26 controls the cooling opening-closing portion 22 to be opened, and the control unit 26 controls the cooling decompressor 18 to be closed. The control unit 26 controls the opening degree of the heating decompressor 17 such that the four-way valve 81 is in the first condition.

Figure 27:
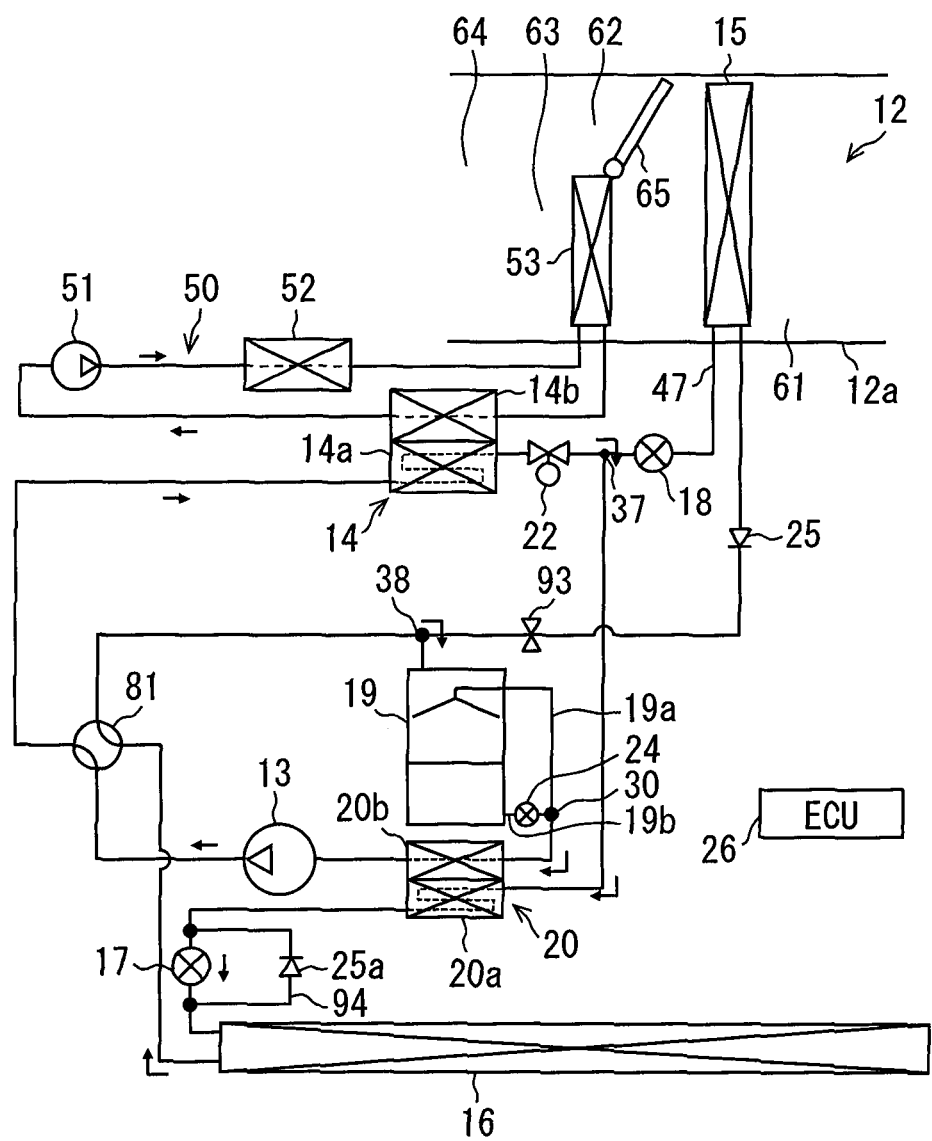
FIG. 27 is a diagram showing a flow of a refrigerant in a heating operation according to the seventh embodiment.

According to this, in the heating operation, the refrigerant flows as indicated by arrows shown in FIG. 27. That is, in a heating pathway that is a pathway of the refrigerant during the heating operation, the refrigerant circulates in the following order: the compressor 13, the four-way valve 81, the condenser 14, the cooling opening-closing portion 22, the high-pressure passage 20a of the internal heat exchanger 20, the heating decompressor 17, the outdoor unit 16, the accumulator 19, the low-pressure passage 20b of the internal heat exchanger 20, the compressor 13. According to this, the same effects as the above-described first embodiment can be obtained.

Next, actuations in the defrosting operation are described below. When the operation mode is the defrosting operation, the control unit 26 drives the liquid sending portion 51 and the heating portion 52. The control unit 26 controls the cooling opening-closing portion 22 to be opened, and the control unit 26 controls the cooling decompressor 18 and the heating decompressor 17 to be closed. The control unit 26 controls the four-way valve 81 to be in the second condition.

Figure 28:
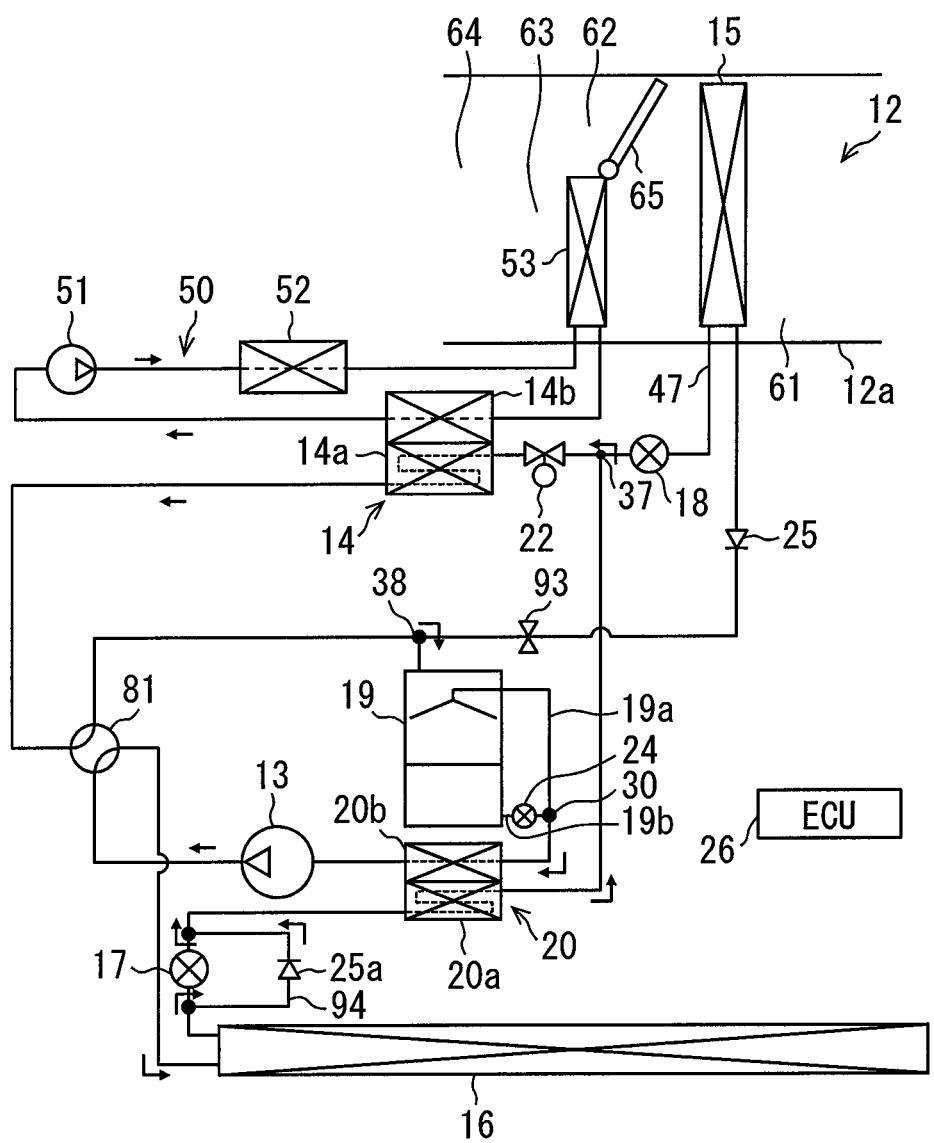
FIG. 28 is a diagram showing a flow of the refrigerant in a defrosting operation according to the seventh embodiment.

According to this, in the defrosting operation, the refrigerant flows as indicated by arrows shown in FIG. 28. That is, in a defrosting pathway that is a pathway of the refrigerant during the defrosting operation, the refrigerant circulates in the following order: the compressor 13, the four-way valve 81, the outdoor unit 16, the heating check valve 25a, the high-pressure passage 20a of the internal heat exchanger 20, the cooling opening-closing portion 22, the condenser 14, the accumulator 19, the low-pressure passage 20b of the internal heat exchanger 20, the compressor 13.

Since the refrigerant does not flow through the evaporator 15, the pathway can be shortened. Accordingly, the refrigerant flow rate can be increased, and the time for defrosting can be shortened. Since a main function of the condenser 14 is condensation, it is usually preferred that the flow path narrows gradually. In contrast, since the heat is absorbed from the condenser 14 in the defrosting, the condenser 14 is used as an evaporator only in the defrosting. In order to use the condenser 14 as an evaporator, it is preferred that the flow passage is gradually broaden in view of the pressure loss, in contrast to the usual condenser 14. In the present embodiment, the refrigerant reversely flows in the condenser 14 in the defrosting operation, and the refrigerant pressure loss in the condenser 14 can be reduced. Since the refrigerant flow rate can be increased, the defrosting time can be shortened.

Next, actuations in the dehumidification-heating operation are described below. When the operation mode is the dehumidification-heating operation, the control unit 26 drives the liquid sending portion 51 and the heating portion 52. The control unit 26 controls the cooling opening-closing portion 22 to be opened, and the control unit 26 controls the opening degree of the cooling decompressor 18 and the heating decompressor 17. The control unit 26 controls the four-way valve 81 to be in the first condition.

Figure 29:
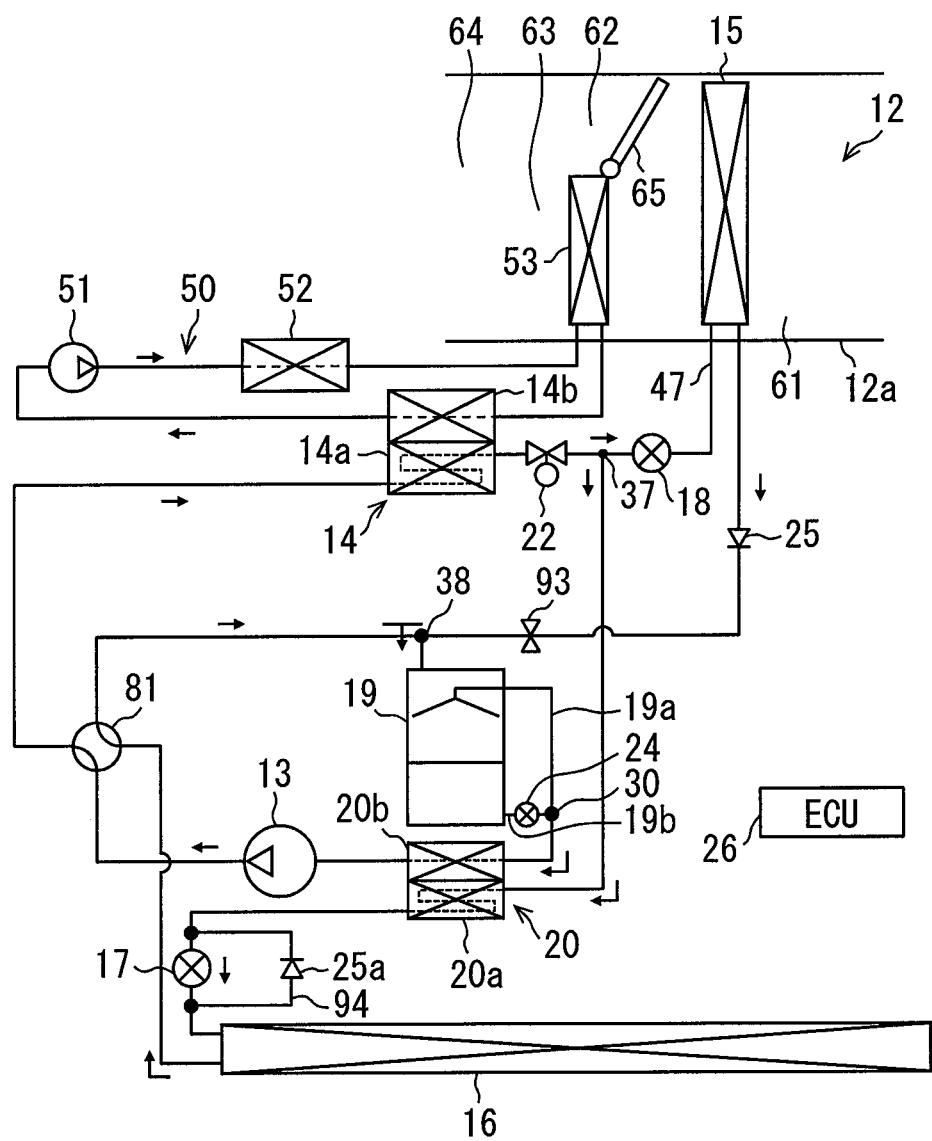
FIG. 29 is a diagram showing a flow of the refrigerant in a dehumidification-heating operation according to the seventh embodiment.

According to this, in the dehumidification-heating operation, the refrigerant flows as indicated by arrows shown in FIG. 29. The flow is basically the same as the above-described heating operation, but it is different in that the cooling decompressor 18 is opened to evaporate the refrigerant by the evaporator 15. According to this, the air is dehumidified by the evaporator 15, and the cooled air is heated by the radiator 53, and accordingly the vehicle compartment can be heated.

Next, actuations in the dehumidification-heating operation in a high-temperature condition where the temperature of the outside air is high are described below. When the operation mode is the dehumidification-heating operation in the high-temperature condition, the control unit 26 drives the liquid sending portion 51 and the heating portion 52. The control unit 26 controls the cooling opening-closing portion 22 and the heating decompressor 17 to be closed, and the control unit 26 controls the opening degree of the cooling decompressor 18. The control unit 26 controls the four-way valve 81 to be in the second condition.

Figure 30:
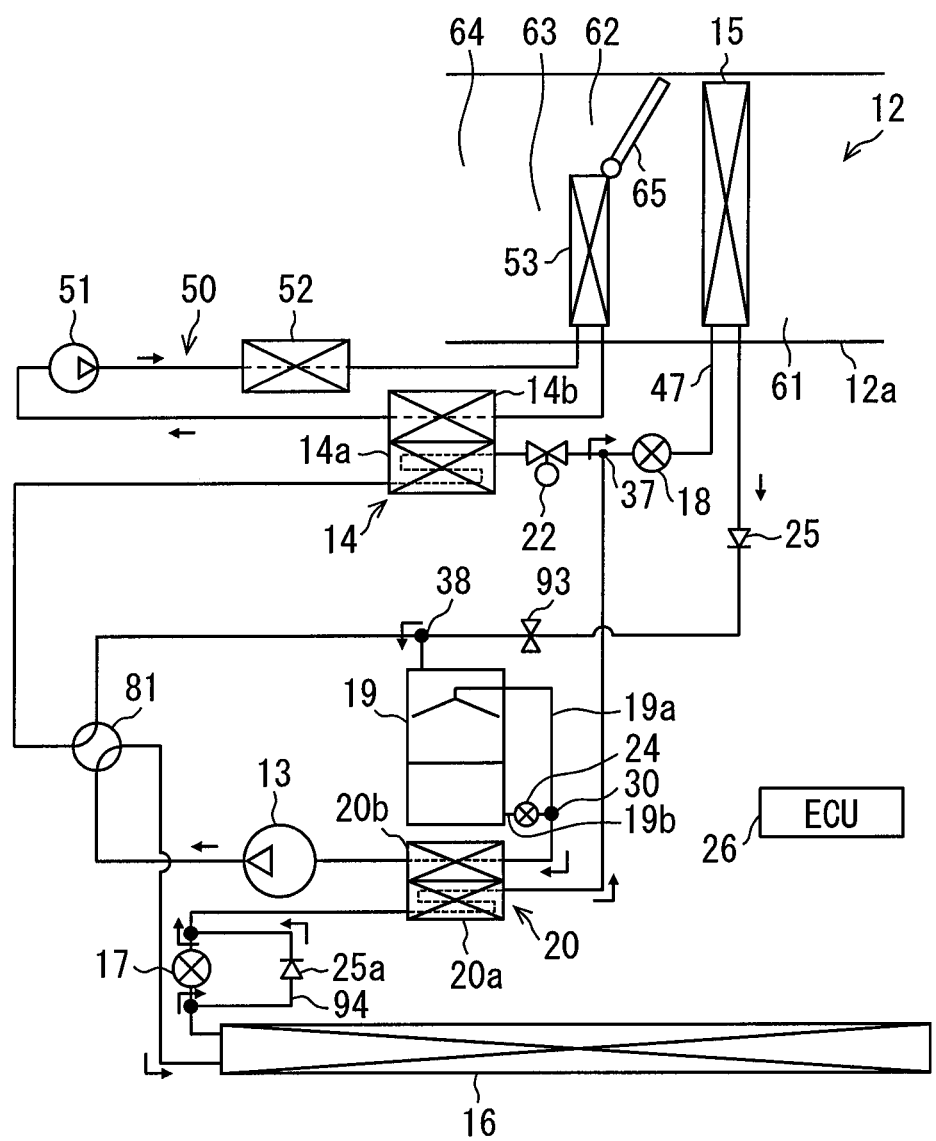
FIG. 30 is a diagram showing a flow of the refrigerant in a high-temperature defrosting operation according to the seventh embodiment.

According to this, in the dehumidification-heating operation in the high-temperature condition, the refrigerant flows as indicated by arrows shown in FIG. 30. That is, in such condition, the refrigerant circulates in the following order: the compressor 13, the four-way valve 81, the outdoor unit 16, the heating check valve 25a, the high-pressure passage 20a of the internal heat exchanger 20, the evaporator 15, the accumulator 19, the low-pressure passage 20b of the internal heat exchanger 20, the compressor 13. In such high-temperature condition, the dehumidification is performed like the cooling operation, and the temperature required for heating is supplied from the water cycle 50.

Next, actuations in an inoperative condition, where the outdoor unit 16 is not capable of absorbing heat due to frost or snow covering the outdoor unit 16, are described below. When the outdoor unit 16 is in the inoperative condition, the control unit 26 drives the liquid sending portion 51 and the heating portion 52. The control unit 26 controls the cooling opening-closing portion 22 to be opened, and the control unit 26 controls the heating decompressor 17 to be closed, and the control unit 26 controls the opening degree of the cooling decompressor 18. The control unit 26 controls the four-way valve 81 to be in the first condition.

Figure 31:
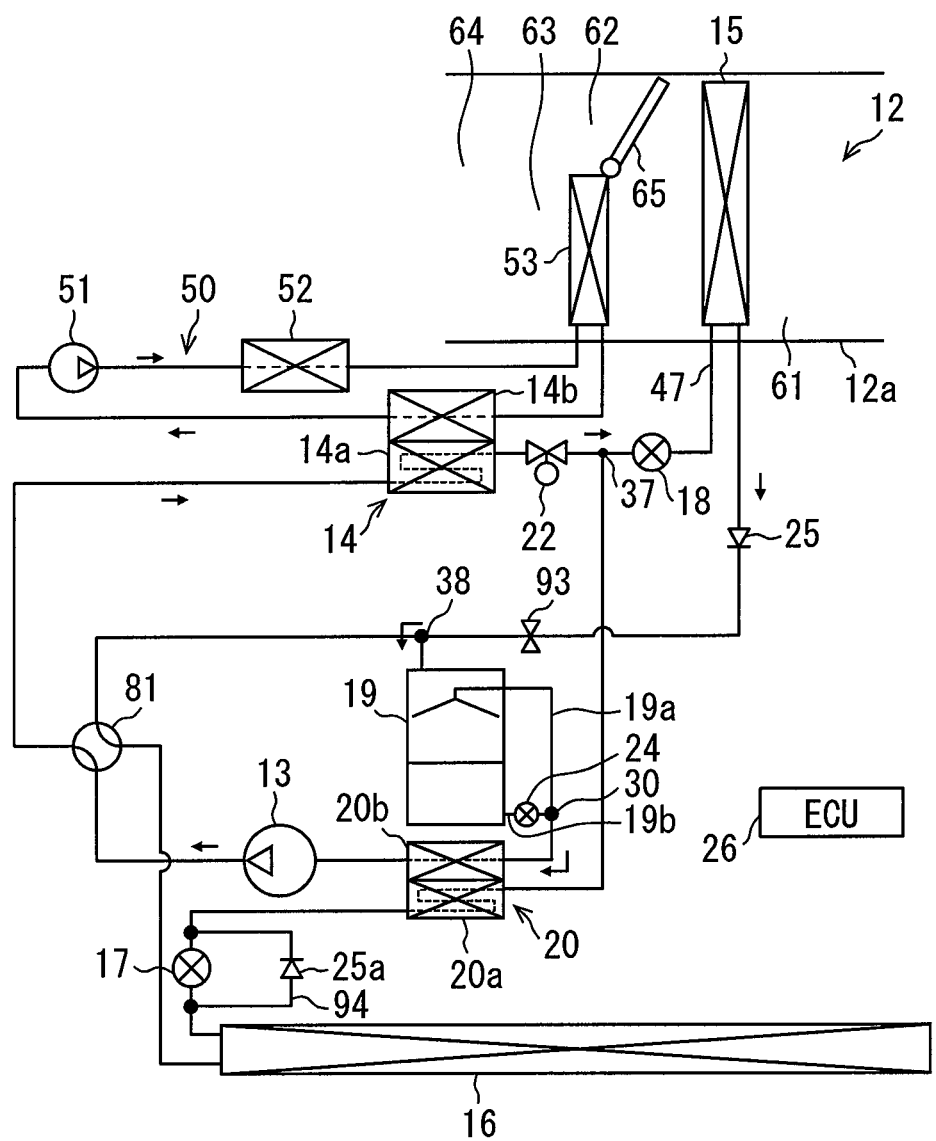
FIG. 31 is a diagram showing a flow of the refrigerant in the heating operation while a temperature of an outside air is low, according to the seventh embodiment.

According to this, in the heating operation in the inoperative condition, the refrigerant flows as indicated by arrows shown in FIG. 31. That is, in such condition, the refrigerant circulates in the following order: the compressor 13, the four-way valve 81, the cooling decompressor 18, the evaporator 15, the accumulator 19, the low-pressure passage 20b of the internal heat exchanger 20, the compressor 13.

When the outdoor unit 16 is not capable of absorbing heat, e.g. the outdoor unit 16 is covered with snow or the temperature of the outside air is so low that it is difficult for the outdoor unit 16 to absorb heat from the outside air, heat is absorbed from the inside air. Although the outdoor unit 16 is not capable of absorbing heat from the outside air, high heating capacity can be obtained by the heat of the compressor 13 and the heat of the heating portion 52.

Eighth Embodiment

Next, an eighth embodiment of the present disclosure is described below with reference to FIGS. 32 to 37. The present embodiment is similar to the above-described seventh embodiment, and the present embodiment is characterized in that a valve unit 82 is provided in the heat pump cycle 11 instead of the four-way valve 81.

The valve unit 82 is located on the discharge side of the compressor 13. The valve unit 82 is connected to the discharge side of the compressor 13, the condenser 14, the accumulator 19, and the outdoor unit 16. In the valve unit 82, two three-way valves, i.e. a first three-way valve 84 and a second three-way valve 85, are provided in an annular pipe 83. The first three-way valve 84 is located at a position through which the annular pipe 83 and the condenser 14 communicate with each other. The second three-way valve 85 is located at a part through which the annular pipe 83 and the outdoor unit 16 communicate with each other. The discharge side of the compressor 13 is connected to a part of the annular pipe 83 which is located between the second three-way valve 85 and the first three-way valve 84 clockwise. The accumulator 19 is connected to a part of the annular pipe 83 which is located between the first three-way valve 84 and the second three-way valve 85 clockwise.

Figure 32:
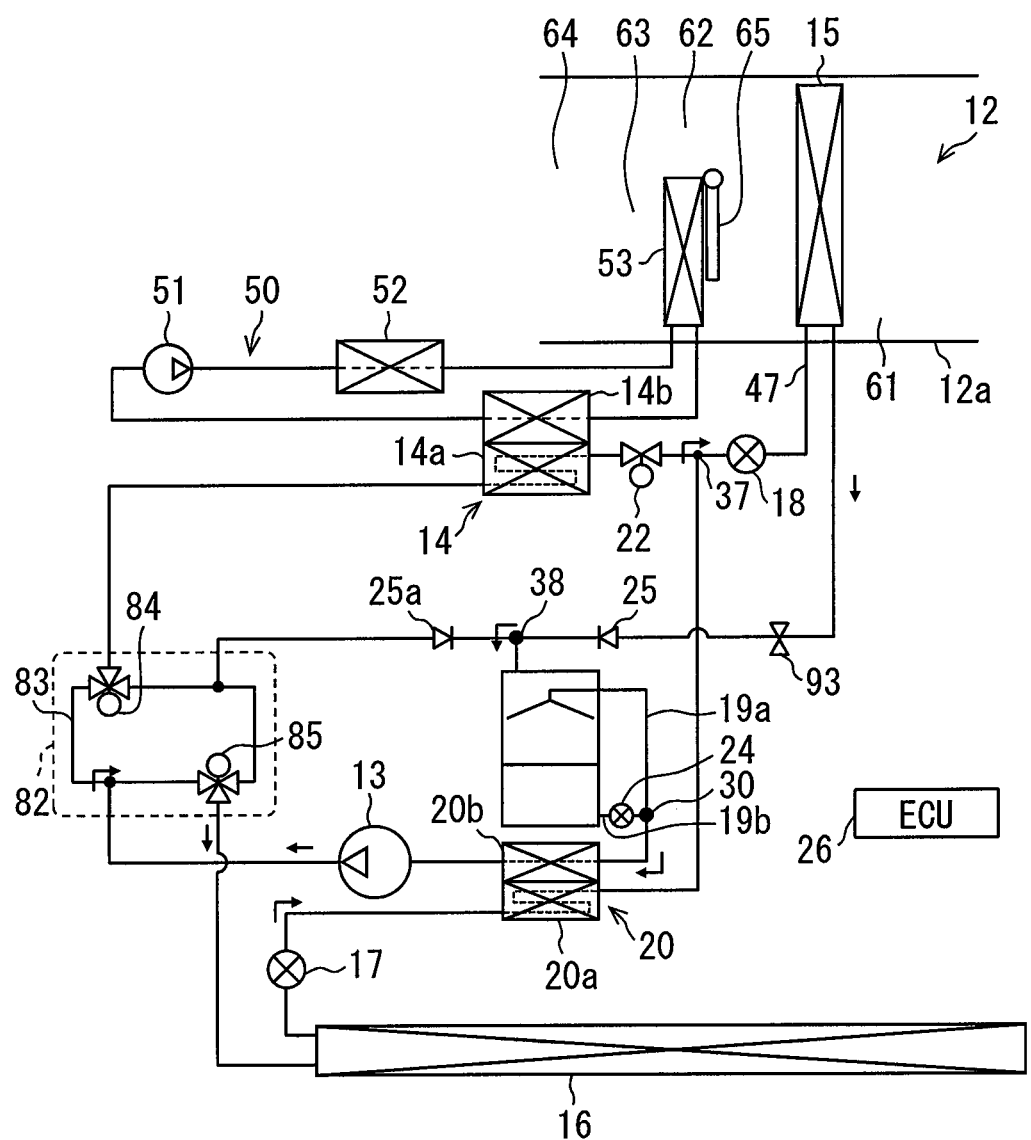
FIG. 32 is a diagram illustrating a heat pump system according to an eighth embodiment of the present disclosure.

As shown in FIG. 32, the heating decompressor 17 is provided between the outdoor unit 16 and the internal heat exchanger 20 without the bypass passage 94. The heating decompressor 17 allows a reverse flow of the refrigerant.

The heating check valve 25a is provided between the valve unit 82 and the eighth branch portion 38. The heating check valve 25a allows the refrigerant to flow from the valve unit 82 toward the eighth branch portion 38 and stops a reverse flow. The positions of the check valve 25 and the pressure regulator 93 provided between the evaporator 15 and the eighth branch portion 38 are swapped compared to the seventh embodiment.

Next, actuations of the heat pump system 10 are described below. When the operation mode is the cooling operation, the control unit 26 controls the air mix door 65 to close the warm air passage 63. The control unit 26 controls the cooling opening-closing portion 22 to be closed, and the control unit 26 controls the heating decompressor 17 to be opened, and the control unit 26 controls the opening degree of the cooling decompressor 18. The control unit 26 controls the valve unit 82 such that the first three-way valve 84 is closed and the second three-way valve 85 connects the compressor 13 and the outdoor unit 16 to each other.

According to this, in the cooling operation, the refrigerant flows as indicated by arrows shown in FIG. 32. That is, in such condition, the refrigerant circulates in the following order: the compressor 13, the valve unit 82, the outdoor unit 16, the heating decompressor 17, the high-pressure passage 20a of the internal heat exchanger 20, the cooling decompressor 18, the evaporator 15, the accumulator 19, the low-pressure passage 20b of the internal heat exchanger 20, the compressor 13. According to this, the same effects as the above-described seventh embodiment can be obtained.

Next, actuations in a condition where the temperature is at or above about −10 degrees Celsius in the heating are described below. When the operation mode is the heating operation, the control unit 26 controls the air mix door 65 to open the warm air passage 63 and drives the liquid sending portion 51 and the heating portion 52. The control unit 26 controls the cooling opening-closing portion 22 to be opened, and the control unit 26 controls the opening degree of the heating decompressor 17, and the control unit 26 controls the cooling decompressor 18 to be closed. The control unit 26 controls the valve unit 82 such that the first three-way valve 84 connects the compressor 13 and the condenser 14 to each other and the second three-way valve 85 connects the accumulator 19 and the outdoor unit 16 to each other.

Figure 33:
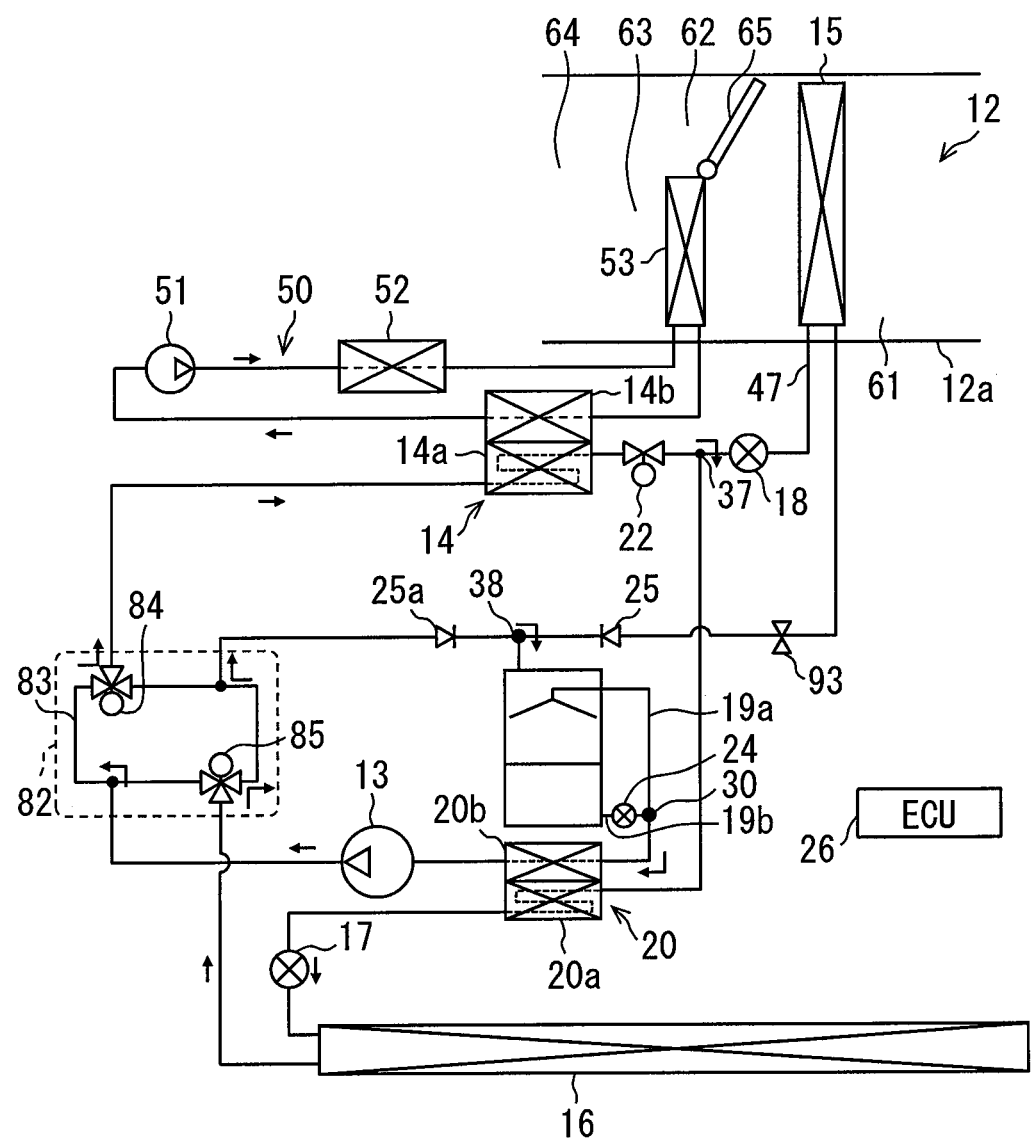
FIG. 33 is a diagram showing a flow of a refrigerant in a heating operation according to the eighth embodiment.

According to this, in the heating operation, the refrigerant flows as indicated by arrows shown in FIG. 33. That is, in such condition, the refrigerant circulates in a first heating pathway: the compressor 13, the valve unit 82, the condenser 14, the cooling opening-closing portion 22, the high-pressure passage 20a of the internal heat exchanger 20, the heating decompressor 17, the outdoor unit 16, the accumulator 19, the low-pressure passage 20b of the internal heat exchanger 20, the compressor 13. According to this, the same effects as the above-described seventh embodiment can be obtained.

Next, actuations in a condition where the temperature is below about −10 degrees Celsius in the heating are described below. When the operation mode is the heating operation, the control unit 26 controls the air mix door 65 to open the warm air passage 63 and drives the liquid sending portion 51 and the heating portion 52. The control unit 26 controls the cooling opening-closing portion 22 to be opened, and the control unit 26 controls the opening degree of the heating decompressor 17, and the control unit 26 controls the cooling decompressor 18 to be opened. The control unit 26 controls the valve unit 82 such that the first three-way valve 84 connects the compressor 13 and the condenser 14 to each other and the second three-way valve 85 is closed.

Figure 34:
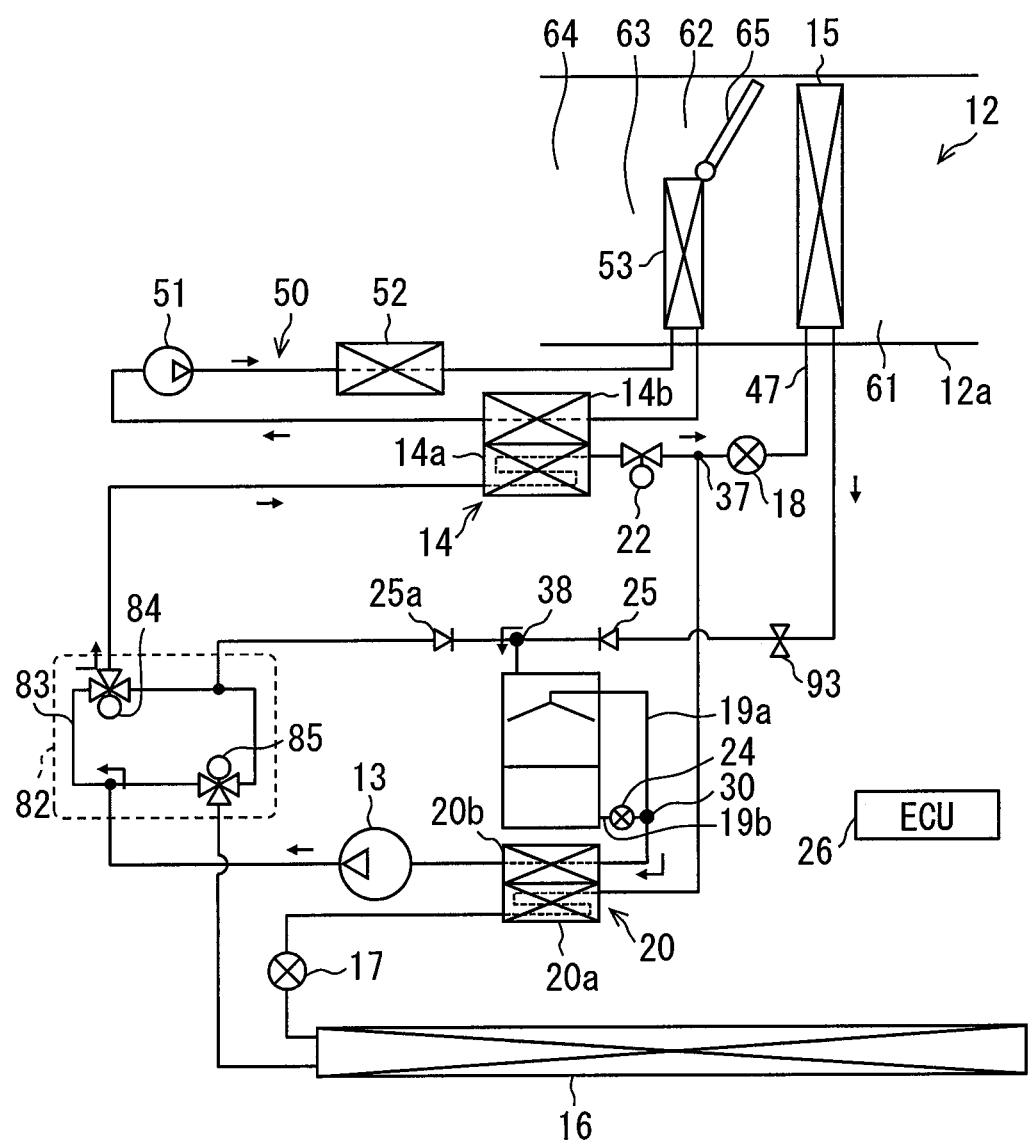
FIG. 34 is a diagram showing a flow of the refrigerant in the heating operation while a temperature of an outside air is low, according to the eighth embodiment.

According to this, the refrigerant flows as indicated by arrows shown in FIG. 34. That is, in such condition, the refrigerant circulates in a second heating pathway: the compressor 13, the valve unit 82, the condenser 14, the cooling opening-closing portion 22, the cooling decompressor 18, the evaporator 15, the accumulator 19, the low-pressure passage 20b of the internal heat exchanger 20, the compressor 13. According to this, when the temperature of the outside air is so low that the outdoor unit 16 is not capable of absorbing heat from the outside air, the heat can be absorbed from the inside air, and accordingly the same effects as the seventh embodiment can be obtained.

Next, actuations in the dehumidification-heating operation are described below. When the operation mode is the dehumidification-heating operation, the control unit 26 drives the liquid sending portion 51 and the heating portion 52. The control unit 26 controls the cooling opening-closing portion 22 to be opened, and the control unit 26 controls the opening degree of the cooling decompressor 18 and the heating decompressor 17. The control unit 26 controls the valve unit 82 such that the first three-way valve 84 connects the compressor 13 and the condenser 14 to each other and the second three-way valve 85 connects the accumulator 19 and the outdoor unit 16 to each other.

Figure 35:
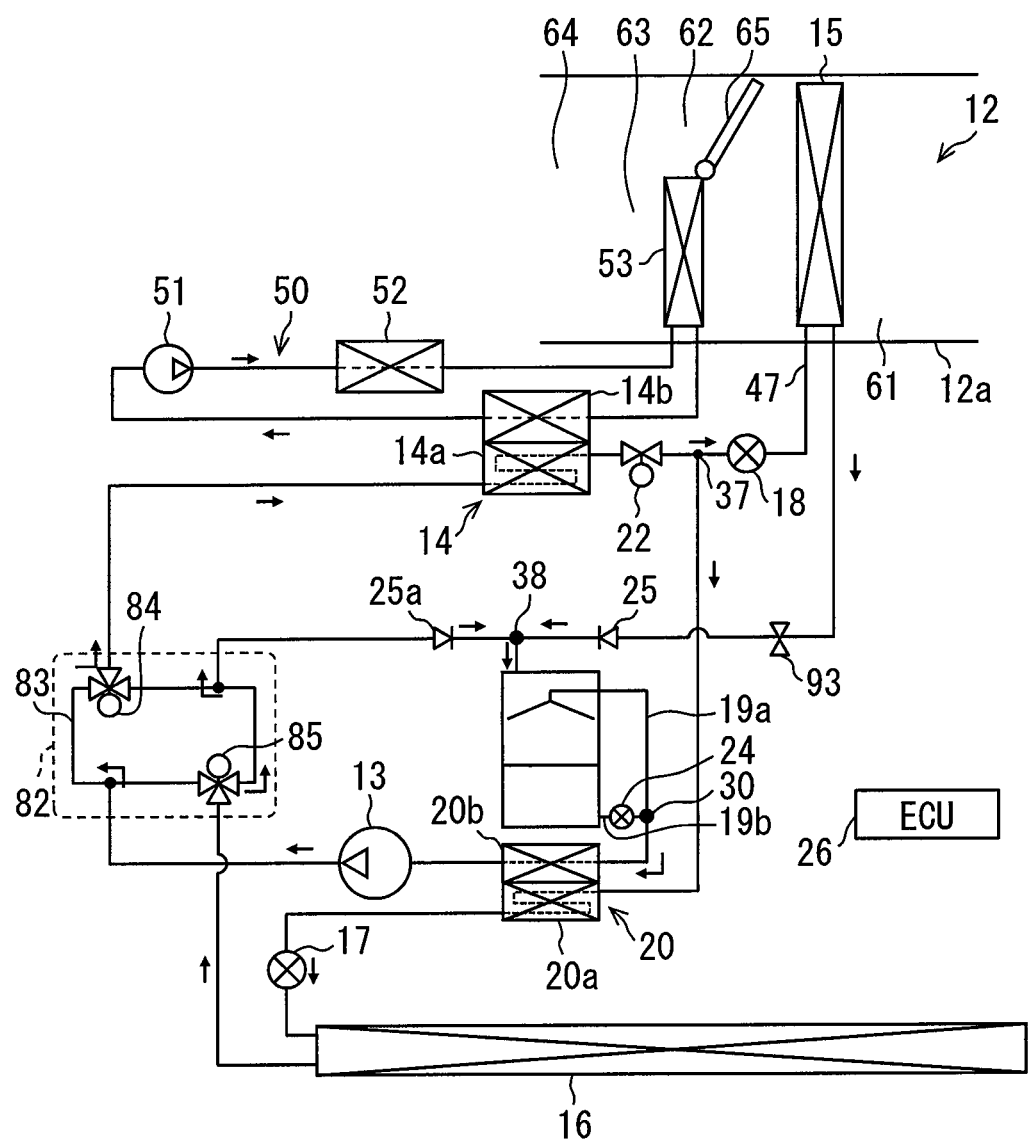
FIG. 35 is a diagram showing a flow of the refrigerant in a dehumidification-heating operation according to the eighth embodiment.

According to this, in the dehumidification-heating operation, the refrigerant flows as indicated by arrows shown in FIG. 35. Basically, the flow of the refrigerant is the same as the above-described heating operation, but the cooling decompressor 18 is opened, and a part of the refrigerant is branched at a part located downstream of the compressor 13 to flow into the evaporator 15 through the condenser 14, not through the outdoor unit 16. In this first dehumidification-heating pathway, the evaporator 15 also evaporates the refrigerant. According to this, the air is dehumidified by the evaporator 15, and the cooled air is heated by the radiator 53, and accordingly the vehicle compartment can be heated, as in the above-described seventh embodiment.

Next, actuations in a condition where the temperature of the outside air is high in the dehumidification-heating are described below. For example, when the temperature of the outside air is at or above 15 degrees Celsius in the dehumidification-heating operation, the control unit 26 drives the liquid sending portion 51 without driving the heating portion 52. The control unit 26 controls the cooling opening-closing portion 22 to be closed, and the control unit 26 controls the heating decompressor 17 to be opened, and the control unit 26 controls the opening degree of the cooling decompressor 18. The control unit 26 controls the valve unit 82 such that the first three-way valve 84 connects the compressor 13 and the condenser 14 to each other and the second three-way valve 85 connects the compressor 13 and the outdoor unit 16 to each other. That is, the control unit 26 controls the valve unit 82 to distribute the refrigerant discharged by the compressor 13 to the condenser 14 and the outdoor unit 16.

Figure 36:
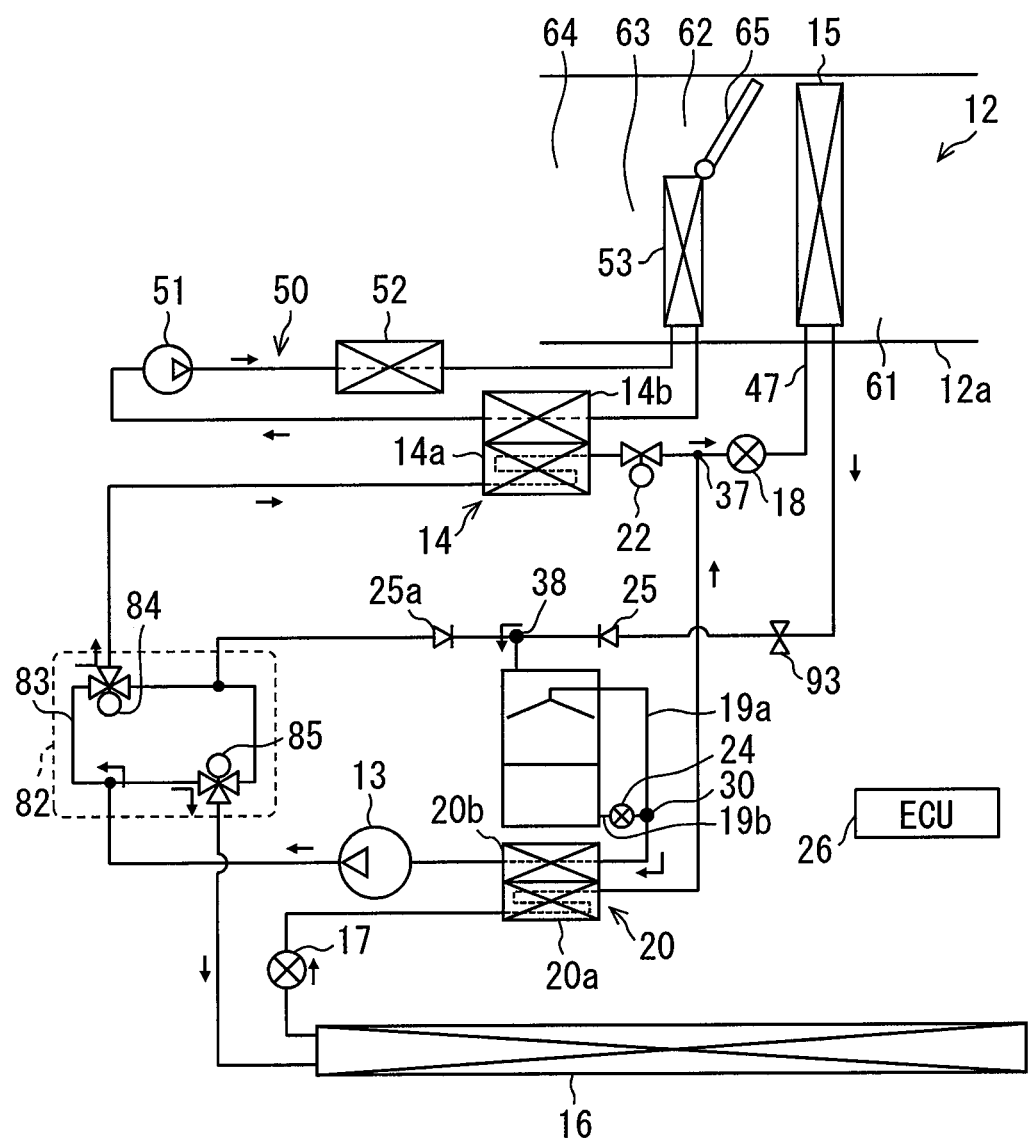
FIG. 36 is a diagram showing a flow of the refrigerant in a high-temperature dehumidifying operation according to the eighth embodiment.

According to this, in the dehumidification-heating operation in the high-temperature condition, the refrigerant flows as indicated by arrows shown in FIG. 36. That is, the refrigerant circulates in a second dehumidification-heating pathway: the compressor 13, valve unit 82, the outdoor unit 16, the heating decompressor 17, the high-pressure passage 20a of the internal heat exchanger 20, the evaporator 15, the accumulator 19, the low-pressure passage 20b of the internal heat exchanger 20, the compressor 13. In the second dehumidification-heating pathway, the refrigerant divided in the valve unit 82 flows through the condenser 14 and the cooling opening-closing portion 22, and joins together at the seventh branch portion 37.

When the required heating capacity is small due to the high-temperature of the outside air, and when the dehumidification is required, it is required that a part of the heat generated in the heat pump cycle 11 is dissipated to the outside. In the present embodiment, the high-temperature refrigerant is divided by the valve unit 82 into the outdoor unit 16 and the condenser 14. According to this, the excessive heat is dissipated to the outside air through the outdoor unit 16, and the outside air is dehumidified by the evaporator. The target air temperature can be obtained by reheating the cooled and dehumidified air by the radiator 53. According to this, the refrigerant is not necessary to be heated by the heating portion 52, and the efficiency can be improved.

Next, actuations in the defrosting are described below. When the operation mode is the defrosting operation, the control unit 26 drives the liquid sending portion 51 and the heating portion 52. The control unit 26 controls the cooling opening-closing portion 22 and the heating decompressor 17 to be opened, and the control unit 26 controls the cooling decompressor 18 to be closed. The control unit 26 controls the valve unit 82 such that first three-way valve 84 connects the condenser 14 and the accumulator 19 to each other and the second three-way valve 85 connects the compressor 13 and the outdoor unit 16 to each other.

Figure 37:
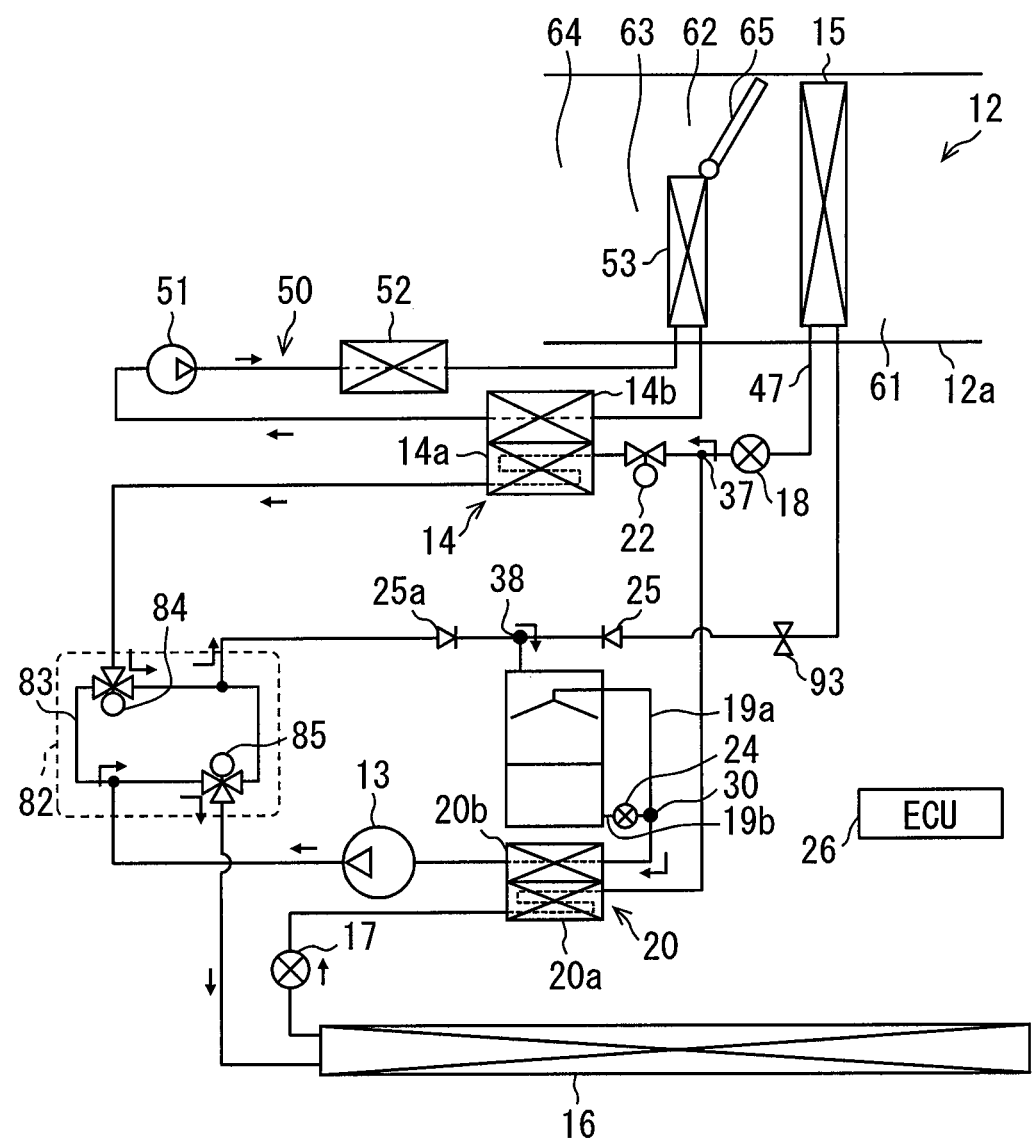
FIG. 37 is a diagram showing a flow of the refrigerant in a defrosting operation according to the eighth embodiment.

According to this, in the defrosting operation, the refrigerant flows as indicated by arrows shown in FIG. 37. That is, in a defrosting pathway that is a pathway of the refrigerant in the defrosting operation, the refrigerant circulates in the following order: the compressor 13, the valve unit 82, the outdoor unit 16, the heating decompressor 17, the high-pressure passage 20a of the internal heat exchanger 20, the cooling opening-closing portion 22, the condenser 14, the accumulator 19, the low-pressure passage 20b of the internal heat exchanger 20, the compressor 13.

Since the refrigerant does not flow through the evaporator 15, the pathway can be shortened. The refrigerant flow rate can be increased, and accordingly the time for defrosting can be shortened. The same effects as the seventh embodiment can be obtained.

Ninth Embodiment

Next, a ninth embodiment of the present disclosure is described with reference to FIGS. 38, 39. In the present embodiment, configurations of the outdoor unit 16 are characteristic. The outdoor unit 16 includes an upper port 71, through which the refrigerant flows, and a lower port 72 located downward of the upper port 71, through which the refrigerant flows. As described in the above-described first embodiment, the refrigerant inlet and the refrigerant outlet are switched between the cooling operation and the heating operation. In the present embodiment, the refrigerant flows into the outdoor unit 16 through the upper port 71 and flows out of the outdoor unit 16 through the lower port 72 in the cooling pathway. In the heating pathway, the refrigerant flows into the outdoor unit 16 through the lower port 72 and flows out of the outdoor unit 16 through the upper port 71.

Figure 38:
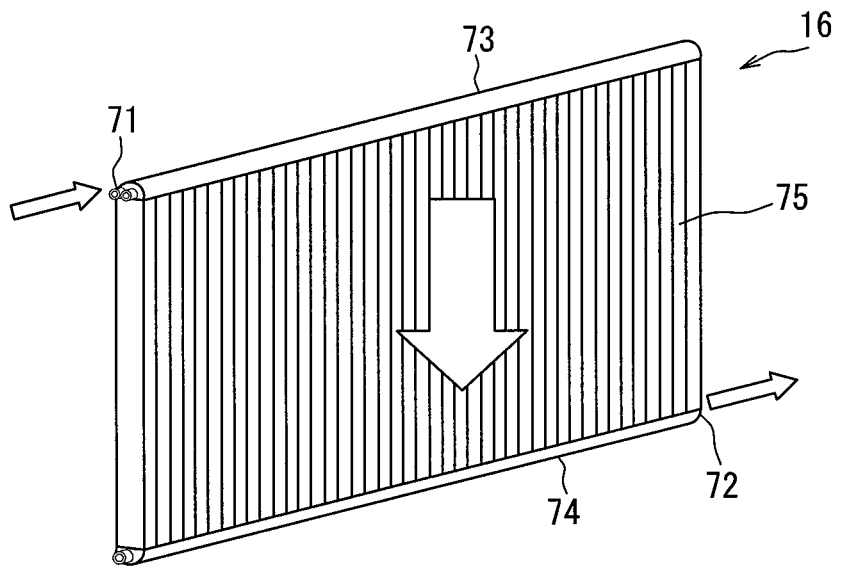
FIG. 38 is a perspective view illustrating an outdoor unit according to a ninth embodiment of the present disclosure.

Specifically, the outdoor unit 16 is a single-pass downflow type which includes an upper tank 73, a lower tank 74, and a core portion 75, as shown in FIG. 38. The upper port 71 is provided in the upper tank 73. The lower port 72 is provided in the lower tank 74. Accordingly, the refrigerant flows along an up-down direction in the core portion 75.

In the present embodiment, the refrigerant flows downward in the cooling, and the refrigerant flows upward in the heating. FIG. 38 shows the refrigerant flow in the cooling operation. In the heating, the refrigerant flows in the opposite direction from an arrow in FIG. 38.

In the cooling, the outdoor unit 16 functions as a condenser. Accordingly, the refrigerant changes its phase from gas to liquid. Since the refrigerant flows downward, a direction of the refrigerant flow corresponds to the direction of gravity. Accordingly, the liquid refrigerant can be smoothly discharged, and the refrigerant flow can be unified.

In the heating operation, the outdoor unit 16 functions as an evaporator. Accordingly, the refrigerant changes its phase from liquid to gas. Since the refrigerant flows upward in contrast to the cooling, the direction of the refrigerant flow is opposite from the direction of gravity. Accordingly, the liquid refrigerant is likely to remain in the outdoor unit 16, and the refrigerant distribution can be unified. In the heating operation, since the vapour quality of the refrigerant flowing into the outdoor unit 16 can be approximately 0 by the internal heat exchanger 20 as described above, the refrigerant distribution can be appropriate and the pressure loss can be reduced even in the single-pass type, and accordingly the performance of the system can be improved. In contrast, when the outdoor unit 16 is used in a condition of the comparative example shown in FIG. 8, the liquid refrigerant flows to a deep side of the inlet-side tank due to a fictitious force, and the liquid refrigerant flows through the tubes on the deep side. The gas refrigerant flows through the tubes on a shallow side, and a part of the outdoor unit 16 for exchanging heat may not be utilized effectively, and accordingly the evaporation performance may decrease.

Figure 39:
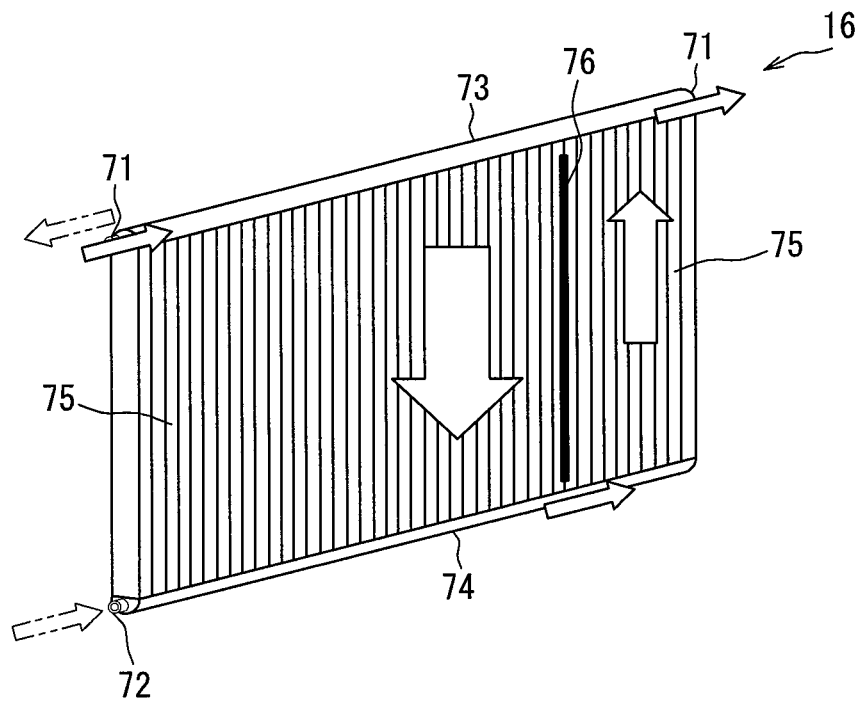
FIG. 39 is a perspective view illustrating an outdoor unit having another configuration according to the ninth embodiment.

As shown in FIG. 39, a U-pass configuration may be used instead of the single-pass configuration. In the U-pass configuration, two upper ports 71 are provided in the upper tank 73, and the refrigerant flows downward at first and subsequently flows upward as indicated by arrows. In the heating operation, the refrigerant flows into the outdoor unit 16 through the lower port 72, and the refrigerant flows upward only in the first-pass, and subsequently the refrigerant flows out of the outdoor unit 16 through the upper port 71, as indicated by imaginary arrows. Accordingly, in the heating operation, the refrigerant only flows upward. A partitioning portion 76 for the U-turn configuration is provided such that an area of the first-pass is larger than the second-pass in the cooling operation. In the U-pass configuration, since the refrigerant flows upward in the second-pass in the cooling operation, the refrigerant is required to be subcooled such that the distribution of the refrigerant is not deteriorated.

Since the refrigerant vapour quality at the inlet portion of the outdoor unit 16 is controlled to be about 0 in the heating operation, the refrigerant distribution can be appropriate. It is important that the first-pass is set to be large. When the first-pass is large, the second-pass is small, and accordingly the heating capacity may be decreased if the refrigerant flows through the second-pass in the heating operation. As shown in FIG. 39, in the outdoor unit 16, the first-pass occupies a large part of the core portion 75. In the cooling operation, the refrigerant is preferred to flow in the whole passages. In the heating operation, the refrigerant is preferred to flow through only the first-pass. That is, since the refrigerant does not pass through the second-pass in the heating operation, the passage of the second-pass is preferred to be smaller than the passage of the first-pass.

Tenth Embodiment

Figure 40:
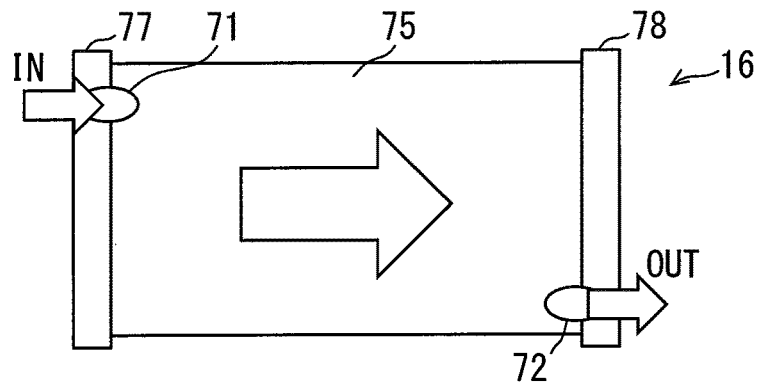
FIG. 40 is a perspective view illustrating an outdoor unit according to a tenth embodiment of the present disclosure.

Next, a tenth embodiment of the present disclosure is described with reference to FIGS. 40 to 42. In the present embodiment, configurations of the outdoor unit 16 are characteristic similarly to the above-described ninth embodiment. The outdoor unit 16 is a single-pass crossflow type which includes a left tank 77, a right tank 78, and the core portion 75, as shown in FIG. 40. Accordingly, the refrigerant flows in a left-right direction in the core portion 75. The upper port 71 is provided in the left tank 77. The lower port 72 is provided in the right tank 78. In the crossflow type outdoor unit 16 also, when the outdoor unit 16 is the single-pass type, the pressure loss can be reduced, and accordingly the performance of the system can be improved. Similarly to the downflow type, when the refrigerant vapour quality at the inlet is high in the crossflow type outdoor unit 16, the volume of the gas refrigerant increases, and accordingly the liquid refrigerant flows in lower tubes and the gas refrigerant flows in upper tubes. In this case, the heat is not exchanged effectively. However, when the refrigerant vapour quality is reduced to about 0, the volume ratio of the liquid refrigerant increases, and accordingly the liquid refrigerant can be uniformly distributed to the tubes.

Figure 41:
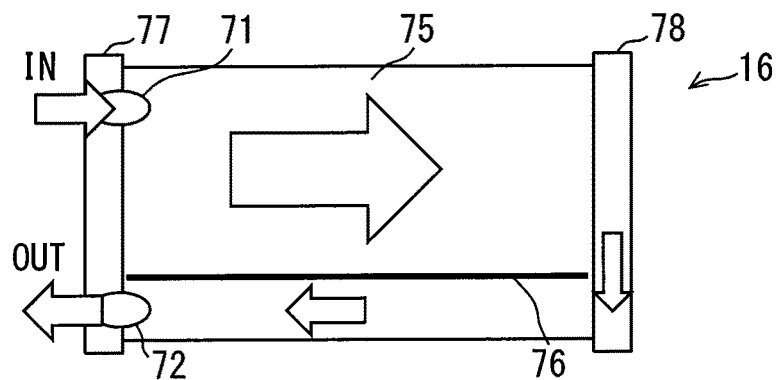
FIG. 41 is a perspective view illustrating an outdoor unit having another configuration.

As shown in FIG. 41, a U-pass configuration may be used instead of the single-pass configuration. In the U-pass configuration, the upper port 71 and the lower port 72 are provided in the left tank 77. In the cooling operation, the refrigerant flows into the outdoor unit 16 through the upper port 71, and the refrigerant flows toward right side, and subsequently the refrigerant U-turns to flow toward left side, as indicated by arrows. Accordingly, in the cooling operation, the refrigerant flows into the outdoor unit 16 from the upper side, and the refrigerant flows out of the outdoor unit 16 from the lower side.

In the heating operation, the refrigerant flows reversely. That is, in the heating operation, the refrigerant flows into the outdoor unit 16 through the lower port 72, and the refrigerant flows toward the right side, and subsequently the refrigerant U-turns to flow toward the left side. Accordingly, in the heating operation, the refrigerant flows into the outdoor unit 16 from the lower side, and the refrigerant flows out of the outdoor unit 16 from the upper side.

The partitioning portion 76 for the U-turn configuration is provided such that an area of the first-pass is larger than the second-pass in the cooling operation. According to this, in the heating operation, since the liquid refrigerant becomes two-phase refrigerant after the U-turn, the distribution of the upward flow of the refrigerant can be improved. When the ratio of the passage close to the outlet is large, the refrigerant pressure loss in the heating operation can be reduced.

Figure 42:
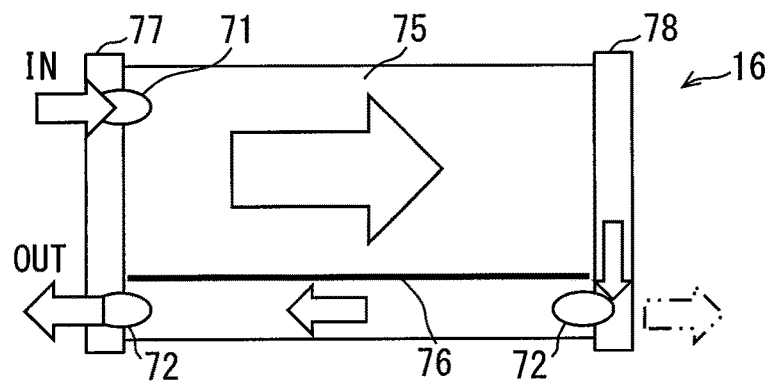
FIG. 42 is a perspective view illustrating an outdoor unit having another configuration.

The lower port 72 may be provided at a lower part of the right tank 78 as shown in FIG. 42. In the cooling operation, the refrigerant U-turns as shown in FIG. 41. In the heating operation, the refrigerant flows into the outdoor unit 16 as in the cooling operation, and the refrigerant flows out of the outdoor unit 16 through the lower port 72 provided at the lower part of the right tank 78, as indicated by an imaginary arrow. Accordingly, in the heating operation, the refrigerant flows in single-pass.

Since it is important in the heating operation to decrease the pressure loss, it is required that a cross-sectional area of the passage on the downstream side is large. However, the refrigerant inlet is required to be large in order to improve the distribution due to the low vapour quality. Accordingly, the inlet side pass is set to be large, and the refrigerant flows out of the outdoor unit 16 without passing through the second-pass in the heating operation, as shown in FIG. 42. According to this, the pressure loss can be decreased. In the cooling operation when the distribution and the pressure loss are not largely affected, the refrigerant flows through the whole part of the core portion to effectively utilize the core portion.

Although the embodiments of the present disclosure has been described, the present disclosure is not limited to the above-described embodiments and can be modified within the scope of the present disclosure.

Although the present disclosure has been fully described in connection with the preferred embodiments thereof, it is to be noted that various changes and modifications will become apparent to those skilled in the art. The present disclosure includes various modifications and changes within the equivalent. Moreover, other combinations and configurations, including more, less or only a single element, are also within the spirit and scope of the present disclosure.

The configurations of the above-described embodiments are just examples, and the present disclosure is not limited to those.

Figure 43:
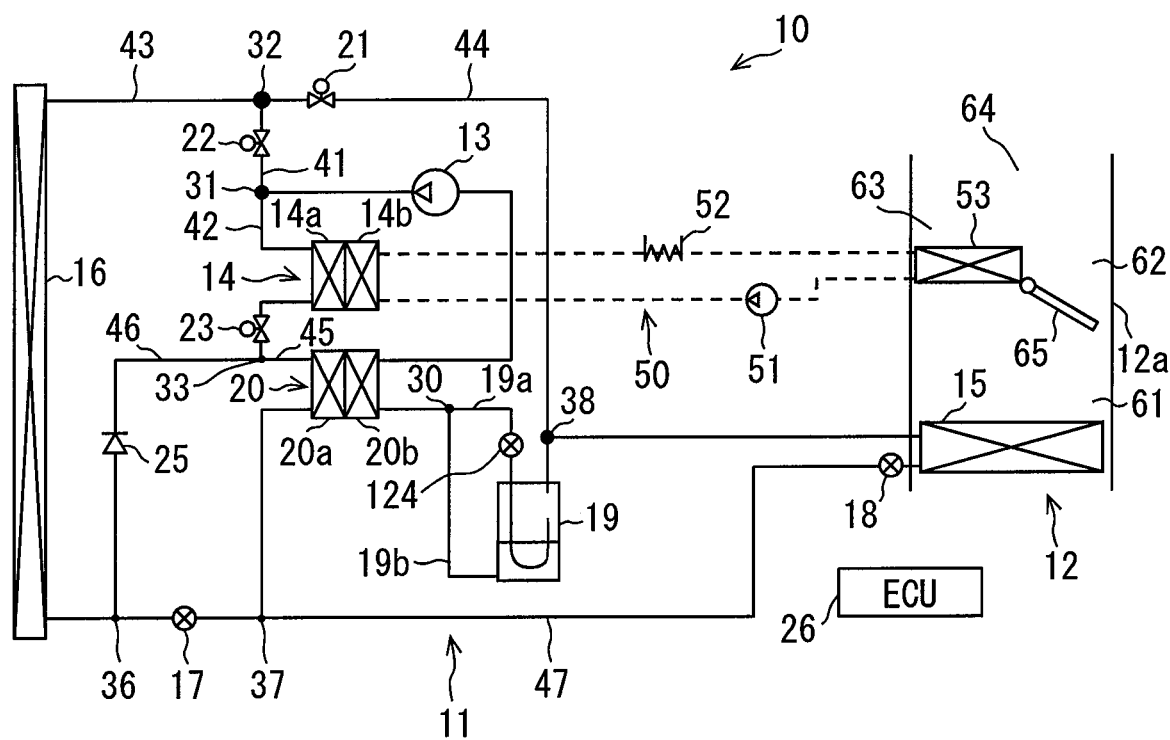
FIG. 43 is a diagram illustrating a heat pump system according to another embodiment.

In the above-described first embodiment, the flow rate regulator 24 is provided, but a flow rate regulator 124 may be provided in the gas refrigerant passage 19a instead as shown in FIG. 43, or the heat pump cycle 11 may not include the flow rate regulator 24 as far as the liquid refrigerant flowing from the accumulator 19 flows into the internal heat exchanger 20.

In the heat pump system 10 shown in FIG. 43, the flow rate in the gas refrigerant passage 19a is adjusted by the flow rate regulator 124. The flow rate of the liquid refrigerant in the liquid refrigerant passage 19b can be adjusted indirectly by adjusting the flow rate in the gas refrigerant passage 19a. Accordingly, the flow rate of the liquid refrigerant flowing from the accumulator 19 can be adjusted as in the first embodiment, and the same effects can be obtained.

In the above-described first embodiment, both the gas refrigerant passage 19a and the liquid refrigerant passage 19b are connected to the low-pressure passage 20b of the internal heat exchanger 20. However, at least the liquid refrigerant 19b may be connected to the low-pressure passage 20b of the internal heat exchanger 20 as in the above-described third embodiment. According to this, at least the liquid refrigerant flowing from the accumulator 19 can flow into the internal heat exchanger 20.

In the above-described eighth embodiment and ninth embodiment, the refrigerant flows in U-turn (one round), but the configuration is not limited to U-turn. The refrigerant may flow in S-turn (one and half round), W-turn (two rounds), two and half round or more.

In the above-described first embodiment, in the heating operation, the flow direction of the refrigerant in the outdoor unit 16 is opposite from the cooling operation, but the flow direction is not limited to this. The refrigerant flows in the same direction in both the heating operation and the cooling operation.

What is claimed is:

1. A heat pump system comprising: a compressor that compresses and discharges a refrigerant; a decompressor that decompresses the refrigerant; an outdoor heat exchanger that exchanges heat between the refrigerant and an outside air; an evaporator that evaporates the refrigerant; a condenser that condenses the refrigerant; an internal heat exchanger that includes a high-pressure passage through which a high-pressure refrigerant flows, and a low-pressure passage through which a low-pressure refrigerant flows, the internal heat exchanger exchanging heat between the refrigerant flowing through the high-pressure passage and the refrigerant flowing through the low-pressure passage; an accumulator that separates the refrigerant into a gas refrigerant and a liquid refrigerant; and a flow pathway changing portion that switches a pathway in which the refrigerant flows, wherein the flow pathway changing portion switches between a cooling pathway and a heating pathway, in the cooling pathway, the refrigerant circulates, in order, from the compressor, to the outdoor heat exchanger, directly to the condenser, to the high-pressure passage of the internal heat exchanger, to the decompressor, to the evaporator, to the accumulator, to the low-pressure passage of the internal heat exchanger, then back to the compressor, in the heating pathway, the refrigerant circulates, in order, from the compressor, to the condenser, to the high-pressure passage of the internal heat exchanger, to the decompressor, to the outdoor heat exchanger, to the accumulator, to the low-pressure passage of the internal heat exchanger, then back to the compressor, the accumulator includes a gas refrigerant passage through which the separated gas refrigerant flows out, and a liquid refrigerant passage through which the separated liquid refrigerant flows out, and in the gas refrigerant passage and the liquid refrigerant passage, at least the liquid refrigerant passage is connected to the low-pressure passage of the internal heat exchanger.

2. The heat pump system according to claim 1, further comprising:
a flow rate regulator that adjusts a flow rate of the liquid refrigerant flowing from the accumulator to the internal heat exchanger.

3. The heat pump system according to claim 2, wherein the liquid refrigerant passage is connected to the low-pressure passage of the internal heat exchanger, and
the gas refrigerant passage is connected to a downstream side of the low-pressure passage of the internal heat exchanger.

4. The heat pump system according to claim 2, wherein the outdoor heat exchanger includes an upper port and a lower port through which the refrigerant flows, the lower port being located downward of the upper port,
in the cooling pathway, the refrigerant flows into the outdoor heat exchanger through the upper port, and
in the heating pathway, the refrigerant flows into the outdoor heat exchanger through the lower port.

5. The heat pump system according to claim 2, wherein the outdoor heat exchanger is downflow-type that includes an upper tank, a lower tank, and a core portion, the outdoor heat exchanger includes an upper port provided in the upper tank, the refrigerant flowing through the upper port, and a lower port provided in the lower tank, the refrigerant flowing through the lower port, in the cooling pathway, the refrigerant flows into the outdoor heat exchanger through the upper port, and the refrigerant flows out of the outdoor heat exchanger through the lower port, in the heating pathway, the refrigerant flows into the outdoor heat exchanger through the lower port, and the refrigerant flows out of the outdoor heat exchanger through the upper port.

6. The heat pump system according to claim 2, further comprising:

a control unit that controls the flow rate regulator, wherein in the heating pathway, the control unit estimates a superheat based on physical properties of the refrigerant that is to be drawn into the compressor, and the control unit controls the flow rate regulator such that the superheat approaches a predetermined target value.

7. A heat pump system comprising:

a compressor that compresses and discharges a refrigerant;

a decompressor that decompresses the refrigerant;

an outdoor heat exchanger that exchanges heat between the refrigerant and an outside air;

an evaporator that evaporates the refrigerant;

a condenser that condenses the refrigerant;

an internal heat exchanger that includes a high-pressure passage through which a high-pressure refrigerant flows, and a low-pressure passage through which a low-pressure refrigerant flows, the internal heat exchanger exchanging heat between the refrigerant flowing through the high-pressure passage and the refrigerant flowing through the low-pressure passage;

an accumulator that separates the refrigerant into a gas refrigerant and a liquid refrigerant;

a flow pathway changing portion that switches a pathway in which the refrigerant flows; and a controller that includes a processor and a memory, wherein the accumulator includes a gas refrigerant passage through which the separated gas refrigerant flows out, and a liquid refrigerant passage through which the separated liquid refrigerant flows out, in the gas refrigerant passage and the liquid refrigerant passage, at least the liquid refrigerant passage is connected to the low-pressure passage of the internal heat exchanger, the flow pathway changing portion switches between the cooling pathway, a first heating pathway, a second heating pathway, a first dehumidification-heating pathway, a second dehumidification-heating pathway, and a defrosting pathway, the processor is programmed to control the flow pathway changing portion such that:

in the cooling pathway, the refrigerant circulates, in order, from the compressor, to the outdoor heat exchanger, to the high-pressure passage of the internal heat exchanger, to the decompressor, to the evaporator, to the accumulator, to the low-pressure passage of the internal heat exchanger, then back to the compressor;

in the first heating pathway, the refrigerant circulates, in order, from the compressor, to the condenser, to the high-pressure passage of the internal heat exchanger, to the decompressor, to the outdoor heat exchanger, to the accumulator, to the low-pressure passage of the internal heat exchanger, then back to the compressor;

in the second heating pathway, the refrigerant circulates, in order, from the compressor, to the condenser, to the evaporator, to the accumulator, to the low-pressure passage of the internal heat exchanger, then back to the compressor; and in the first dehumidification-heating pathway, the refrigerant circulates, in order, from the compressor, to the condenser, to the high-pressure passage of the internal heat exchanger, to the decompressor, to the outdoor heat exchanger, to the accumulator, to the low-pressure passage of the internal heat exchanger, then back to the compressor, the first dehumidification-heating pathway includes a route in which the refrigerant is branched at a part located downstream of the condenser to flow into the accumulator via the evaporator, not via the high-pressure passage, the processor is programmed to control the flow pathway changing portion such that:

in the second dehumidification-heating pathway, the refrigerant circulates, in order, from the compressor, to the outdoor heat exchanger, to the high-pressure passage of the internal heat exchanger, to the decompressor, to the evaporator, to the accumulator, to the low-pressure passage of the internal heat exchanger, then back to the compressor, the second dehumidification-heating pathway includes a route in which the refrigerant is branched at a part located downstream of the compressor to flow into the evaporator via the condenser, not via the outdoor heat exchanger, and the processor is programmed to control the flow pathway changing portion such that:

in the defrosting pathway, the refrigerant circulates, in order, from the compressor, to the outdoor heat exchanger, to the high-pressure passage of the internal heat exchanger, to the condenser, to the accumulator, to the low-pressure passage of the internal heat exchanger, then back to the compressor.

8. A heat pump system comprising: a compressor that compresses and discharges a refrigerant; a decompressor that decompresses the refrigerant; an outdoor heat exchanger that exchanges heat between the refrigerant and an outside air; an evaporator that evaporates the refrigerant; a condenser that condenses the refrigerant; an accumulator that separates the refrigerant into a gas refrigerant and a liquid refrigerant; a flow pathway changing portion that switches a pathway in which the refrigerant flows; and a controller that includes a processor and a memory, wherein the flow pathway changing portion switches between a cooling pathway, a heating pathway, and a defrosting pathway, the processor is programmed to control the flow pathway changing portion such that: in the cooling pathway, the refrigerant circulates, in order, from the compressor, to the outdoor heat exchanger, to the decompressor, to the evaporator, to the accumulator, then back to the compressor; in the heating pathway, the refrigerant circulates, in order, from the compressor, to the condenser, to the decompressor, directly to the outdoor heat exchanger, to the accumulator, then back to the compressor; and in the defrosting pathway, the refrigerant circulates, in order, from the compressor, to the outdoor heat exchanger, to the condenser, to the accumulator, then back to the compressor.

9. The heat pump system according to claim 8, further comprising
the controller controls a discharge amount of the compressor and the switching of the pathways by the flow pathway changing portion, wherein
the controller determines whether to circulate the refrigerant in the defrosting pathway or stop the circulation based on a temperature of an outside air and a pressure of the refrigerant on an intake side of the compressor.

\* \* \* \* \*